(12) United States Patent
Arai et al.

(10) Patent No.: US 9,292,910 B2
(45) Date of Patent: Mar. 22, 2016

(54) IMAGE PROCESSING APPARATUS, IMAGE PROCESSING METHOD, PROGRAM, PRINTING MEDIUM, AND RECORDING MEDIUM

(71) Applicant: National Institute of Japan Science and Technology Agency, Kawaguchi-shi, Saitama (JP)

(72) Inventors: Hitoshi Arai, Tokyo (JP); Shinobu Arai, Tokyo (JP)

(73) Assignee: NATIONAL INSTITUTE OF JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 0 days.

(21) Appl. No.: 14/400,440

(22) PCT Filed: May 13, 2013

(86) PCT No.: PCT/JP2013/063871
§ 371 (c)(1),
(2) Date: Nov. 11, 2014

(87) PCT Pub. No.: WO2013/172471
PCT Pub. Date: Nov. 21, 2013

(65) Prior Publication Data
US 2015/0131906 A1    May 14, 2015

(30) Foreign Application Priority Data
May 14, 2012  (JP) .................................. 2012-110949

(51) Int. Cl.
*G06T 5/00*  (2006.01)
*G06T 5/20*  (2006.01)
(Continued)

(52) U.S. Cl.
CPC ................. *G06T 5/003* (2013.01); *G06T 5/002* (2013.01); *G06T 5/10* (2013.01); *G06T 5/20* (2013.01); *G06T 7/0085* (2013.01); *G06T 7/0095* (2013.01); *G06T 2207/10024* (2013.01); *G06T 2207/20016* (2013.01); *G06T 2207/20024* (2013.01);
(Continued)

(58) Field of Classification Search
CPC combination set(s) only.
See application file for complete search history.

(56) References Cited

U.S. PATENT DOCUMENTS 5,799,112 A    8/1998    De Queiroz et al.

FOREIGN PATENT DOCUMENTS

JP    H10-098628 A    4/1998
JP    2003-248824 A    9/2003

OTHER PUBLICATIONS

The International Bureau of WIPO, "International Preliminary Report on Patentability," issued in International Application No. PCT/JP2013/063871, of which U.S. Appl. No. 14/400,440 is a U.S. national phase entry, with a date of issuance of Nov. 18, 2014.
(Continued)

*Primary Examiner* — Duy M Dang

(57) ABSTRACT

When obtaining subband signals by performing multiresolution decomposition on image data using a broad-sense pinwheel framelet or a pinwheel wavelet frame, having a degree, that is a set of an approximate filter with no orientation and a plurality of detail filters with respective orientations, and acquiring processed image data by the subband signals in a decomposition phase of the multiresolution decomposition, or processed image data that has been reconstructed into an image by summing the subband signals in a synthesis phase of the multiresolution decomposition, the present invention performs attenuation or amplification of the subband signals in the decomposition phase of the multiresolution decomposition that correspond to at least one of the filters.

25 Claims, 43 Drawing Sheets
(6 of 43 Drawing Sheet(s) Filed in Color)

(51) Int. Cl.
  *G06T 5/10* (2006.01)
  *G06T 7/00* (2006.01)
(52) U.S. Cl.
  CPC ............. *G06T 2207/20064* (2013.01); *G06T 2207/20182* (2013.01)

(56) References Cited

OTHER PUBLICATIONS

Hitoshi Arai, "A Nonlinear Model of Visual Information Processing Based on Discrete Maximal Overlap Wavelets", Interdisciplinary Information Sciences, Vo. 11, No. 2, pp. 177-190 (2005).
Adobe Systems Incorporated, "Help and Support to Photoshop / Advanced Sharpening Method", (created Apr. 6, 2006), [online] <http://www.adobe.com/jp/designcenter/photoshop/articles/phscs2at_advsharpen.html> (retrieved May 9, 2012).
Elizabeth N. Johnson et al., "The spatial transformation of color in the primary visual cortex of the macaque monkey", Nature Neuroscience, vol. 4, No. 4, pp. 409-416, (Apr. 2001).
Rafael C. Gonzalez et al., Digital Image Processing, Third Edition, pp. 157-173, 280-298, 313-314, 447-451, 461-524, 689-725 and 738-763 (2008), Pearson International Edition.
Patrick J. Van Fleet, "Discrete Wavelet Transformations—An Elementary Approach with Applications", pp. 56-58, 210-216 and 317-350 (2008), Wiley.
Hitoshi Arai et al., "2D Tight Framelets with Orientation Selectivity Suggested by Vision Science", JSIAM Letters, vol. 1, pp. 9-12 (2009), Japan Society for Industrial and Applied Mathematics.
Hitoshi Arai et al., "Finite Discrete, Shift-Invariant, Directional Filterbanks for Visual Information Processing, I : Construction", Interdisciplinary Information Sciences, vol. 13, No. 2, pp. 255-273 (2007).
Hitoshi Arai, "Science and Mathematics of Vision: World of Optical Illusions Explored with Wavelets—Third Installment: Nonlinear Mathematical Models of Vision and Simulation of Occurrence of Optical Illusions", Mathematical Science, No. 544, pp. 63-68 (Oct. 2008).
Hitoshi Arai, "Simple Pinwheel Framelet (Time-Frequency Analysis and its Applications)", Kokyuroku of Research Institute of Mathematical Sciences, vol. 1684, pp. 63-67, (Apr. 2010), [online] <http://repository.kulib.kyoto-u.ac.jp/dspace/bitstream/2433/141429/1/1684-05.pdf>.
Hitoshi Arai, "Science and Mathematics of Vision: World of Optical Illusions Explored with Wavelets—First Installment: Visual Mathematical Model and Wavelets", Mathematical Science, No. 542, pp. 64-69 (Aug. 2008).
International Search Report received for PCT Patent Application No. PCT/JP2013/063871 mailed on Aug. 13, 2013, 1 page.
Japan Patent Office, "Notice of Reasons for Rejection", issued in Japanese Patent Application No. 2013-541095 with a mailing date of Mar. 4, 2014.
Taiwan Patent Office, Office Action and Search Report, issued in TW Patent Application No. 102116878, which is a Taiwanese counterpart of U.S. Appl. No. 14/400,440, on Aug. 18, 2015, 4 pages (3 pages of Office Action and 1 page of Search Report).

FIG.5

|  |  |  |  |  |  |  | |
|---|---|---|---|---|---|---|---|
| $d_k(1)$ | $d_k(2)$ | $d_k(3)$ | $d_k(4)$ | $d_k(5)$ | $d_k(6)$ | $d_k(7)$ | $a_k(1)$ |
| $d_k(8)$ | $d_k(9)$ | $d_k(10)$ | $d_k(11)$ | $d_k(12)$ | $d_k(13)$ | $d_k(14)$ | $d_k(15)$ |
| $d_k(16)$ | $d_k(17)$ | $d_k(18)$ | $d_k(19)$ | $d_k(20)$ | $d_k(21)$ | $d_k(22)$ | $d_k(23)$ |
| $d_k(24)$ | $d_k(25)$ | $d_k(26)$ | $d_k(27)$ | $d_k(28)$ | $d_k(29)$ | $d_k(30)$ | $d_k(31)$ |
| $d_k(32)$ | $d_k(33)$ | $d_k(34)$ | $d_k(35)$ | $d_k(36)$ | $d_k(37)$ | $d_k(38)$ | $d_k(39)$ |
| $d_k(40)$ | $d_k(41)$ | $d_k(42)$ | $d_k(43)$ | $d_k(44)$ | $d_k(45)$ | $d_k(46)$ | $d_k(47)$ |
| $d_k(48)$ | $d_k(49)$ | $d_k(50)$ | $d_k(51)$ | $d_k(52)$ | $d_k(53)$ | $d_k(54)$ | $d_k(55)$ |
| $d_k(56)$ | $d_k(57)$ | $d_k(58)$ | $d_k(59)$ | $d_k(60)$ | $d_k(61)$ | $d_k(62)$ | $d_k(63)$ |
| $d_k(64)$ | $d_k(65)$ | $d_k(66)$ | $d_k(67)$ | $d_k(68)$ | $d_k(69)$ | | |
| $d_k(70)$ | $d_k(71)$ | $d_k(72)$ | $d_k(73)$ | $d_k(74)$ | $d_k(75)$ | | |
| $d_k(76)$ | $d_k(77)$ | $d_k(78)$ | $d_k(79)$ | $d_k(80)$ | $d_k(81)$ | | |
| $d_k(82)$ | $d_k(83)$ | $d_k(84)$ | $d_k(85)$ | $d_k(86)$ | $d_k(87)$ | | |
| $d_k(88)$ | $d_k(89)$ | $d_k(90)$ | $d_k(91)$ | $d_k(92)$ | $d_k(93)$ | | |
| $d_k(94)$ | $d_k(95)$ | $d_k(96)$ | $d_k(97)$ | $d_k(98)$ | $d_k(99)$ | | |

FIG.12
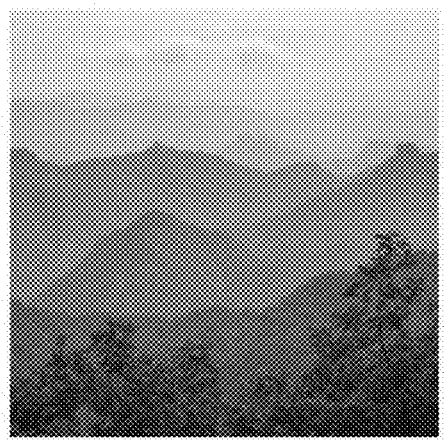
ORIGINAL IMAGE
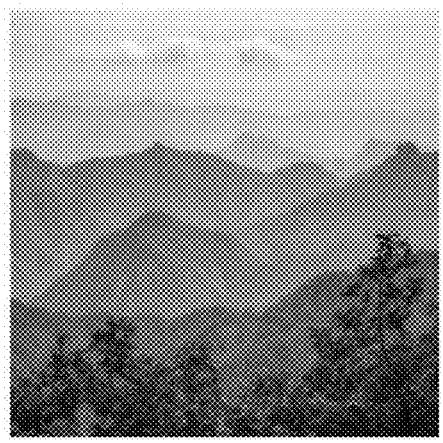
IMAGE SHARPENED
ACCORDING TO PRESENT
EMBODIMENT
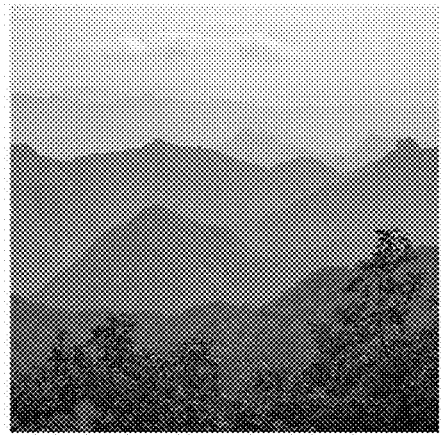
IMAGE SHARPENED
USING COMMERCIAL
SOFTWARE

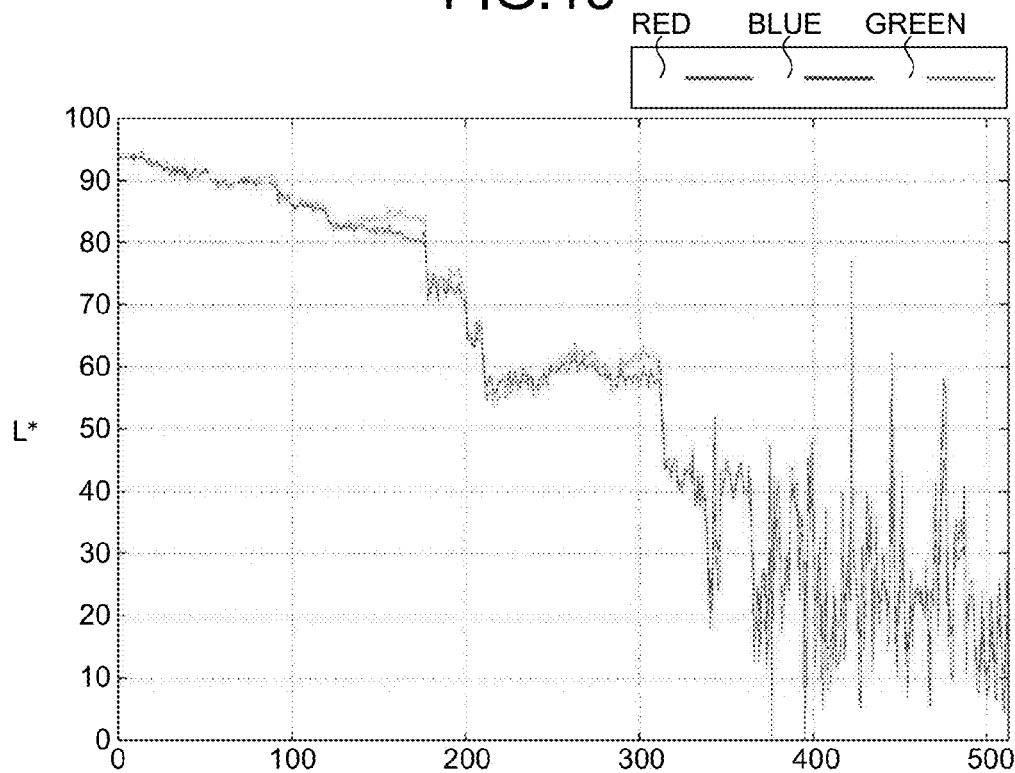
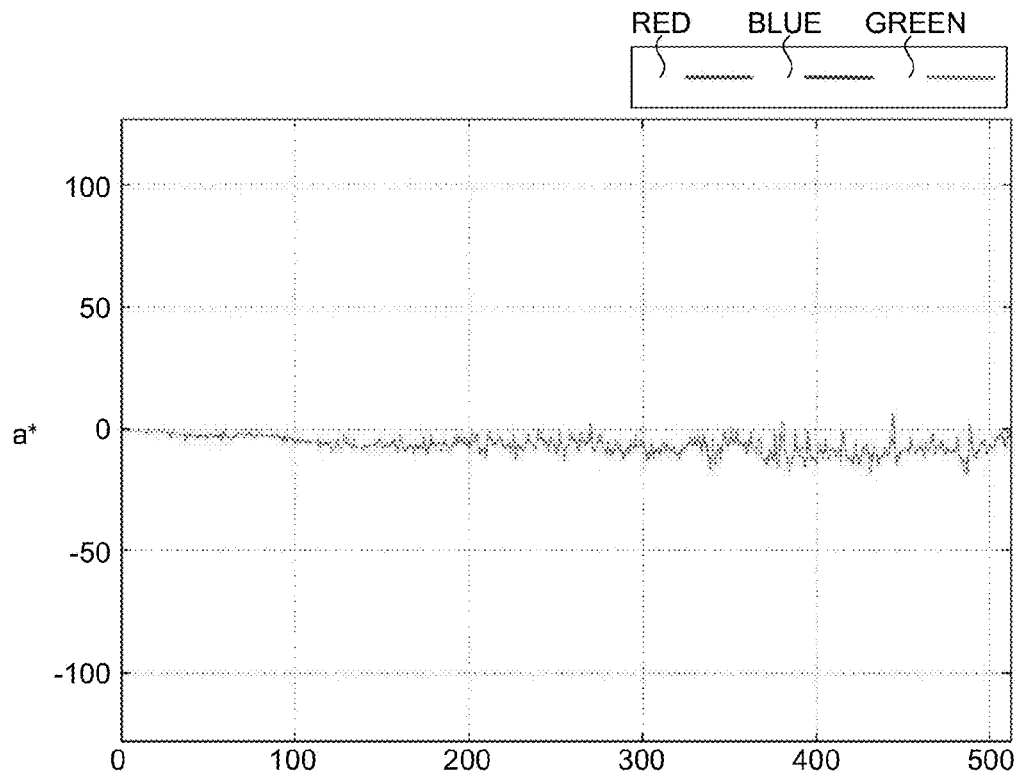

ORIGINAL IMAGE C    ORIGINAL IMAGE D

ORIGINAL IMAGE (INNER SQUARE PORTION)

PROCESSED IMAGE C    PROCESSED IMAGE D

ORIGINAL IMAGE E    ORIGINAL IMAGE F

ORIGINAL IMAGE (INNER SQUARE PORTION)

PROCESSED IMAGE E    PROCESSED IMAGE F

FIG.31

| h | h | h | h | h | h | h | g |   |   |   |   |   |   |
|---|---|---|---|---|---|---|---|---|---|---|---|---|---|
| h | h | h | h | h | h | h | h | h | h | h | h | h | h |
| h | h | h | h | h | h | h | h | h | h | h | h | h | h |
| h | h | h | h | h | h | h | h | h | h | h | h | h | h |
| h | h | h | h | h | h | h | h | h | h | h | h | h | h |
| h | h | h | h | h | h | h | h | h | h | h | h | h | h |
| h | h | h | h | h | h | h | h | h | h | h | h | h | h |
| h | h | h | h | h | h | h | h |   |   |   |   |   |   |

FIG.35

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.36

| 1 | 1 | 1 | 0 | 0 | 0 | 0 | 0 |   |   |   |   |   |   |
|---|---|---|---|---|---|---|---|---|---|---|---|---|---|
| 1 | 1 | 1 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.39

| 0 | 0 | 0 | 0 | 0 | 0 | 0 | 0 |   |   |   |   |   |   |
|---|---|---|---|---|---|---|---|---|---|---|---|---|---|
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 |   |   |   |   |   |   |

FIG.40

| 0 | 0 | 0 | 0 | 0 | 0 | 0 | 0 |   |   |   |   |   |   |
|---|---|---|---|---|---|---|---|---|---|---|---|---|---|
| 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 | 1 | 1 | 1 | 1 | 1 | 1 |
| 0 | 0 | 0 | 0 | 0 | 0 | 0 | 0 |   |   |   |   |   |   |

FIG.47

| 0 | 0 | 0 | 0 | 0 | 0 | 0 | 0 |   |   |   |   |   |   |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

FIG.48

| 0 | 0 | 0 | 1 | 1 | 1 | 1 | 0 |   |   |   |   |   |   |
|---|---|---|---|---|---|---|---|---|---|---|---|---|---|
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

IMAGE PROCESSING APPARATUS, IMAGE PROCESSING METHOD, PROGRAM, PRINTING MEDIUM, AND RECORDING MEDIUM

CROSS REFERENCE TO RELATED APPLICATIONS

This patent application is a U.S. national stage application under 35 U.S.C. §371 of International Patent Application No. PCT/JP2013/063871 filed on May 13, 2013, which claims the benefit of foreign priority to Japanese Patent Application No. JP 2012-110949 filed on May 14, 2012, the disclosures of all of which are hereby incorporated by reference in their entireties. The International Application was published in Japanese on Nov. 21, 2013, as International Publication No. WO 2013/172471 A1 under PCT Article 21(2).

FIELD

The present invention relates to an image processing apparatus, an image processing method, a program, a printing medium, and a recording medium.

BACKGROUND

Methods for performing image processing, such as performing image sharpening and edge detection, on an original image have so far been developed.

For example, it is disclosed that, in order to perform image sharpening, a program product described in Non Patent Literature 1 performs local contrast control so as to detect and further brighten pixels on the bright side of an edge, and detect and further darken pixels on the dark side of the edge.

It is disclosed that, in a method described in Non Patent Literature 2, nonlinear processing is performed on a grayscale original image using a maximal overlap biorthogonal wavelet filterbank as a mathematical model for human early visual information processing.

As methods for edge detection, methods of simple filtering and methods of using wavelets have so far been well known (see Non Patent Literature 6 and 7).

CITATION LIST

Non Patent Literature

Non Patent Literature 1: Adobe Systems Incorporated, "Help and support for Photoshop/Advanced sharpening technique", Apr. 6, 2006 [Online], available from <http://www.adobe.com/jp/designcenter/photoshop/articles/ph scs2at_advsharpen.html> (accessed on May 9, 2012).

Non Patent Literature 2: Hitoshi Arai, "A Nonlinear Model of Visual Information Processing Based on Discrete Maximal Overlap Wavelets", Interdisciplinary Information Sciences, Vol. 11, No. 2, 2005, pp. 177-190.

Non Patent Literature 3: Hitoshi Arai and Shinobu Arai, "2D tight framelets with orientation selectivity suggested by vision science", JSIAM Letters Vol. 1, 2009, pp. 9-12.

Non Patent Literature 4: Hitoshi Arai and Shinobu Arai, "Finite discrete, shift-invariant, directional filterbanks for visual information processing, I: Construction", Interdisciplinary Information Sciences, Vol. 13, No. 2, 2007, pp. 255-273.

Non Patent Literature 5: E. N. Johnson, M. J. Hawken and R. Shapley, "The spatial transformation of color in the primary visual cortex of the macaque monkey", Nature Neuroscience, Vol. 4, No. 4, 2001, pp. 409-416.

Non Patent Literature 6: P. J. Van Fleet, "Discrete Wavelet Transformations", Wiley, 2008.

Non Patent Literature 7: R. C. Gonzalez and R. E. Woods, "Digital Image Processing", 3rd Ed., Pearson International Edition, 2008.

SUMMARY

Technical Problem

However, conventional image processing methods have a problem in that natural image sharpening and various types of edge detection are difficult to be carried out.

For example, the program product described in Non Patent Literature 1 uniformly increases and decreases the lightness of edge portions, and hence has a problem in that the contrast of parts having sufficient contrast is excessively increased to the extent that they become nearly black or white, and thus become unnatural. The method described in Non Patent Literature 2 was carried out as a part of an illusion analysis on black-and-white images, and has a problem of not being applicable to sharpening of color images.

The conventional edge detection methods including those of Non Patent Literature 6 and 7 do not have adequate frequency resolution and orientation selectivity, and hence have a problem of having difficulty in detecting various types of edges according to purposes.

The present invention is achieved in view of the above problems, and an object of the present invention is to provide an image processing apparatus, an image processing method, a program, a printing medium, and a recording medium that allow performing various types of image processing, such as natural image sharpening and detection of various edges.

Solution to Problem

It is an object of the present invention to at least partially solve the problems in the conventional technology. According to an aspect of the present invention, an image processing apparatus includes at least a storing unit and a control unit, the storing unit includes: a filter storing unit that stores a broad-sense pinwheel framelet or a pinwheel wavelet frame, having a degree, that is a set of an approximate filter with no orientation and a plurality of detail filters with respective orientations; and an image data storing unit that stores image data; the control unit includes: a decomposing unit that obtains subband signals by performing multiresolution decomposition on the image data using the broad-sense pinwheel framelet or the pinwheel wavelet frame; and a processed image acquiring unit that acquires processed image data formed by the subband signals in a decomposition phase of the multiresolution decomposition that have been obtained by the decomposing unit, or processed image data that has been reconstructed into an image by summing the subband signals in a synthesis phase of the multiresolution decomposition; and the decomposing unit further comprises a processing unit that performs attenuation or amplification of any of the subband signals in the decomposition phase of the multiresolution decomposition corresponding to at least one of the filters.

According to another aspect of the present invention, in the image processing apparatus described above, the processing unit performs linear or nonlinear coefficient processing on the subband signals in the decomposition phase.

According to still another aspect of the present invention, in the image processing apparatus described above, the processing unit performs threshold processing on the subband signals in the decomposition phase.

According to still another aspect of the present invention, in the image processing apparatus described above, the processing unit performs coefficient processing so as to reduce values having small absolute values to be smaller in absolute value as energy of decomposition detail coefficients constituting the subband signals in the decomposition phase is larger, and so as to further enhance values having small absolute values as the energy of the decomposition detail coefficients is smaller.

According to still another aspect of the present invention, in the image processing apparatus described above, the processing unit attenuates or amplifies the subband signals in the decomposition phase corresponding to at least one of filters among the filters having predetermined frequency characteristics and/or predetermined orientations.

According to still another aspect of the present invention, in the image processing apparatus described above, the predetermined frequency characteristics are specified according to a position in a predetermined filter arrangement based on an orientation at each level of the broad-sense pinwheel framelet or the pinwheel wavelet frame, and/or according to a level in the multiresolution decomposition.

According to still another aspect of the present invention, in the image processing apparatus described above, the processing unit relatively amplifies subband signals in the decomposition phase corresponding to at least one of odd filters among the filters having predetermined frequency characteristics and/or predetermined orientations.

According to still another aspect of the present invention, in the image processing apparatus described above, the processing unit relatively amplifies the subband signals in the decomposition phase corresponding to at least one of the odd filters among the filters having the predetermined frequency characteristics and/or the predetermined orientations, and relatively attenuates subband signals in the decomposition phase corresponding to at least one of even filters.

According to still another aspect of the present invention, in the image processing apparatus described above, the processing unit attenuates or amplifies the subband signals in the decomposition phase by performing processing on decomposition detail coefficients and/or decomposition approximation coefficients output from the decomposition phase.

According to still another aspect of the present invention, an image processing method is performed by an image processing apparatus that includes at least a storing unit and a control unit. The storing unit includes: a filter storing unit that stores a broad-sense pinwheel framelet or a pinwheel wavelet frame, having a degree, that is a set of an approximate filter with no orientation and a plurality of detail filters with respective orientations; and an image data storing unit that stores image data. The method includes a decomposing step of obtaining subband signals by performing multiresolution decomposition by the broad-sense pinwheel framelet or the pinwheel wavelet frame on the image data, and a processed image acquiring step of acquiring processed image data by the subband signals in a decomposition phase of the multiresolution decomposition that have been obtained at the decomposing step, or processed image data that has been reconstructed into an image by summing the subband signals in a synthesis phase of the multiresolution decomposition. The decomposing step and the processed image acquiring step are performed by the control unit; and the decomposing step further includes a processing step of performing attenuation or amplification of any of the subband signals in the decomposition phase of the multiresolution decomposition corresponding to at least one of the filters.

According to still another aspect of the present invention, a program causes an image processing apparatus that includes at least a storing unit and a control unit to execute an image processing method. The storing unit includes: a filter storing unit that stores a broad-sense pinwheel framelet or a pinwheel wavelet frame, having a degree, that is a set of an approximate filter with no orientation and a plurality of detail filters with respective orientations; and an image data storing unit that stores image data. The program causes the control unit to execute a decomposing step of obtaining subband signals by performing multiresolution decomposition by the broad-sense pinwheel framelet or the pinwheel wavelet frame on the image data, and a processed image acquiring step of acquiring processed image data by the subband signals in a decomposition phase of the multiresolution decomposition that have been obtained at the decomposing step, or processed image data that has been reconstructed into an image by summing the subband signals in a synthesis phase of the multiresolution decomposition; and the decomposing step further includes a processing step of performing attenuation or amplification of any of the subband signals in the decomposition phase of the multiresolution decomposition corresponding to at least one of the filters.

As a result of intensive studies, the inventors of the present invention have completed the present invention by considering the following. That is, human vision essentially performs information processing that allows a person to have a good view of parts that the person wants to view. A person perceives various illusions, which are considered to be results of visual information processing. If a mathematical model is similar to the human visual information processing, a computer implementing the mathematical model should calculate the illusions. Hence, the inventors of the present invention applied information processing similar to the human vision to original images by using a mathematical model that could simulate brightness contrast illusions and color contrast illusions, and verified that only parts people would want to view can be sharpened, thus having completed the present invention.

According to still another aspect of the present invention, an image processing apparatus includes at least a storing unit and a control unit, the storing unit includes: a filter storing unit that stores a wavelet frame with orientation selectivity or a filterbank with orientation selectivity that is a set of an approximate filter with no orientation and a plurality of detail filters with respective orientations; and an image data storing unit that stores image data; the control unit includes: a decomposing unit that obtains subband signals by performing multiresolution decomposition on respective color components of the image data using the wavelet frame with orientation selectivity or the filterbank with orientation selectivity; and a reconstructing unit that obtains reconstructed image data by reconstructing an image by summing the subband signals of the respective color components in a synthesis phase that have been obtained by the decomposing unit; and the decomposing unit further comprises a coefficient processing unit that performs coefficient processing, between the decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

According to still another aspect of the present invention, in the image processing apparatus described above, the color components are L*, a*, and b* in a CIELAB color space, or respective color components in a color space similar to that of human vision.

According to still another aspect of the present invention, in the image processing apparatus described above, the coefficient processing unit performs the coefficient processing that has been corrected with respect to the color component(s) of a* and/or b* of the image data so as to reduce values having small absolute values to be smaller in absolute value as energy determined by the decomposition detail coefficient(s) of a* and/or b* and the decomposition detail coefficient in L* is larger, and so as to further enhance values having small absolute values as the energy is smaller.

According to still another aspect of the present invention, in the image processing apparatus described above, the coefficient processing unit performs the coefficient processing using a function that automatically continuously changes into an S-shaped curve when the energy of the decomposition detail coefficients is large and into an N-shaped curve when the energy is small.

According to still another aspect of the present invention, in the image processing apparatus described above, between the decomposition phase and the synthesis phase, the coefficient processing unit normalizes the decomposition detail coefficients, then performs the coefficient processing on the normalized decomposition detail coefficients using a norm of the normalized decomposition detail coefficients as the energy, and performs inverse operation of the normalization on the normalized decomposition detail coefficients that have been processed by the coefficient processing.

According to still another aspect of the present invention, in the image processing apparatus described above, the coefficient processing unit optionally performs different processing according to differences in sign among the decomposition detail coefficients.

According to still another aspect of the present invention, in the image processing apparatus described above, the decomposing unit performs the multiresolution decomposition using a biorthogonal wavelet filterbank, of which the orientations include horizontal, vertical and diagonal directions, or a broad-sense pinwheel framelet or a pinwheel wavelet frame, of which the orientations are multidirectional.

According to still another aspect of the present invention, in the image processing apparatus described above, the multiresolution decomposition by the decomposing unit is maximum thinning multiresolution decomposition or partial thinning partial multiresolution decomposition.

According to still another aspect of the present invention, an image processing method is performed by an image processing apparatus that includes at least a storing unit and a control unit, the storing unit includes: a filter storing unit that stores a wavelet frame with orientation selectivity or a filterbank with orientation selectivity that is a set of an approximate filter with no orientation and a plurality of detail filters with respective orientations; and an image data storing unit that stores image data; and the method includes: a decomposing step of obtaining subband signals by performing multiresolution decomposition on respective color components of the image data using the wavelet frame with orientation selectivity or the filterbank with orientation selectivity; and a reconstructing step of obtaining reconstructed image data by reconstructing an image by summing the subband signals of the respective color components in a synthesis phase that have been obtained at the decomposing step; the decomposing step and the reconstructing step being performed by the control unit, the decomposing step further comprising a coefficient processing step of performing coefficient processing, between a decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

According to still another aspect of the present invention, a program causes an image processing apparatus that comprises at least a storing unit and a control unit to execute an image processing method, the storing unit includes: a filter storing unit that stores a wavelet frame with orientation selectivity or a filterbank with orientation selectivity that is a set of an approximate filter with no orientation and a plurality of detail filters with respective orientations; and an image data storing unit that stores image data; and the program causes the control unit to execute: a decomposing step of obtaining subband signals by performing multiresolution decomposition by the wavelet frame with orientation selectivity or the filterbank with orientation selectivity on respective color components of the image data; and a reconstructing step of obtaining reconstructed image data by reconstructing an image by summing the subband signals of the respective color components in a synthesis phase that have been obtained at the decomposing step; the decomposing step further comprising a coefficient processing step of performing coefficient processing, between a decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

Moreover, the present invention is related to a recording medium on which the above-described program is recorded.

According to still another aspect of the present invention, a processed image is printed on a printing medium, the processed image includes respective components constituting an original image that are extracted by a broad-sense pinwheel framelet or a pinwheel wavelet frame, or respective components constituting an original image that are extracted by a wavelet frame with orientation selectivity or a filterbank with orientation selectivity; and predetermined components of the components are attenuated or amplified.

According to still another aspect of the present invention, image data for displaying a processed image is recorded on a computer-readable recording medium, the processed image includes respective components constituting an original image that are extracted by a broad-sense pinwheel framelet or a pinwheel wavelet frame, or respective components constituting an original image that are extracted by a wavelet frame with orientation selectivity or a filterbank with orientation selectivity; and predetermined components of the components are attenuated or amplified.

Advantageous Effects of Invention

When obtaining subband signals by performing multiresolution decomposition on image data by a broad-sense pinwheel framelet or a pinwheel wavelet frame, having a degree, that is a set of an approximate filter with no orientation and a plurality of detail filters with respective orientations, and acquiring processed image data by the subband signals in a decomposition phase of the multiresolution decomposition, or processed image data that has been reconstructed into an image by summing the subband signals in a synthesis phase of the multiresolution decomposition, the present invention performs attenuation or amplification of the subband signals in the decomposition phase of the multiresolution decomposition that correspond to at least one of the filters. Thereby, the present invention brings about an effect of allowing various types of image processing, such as natural image sharpening and detection of various edges. The broad-sense pinwheel framelet or the pinwheel wavelet frame can perform multiresolution decomposition, and has a wide variety of frequency selectivity and a variety of orientation selectivity, whereby various types of image processing can be performed, such as detection of edges having orientations according to purposes and extraction of frequency components according to purposes.

Moreover, according to the present invention, linear or nonlinear coefficient processing is performed on the subband signals in the decomposition phase. This brings about an effect that image processing results in accordance with coefficient values can be obtained, for example, by applying a liner function or a nonlinear function to decomposition detail coefficients and decomposition approximation coefficients output from the decomposition phase.

Moreover, according to the present invention, threshold processing is performed on the subband signals in the decomposition phase. This brings about an effect that denoising can effectively be performed by removing or attenuating small fluctuations not exceeding a threshold.

Moreover, according to the present invention, the coefficient processing is performed so as to reduce values having small absolute values to be smaller in absolute value as the energy of the decomposition detail coefficients constituting the subband signals in the decomposition phase is larger, and so as to further enhance values having small absolute values as the energy of the decomposition detail coefficients is smaller. This brings about an effect that natural image sharpening similar to human sense can be performed by using a mathematical model similar to human visual information processing.

Moreover, according to the present invention, the subband signals in the decomposition phase corresponding to at least one of the filters that have predetermined frequency characteristics and/or predetermined orientations are attenuated or amplified. This brings about an effect that a variety of image processing results can be obtained in which intended frequency components and/or intended orientation components have been raised or lowered.

Moreover, according to the present invention, the predetermined frequency characteristics are specified according to a position in a predetermined filter arrangement based on an orientation at each level of the broad-sense pinwheel framelet or the pinwheel wavelet frame, and/or according to a level in the multiresolution decomposition. This brings about an effect of allowing specification of a variety of frequency characteristics.

Moreover, according to the present invention, the subband signals in the decomposition phase corresponding to at least one of odd filters among the filters having predetermined frequency characteristics and/or predetermined orientations are relatively amplified. This brings about an effect of allowing, for example, detection of edges with a three-dimensional appearance by outputting the image data as it is without passing it through the synthesis phase.

Moreover, according to the present invention, the subband signals in the decomposition phase corresponding to at least one of the odd filters among the filters having the predetermined frequency characteristics and/or the predetermined orientation are relatively amplified, and, in addition, subband signals in the decomposition phase corresponding to at least one of even filters among the filters may be relatively attenuated. This brings about an effect of allowing, for example, more effective detection of edges with a three-dimensional appearance.

Moreover, according to the present invention, the subband signals in the decomposition phase are attenuated or amplified by performing the coefficient processing on the decomposition detail coefficients and/or the decomposition approximation coefficients output from the decomposition phase. This brings about an effect that a variety of image processing results can be obtained by performing the coefficient processing in accordance with the coefficient values.

Moreover, when obtaining the subband signals by storing a wavelet frame with orientation selectivity or a filterbank with orientation selectivity that is a set of an approximate filter with no orientation and a plurality of detail filters with respective orientations, and image data, and performing the multiresolution decomposition by the wavelet frame with orientation selectivity or the filterbank with orientation selectivity on respective color components of the image data, the present invention performs the coefficient processing, between the decomposition phase and the synthesis phase in the multiresolution decomposition, on the decomposition detail coefficients output from the decomposition phase so as to reduce values having small absolute values to be smaller in absolute value as the energy of the decomposition detail coefficients is larger, and so as to further enhance values having small absolute values as the energy of the decomposition detail coefficients is smaller. The present invention thus brings about an effect of allowing natural image sharpening on color images. More specifically, the present invention can apply natural image sharpening similar to human sense to a color image by using a mathematical model similar to human visual information processing.

Moreover, according to the present invention, $L^*$, $a^*$, and $b^*$ in a CIELAB color space, or respective color components in a color space similar to that of human vision, are used as the color components. The present invention thus brings about an effect of allowing natural image processing similar to human sense.

Moreover, according to the present invention, the coefficient processing is performed that has been corrected with respect to the color component(s) of $a^*$ and/or $b^*$ of the image data so as to reduce values having small absolute values to be smaller in absolute value as energy determined by the decomposition detail coefficient(s) of $a^*$ and/or $b^*$ and the decomposition detail coefficient in $L^*$ is larger, and so as to further enhance values having small absolute values as the energy is smaller. This brings about an effect of allowing sharpening that is natural to human visual perception, in which an effect of lightness and an effect of colors are synergized.

Moreover, according to the present invention, the coefficient processing is performed using a function that automatically continuously changes into an S-shaped curve when the energy of the decomposition detail coefficients is large and into an N-shaped curve when the energy is small. The present invention thus brings about an effect of allowing appropriate execution of the coefficient processing that reduces values having small absolute values to be smaller in absolute value as the energy of the decomposition detail coefficients is larger, and further enhances values having small absolute values as the energy of the decomposition detail coefficients is smaller, using a calculation that uses the function that continuously changes from an S-shaped curve to an N-shaped curve. More specifically, by using a function that increases the dispersion of the decomposition detail coefficients in response to high surrounding stimulation and reduces the dispersion of the decomposition detail coefficients in response to low surrounding stimulation, small stimuli are weakened in response to high surrounding stimulation, and are sensed in response to low surrounding stimulation. Thus, appropriate sharpening can be automatically performed for each image.

Moreover, according to the present invention, between the decomposition phase and the synthesis phase, the decomposition detail coefficients are normalized; then the coefficient processing is performed on normalized decomposition detail coefficients, which are the decomposition detail coefficients thus normalized, using a norm of the normalized decomposition detail coefficients as the energy; and the inverse operation of the normalization is performed on the normalized decomposition detail coefficients subjected to the coefficient processing. The present invention thus brings about an effect that the normalization allows the coefficients to easily be processed, for example, in function processing and energy calculation.

Moreover, according to the present invention, different processing may be performed based on differences in sign among the decomposition detail coefficients. This brings about an effect of allowing fine-tuned sharpening, such as performing the natural sharpening similar to human vision, or performing the natural sharpening that, in contrast, compensates human vision.

Moreover, according to the present invention, the multiresolution decomposition is performed using a biorthogonal wavelet filterbank, of which the orientations include horizontal, vertical and diagonal directions, or a broad-sense pinwheel framelet or a pinwheel wavelet frame, of which the orientations are multidirectional. The present invention thus brings about an effect of allowing a simple calculation using the biorthogonal wavelet filterbank, or an accurate calculation using the broad-sense pinwheel framelet or the pinwheel wavelet frame.

Moreover, according to the present invention, the multiresolution decomposition is maximum thinning multiresolution decomposition or partial thinning partial multiresolution decomposition. This brings about an effect that the decomposition detail coefficients can be obtained by suitable multiresolution decomposition, and low-frequency components as well as high-frequency components are processed in a multiresolutional manner, thereby allowing not sharpening by way of simply emphasizing only edges, but natural sharpening.

Moreover, according to the present invention, in a computer-readable recording medium on which image data for displaying a processed image is recorded or a printing medium on which a processed image is printed, the processed image includes respective components constituting an original image that are extracted by the broad-sense pinwheel framelet or the pinwheel wavelet frame, or respective components constituting an original image that are extracted by the wavelet frame with orientation selectivity or the filterbank with orientation selectivity, and predetermined components of the components are attenuated or amplified. Thus, processed images can be presented with various types of image processing, such as natural image sharpening and detection of various edges, applied to any original images.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 5 is a diagram in which an approximate part is represented by $a_k(1)$ and detail parts are represented by symbols (numbers) of $d_k(1)$ to $d_k(99)$ in the pinwheel framelet at level k of degree 7.

FIG. 12 illustrates an original image (512×512 pixels), a sharpened image according to the embodiment, and a sharpened image according to a conventional method for comparison.

FIG. 13 is a graph illustrating the values of L* at the 400th pixel column from the left in the respective photographs of FIG. 12.

FIG. 14 is a graph illustrating the values of a* at the 400th pixel column from the left in the respective photographs of FIG. 12.

FIG. 31 is a diagram indicating, with hatched lines, detail coefficients with which threshold processing at level 2 is performed.

FIG. 35 is a diagram illustrating weighting coefficients at level 1 of the pinwheel framelets of degree 7.

FIG. 36 is a diagram illustrating weighting coefficients at level 2 of the pinwheel framelets of degree 7.

FIG. 39 is a diagram illustrating weighting coefficients at level 1 of pinwheel framelets of degree 7.

FIG. 40 is a diagram illustrating weighting coefficients at level 2 of pinwheel framelets of degree 7.

FIG. 47 is a diagram illustrating weighting coefficients at level 1 of pinwheel framelets of degree 7.

FIG. 48 is a diagram illustrating weighting coefficients at level 2 of pinwheel framelets of degree 7.

DESCRIPTION OF EMBODIMENT

The following describes in detail an embodiment of an image processing apparatus, an image processing method, a program, a printing medium, and a recording medium according to the present invention, with reference to the drawings. This invention is not limited to the embodiments. As examples of image processing according to the embodiment, examples will be described in which the image processing is used for, for example, sharpening of a color image, denoising, and edge detection. The present invention is, however, not limited to these examples, but may be applied for various purposes, such as sharpening, edge enhancement, contrast adjustment, color correction, feature extraction, pattern recognition, and automatic generation of a crater illusion.

[Configuration of Image Processing Apparatus]

Figure 1:
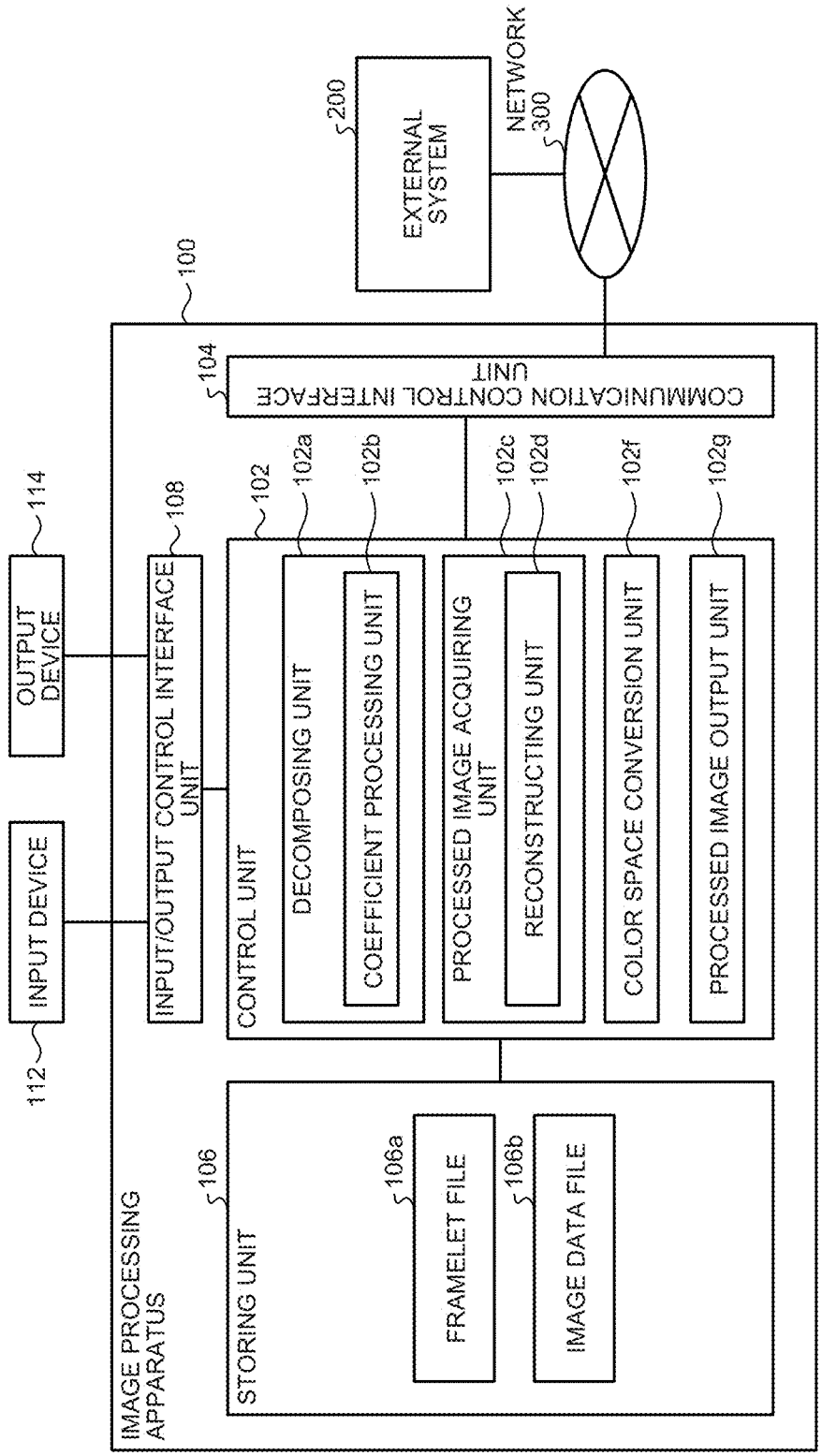
FIG. 1 is a block diagram illustrating an example of the configuration of an image processing apparatus to which an embodiment of the present invention is applied.

The configuration of the image processing apparatus will be described below with reference to FIG. 1. FIG. 1 is a block diagram illustrating an example of the configuration of the image processing apparatus to which the embodiment of the present invention is applied, and conceptually illustrates only a portion relating to the present embodiment in the configuration.

In FIG. 1, an image processing apparatus 100 is schematically illustrated as including a control unit 102, a communication control interface unit 104, an input/output control interface unit 108, and a storing unit 106. The control unit 102 is, for example, a CPU that performs overall control of the image processing apparatus 100. The input/output control interface unit 108 is an interface connected to an input device 112 and an output device 114. The storing unit 106 is a device that stores, for example, various databases and tables. These units of the image processing apparatus 100 are communicably connected via any desired communication channel.

Various files (a framelet file 106a and an image data file 106b) stored in the storing unit 106 are a storage unit, such as a fixed disk drive. For example, the storing unit 106 stores various programs, tables, files, databases, web pages, and the like used for various processes.

Among these components of the storing unit 106, the framelet file 106a is a filter storing unit that stores wavelet frames with orientation selectivity or filterbanks with orientation selectivity, which are each a set of an approximate filter with no orientation and a plurality of detail filters with respective orientations. In the present embodiment, the "wavelet" is not limited to a classical wavelet, a wavelet in a narrow sense, or the like, and includes a wavelet in a broad sense. For example, the wavelet is a finite-length waveform or a wave-like oscillation with an amplitude that is amplified from zero and quickly converges to zero, and, for example, includes pseudo wavelets, such as a Gabor filter and a curvelet.

In the present embodiment, in some cases, a pinwheel framelet (see Section [Pinwheel Framelet] to be described later) is used as a FIR filter that has a variety of frequency characteristics and a variety of orientations, and can be expressed as a differentiable function having a compact support. However, the framelet is not limited to this, but, for example, it is possible to use another framelet such as a simple pinwheel framelet (see Non Patent Literature 3), a framelet obtained by changing coefficients and/or exponents of terms constituting the definitional equation of the pinwheel framelet (such as an expression $F^1_{k,l}(\theta_1, \theta_2)$ or an expression $F^2_{k,l}(\theta_1, \theta_2)$ to be described in Section [Pinwheel Framelet]), or a framelet obtained by changing coefficients of terms constituting frequency response functions of filters of the simple pinwheel framelet (Non Patent Literature 3). These framelets and the (above-mentioned narrow-sense) pinwheel framelet are hereinafter collectively called broad-sense pinwheel framelets. The "broad-sense pinwheel framelet" is a set of an approximate filter with no orientation and a plurality of detail filters with respective orientations, and is a filterbank having a degree. In other words, the pinwheel framelet, the simple pinwheel framelet introduced by Non Patent Literature 3, and the framelets obtained by modifying the filters of those framelets are called "broad-sense pinwheel framelets". The broad-sense pinwheel framelet is a two-dimensional framelet with orientation selectivity. The broad-sense pinwheel framelet has the property of being a filterbank that is capable of multiresolution decomposition, has a variety of orientation selectivity, and is constituted of finite-length filters. The pinwheel framelet differs from and has a better function than the simple pinwheel framelet in reflecting characteristics of human visual information processing in the brain more than the simple pinwheel framelet, and greatly differs from the simple pinwheel framelet in the method of construction.

A pinwheel wavelet frame (see Non Patent Literature 4) may be used in the present embodiment.

Figure 2:
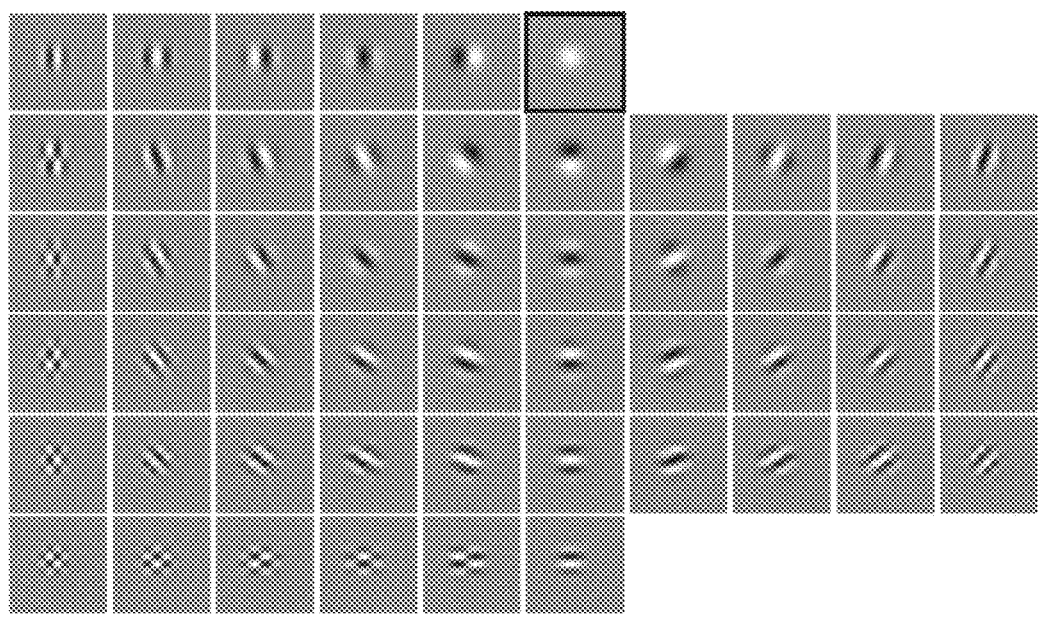
FIG. 2 is a diagram illustrating an example of filters obtained by calculating the cyclic correlation product of maximal overlap pinwheel framelet filters at level 3 of degree 5 and maximal overlap pinwheel framelet approximate filters at level 1 and level 2 of degree 5.

A pinwheel framelet is, for example, a mathematical model of information processing by simple cells in the human visual cortex. This decomposition is a mathematical model of signals decomposed by simple cells in the human brain. A pinwheel framelet has a degree that is an odd number of three or greater. The larger the degree, the more the orientations can be detected, which enables formation of various filters. A pinwheel framelet has a property where the number of filters increases and the calculation time increases as the degree increases. Moreover, the number of filters of a pinwheel framelet of degree n is, for example, $(n+1)+(n-1)^2$. Among them, one filter is an approximate filter and the remaining filters are detail filters. FIG. 2 illustrates filters obtained by calculating the cyclic correlation product of maximal overlap pinwheel framelet filters at level 3 of degree 5 and maximal overlap pinwheel framelet approximate filters at level 1 and level 2 of degree 5 (for example of the cyclic correlation product, see Hitoshi Arai, "Linear Algebra, Basics and Applications", Nippon hyoron sha Co., Ltd. (2006)). A pinwheel framelet is a model neuroscientifically closer to simple cells in V1 of the cerebral cortex than a simple pinwheel framelet.

Because the degree of this pinwheel framelet is 5, for example, as illustrated FIG. 2, the pinwheel framelet is composed of a set of 52 filters in total, i.e., 6×6 filters on the left side and 4×4 filters on the right side, for each level. Among them, one filter surrounded by a black rectangle in the central upper portion in FIG. 2 is a filter obtained by calculating the cyclic correlation product of the approximate filters from level 1 to level 3, and the other 51 filters are filters obtained by calculating the cyclic correlation product of the detail filters at level 3 and the approximate filters from level 1 to level 2. The orientations of the filters generated by the detail filters are arranged substantially in the direction in which a pinwheel rotates around the filter generated only from the approximate filters. As will be described later, maximal overlap multiresolution decomposition by using a pinwheel framelet of each degree has levels, and level 1 detects the finest portion (high frequency portion). FIG. 2 illustrates the pinwheel framelet at level 3, and approximate portions (low frequency portions) are detected as the level increases to 2, 3, . . . . The framelet file 106a may store wavelet frames with orientation selectivity, such as a pinwheel framelet, in the form of a function (such as a frequency response function of framelet filters). A specific example of the function will be described later.

Various wavelets may be used in the present embodiment without being limited to the above. In the present embodiment, in order to increase and reduce a variety of frequency components and a variety of orientation components, the broad-sense pinwheel framelet or the pinwheel wavelet frame having a variety of frequency characteristics and a variety of orientations is preferably used. The wavelet is not limited to a classical wavelet, a wavelet in a narrow sense, or the like and includes a wavelet in a broad sense. For example, the wavelet is a finite-length waveform or a wave-like oscillation with an amplitude that amplifies from zero and quickly converges to zero, and, for example, includes pseudo wavelets, such as a Gabor filter and a curvelet. Moreover, the framelet file 106a may store a filter group, such as a filterbank with orientation selectivity, and filters with orientations without being limited to a frame, such as a wavelet frame with orientation selectivity. Filters with respective orientations are, as an example, a plurality of detail filters with respective orientations, and components such as subband signals are extracted by the filters. While the pinwheel wavelet frame is such that the length of the filters constituting the frame changes in accordance with the number of pixels of the original image, the broad-sense pinwheel framelet has a property where the length of the filters is independent of the number of pixels. For example, the pinwheel framelet is a two-dimensional framelet with orientation selectivity and is one type of a wavelet frame. Applicable framelets are not limited to a pinwheel framelet with multidirectional orientations, and a biorthogonal wavelet filterbank may be used, of which orientations include the horizontal, the vertical and the diagonal directions.

The image data file 106b is an image data storing unit that stores image data. The image data stored in the image data file 106b may be image data in which, for example, a color tone and a tone level value are described in advance for each color component, or may be image data that is not described using color components covered in the present embodiment. In the latter case, the image data is converted into that in a desired color space, and decomposed into respective color components by a color space conversion unit 102f to be described later. The image data stored in the image data file 106b may be image data input via the input device 112 or may be image data received from an external system 200 or the like via a network 300. Moreover, the image data may be image data for a color image or may be grayscale image data. An image (data) before being subjected to multiresolution decomposition by wavelet frames with orientation selectivity, such as a pinwheel framelet, is referred to as the original image (data), and an image (data) after being reconstructed on the basis of subband signals is referred to as a reconstructed image (data). An image (data) obtained by processing the subband signals in a decomposition phase of the multiresolution decomposition, or an image (data) reconstructed by summing the subband signals in a synthesis phase of the multiresolution decomposition is called a processed image (data). Specifically, the latter processed image (data) is one form of the reconstructed image (data), but the former processed image (data) is not a reconstructed image (data). To clarify the distinction between the two, the former processed image (data) may be called a "coefficient output processed image (data)", and the latter processed image (data) may be called a "reconstruction processed image (data)" in the following description. The image data file 106b may store, as image data, a unit impulse signal for an image size (the number of pixels) that is the same as that of the image data for the target original image. The unit impulse signal stored in the image data file 106b is input to the filterbank stored in the framelet file 106a as image data in a similar manner and the output unit impulse response is used for high-speed calculation of the image data for the target original image. The image data is, for example, two-dimensional image data in a raster format or a vector format. The image may be any image representing, for example, a design, a photograph, or characters. The image is not limited to a static image, but may be a dynamic image (video).

Here the description returns to FIG. 1 again. The input/output control interface unit 108 controls the input device 112 and the output device 114. As the output device 114, a display device, such as a monitor (including a home television), a printing device, such as a printer, and the like can be used. Moreover, as the input device 112, a keyboard, a mouse, a microphone, or the like can be used in addition to an imaging device, such as a camera, an input device connected to an external storage medium, and the like.

In FIG. 1, the control unit 102 includes an internal memory for storing a control program, such as an operating system (OS), a program defining various processing procedures and the like, and required data. The control unit 102 performs information processing for performing various types of processing using, for example, these programs. The control unit 102 includes a decomposing unit 102a, a processed image acquiring unit 102c, a color space conversion unit 102f, and a processed image output unit 102g, from the functional concept perspective. The decomposing unit 102a further includes a coefficient processing unit 102b. The processed image acquiring unit 102c further includes a reconstructing unit 102d.

Figure 3:
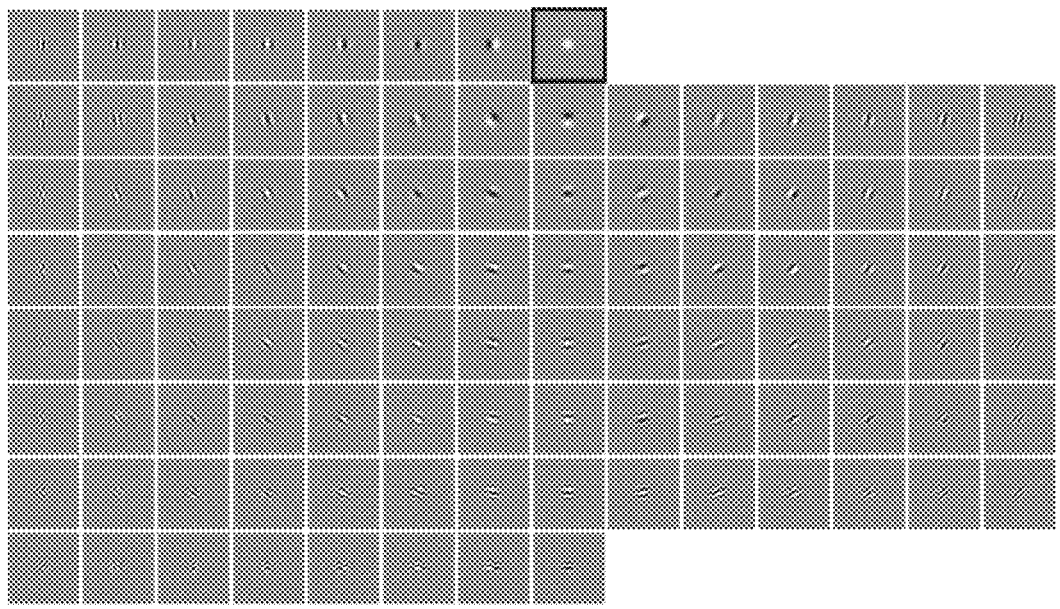
FIG. 3 is a diagram illustrating filters obtained by calculating the cyclic correlation product of maximal overlap pinwheel framelet filters at level 2 (high-frequency side) of degree 7 and a maximal overlap pinwheel framelet approximate filter at level 1.
Figure 4:
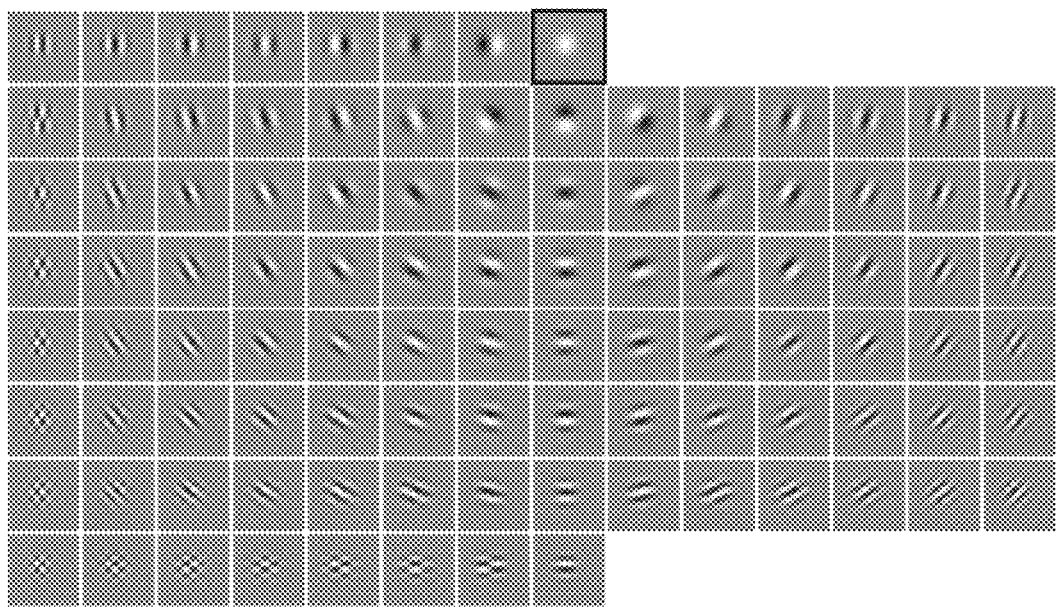
FIG. 4 is a diagram illustrating filters obtained by calculating the cyclic correlation product of maximal overlap pinwheel framelet filters at level 3 (low-frequency side) of degree 7 and maximal overlap pinwheel framelet approximate filters at level 1 and level 2.

Among them, the decomposing unit 102a is a decomposing unit that obtains subband signals by performing multiresolution decomposition on image data by using wavelet frames with orientation selectivity, such as a broad-sense pinwheel framelet, or filterbanks with orientation selectivity stored in the framelet file 106a. The subband signals are grouped into two types, that is, the subband signals in the decomposition phase of the multiresolution decomposition and the subband signals in the synthesis phase of the multiresolution decomposition. To clarify the distinction between the two types, the subband signals in the decomposition phase may be called "decomposition subband signals", and the subband signals in the synthesis phase may be called "synthesis subband signals" in the following description. The "multiresolution decomposition" includes maximal overlap multiresolution decomposition, maximally decimated multiresolution decomposition, and partially decimated and partially overlap multiresolution decomposition (for example of maximal overlap multiresolution decomposition, see Hitoshi Arai, "Wavelet", Kyoritsu Shuppan Co., Ltd. (2010)). When multiresolution decomposition is calculated by the decomposing unit 102a, the cyclic correlation product and the cyclic convolution product are used; however, it may be calculated by a well-known high-speed calculation method in which a fast Fourier transform is used. As described above, multiresolution decomposition by wavelet frames with orientation selectivity, such as a pinwheel framelet, has levels. FIG. 3 and FIG. 4 are diagrams for showing the difference depending on the level of a pinwheel framelet. FIG. 3 illustrates filters obtained by calculating the cyclic correlation product of maximal overlap pinwheel framelet filters at level 2 (high frequency side) and a maximal overlap pinwheel framelet approximate filter at level 1. FIG. 4 illustrates filters obtained by calculating the cyclic correlation product of maximal overlap framelet filters at level 3 (low frequency side) and maximal overlap pinwheel framelet approximate filters at level 1 and level 2. Because the degree of both of them is 7, the number of filters is $(7+1)^2+(7-1)^2=100$.

As an example, the decomposing unit 102a first detects the finest portion (high frequency portion) by maximal overlap multiresolution decomposition by using a pinwheel framelet at level 1 and detects approximate portions (low frequency portions) as the level increases to 2, 3, . . . .

Multiresolution decomposition by pinwheel framelets includes a decomposition phase and a synthesis phase. Each phase is composed of a filterbank composed of approximate filters and detail filters. After performing the image processing in the decomposition phase and the synthesis phase, the decomposing unit 102a finally decomposes the original image data into image signals (specifically, synthesized subband signals) of the number which is "the number of filters× levels".

For example, in the case of maximal overlap multiresolution decomposition of 5 levels by using a pinwheel framelet of degree 7, the subband signals at a certain level k (k=1 to 5) include 1 approximate part corresponding to 1 approximate filter and 99 detail parts corresponding to 99 detail filters. FIG. 5 is a diagram in which the approximate part is represented by $a_k(1)$ and the detail parts are represented by symbols (numbers) of $d_k(1)$ to $d_k(99)$ in the pinwheel framelet at level k of degree 7. The position of the symbol (number) is associated with the position of each filter in FIG. 3 (k=2) or FIG. 4 (k=3). In other words, $a_k(1)$ and $d_k(1)$ to $d_k(99)$ represent the subband signals obtained by the filters at the corresponding positions in FIG. 3 or FIG. 4.

The coefficient processing unit 102b of the decomposing unit 102a is a processing unit that performs attenuation or amplification of the subband signal (that is, the decomposition subband signal) in the decomposition phase of the multiresolution decomposition, the subband signal corresponding to at least one of a plurality of filters. For example, the coefficient processing unit 102b may perform linear or non-linear coefficient processing on the decomposition subband signal. As an example, the coefficient processing unit 102b may perform threshold processing by hard thresholding or soft thresholding. Alternatively, the coefficient processing unit 102b may attenuate or amplify the decomposition subband signal corresponding to at least one of the filters that have predetermined frequency characteristics and/or predetermined orientations. The predetermined frequency characteristics may be specified according to a position in a predetermined filter arrangement based on an orientation at each level of the broad-sense pinwheel framelet and/or by a level in the multiresolution decomposition. The decomposition subband signals are broadly classified into two types, that is, decomposition subband signals based on decomposition detail coefficients and decomposition subband signals based on decomposition approximation coefficients. The coefficient processing unit 102b may perform the coefficient processing on the decomposition detail coefficient and/or the decomposition approximation coefficient output from the decomposition phase. The "decomposition detail coefficient" refers to a coefficient obtained by filtering with a decomposition detail filter in the decomposition phase, and the "decomposition approximation coefficient" refers to a coefficient obtained by filtering with a decomposition approximate filter. Of the subband signals in the decomposition phase by the broad-sense pinwheel framelet, subband signals that are constituted of the approximation coefficients may be called "approximation subband signals in the decomposition phase", and the other subband signals may be called "detail subband signals in the decomposition phase". The following table is a list that lists terms along the progression of the image processing from the original image. The same terms apply to a case in which the wavelet frame with orientation selectivity or the filterbank with orientation selectivity is used instead of the broad-sense pinwheel framelet.

TABLE

[Term List]

Original image
↓ <decomposition phase>
Subband signal in decomposition phase (decomposition subband signal)
    Detail coefficient output from decomposition phase (decomposition detail coefficient)
    Approximation coefficient output from decomposition phase (decomposition approximation coefficient)
↓ <Various processes>
↓ → Processed image (coefficient output processed image)
↓ <Synthesis phase>
Subband signal in synthesis phase (synthesis subband signal)
    Detail coefficient output from synthesis phase
    Approximation coefficient output from synthesis phase
↓ <Reconstruction>
Processed image (reconstruction processed image)

As an example of the nonlinear coefficient processing, the coefficient processing unit 102b may perform the coefficient processing so as to reduce values having small absolute values to be smaller in absolute value as the energy of the decomposition detail coefficients constituting the decomposition subband signals is larger, and so as to further enhance values having small absolute values as the energy of the decomposition detail coefficients is smaller. As an example, between the decomposition phase and the synthesis phase in the multiresolution decomposition, the coefficient processing unit 102b performs the coefficient processing on the decomposition detail coefficients output from the decomposition phase so as to reduce values having small absolute values to be smaller in absolute value as the energy of the decomposition detail coefficients is larger, and so as to further enhance values having small absolute values as the energy of the decomposition detail coefficients is smaller. For example, if the energy of the decomposition detail coefficients is large, the coefficient processing unit 102b enhances values having relatively large absolute values to be larger in absolute value while reducing values having relatively small absolute values to be smaller in absolute value by increasing the dispersion of the decomposition detail coefficients. If, instead, the energy of the decomposition detail coefficients is small, the coefficient processing unit 102b reduces values having relatively large absolute values while enhancing values having relatively small absolute values by reducing the dispersion of the decomposition detail coefficients.

In the case of an image having a large number of pixels, the image may appropriately be divided, and the processing of the present embodiment may be performed on the divided images.

In the coefficient processing such as function processing and/or an energy calculation, the coefficient processing unit 102b may normalize the decomposition detail coefficients so that the values of the decomposition detail coefficients can easily be processed. For example, between the decomposition phase and the synthesis phase, the coefficient processing unit 102b may first obtain absolute values of the decomposition detail coefficients, then normalize the absolute values, and obtain the squared norm (or may obtain another norm) of the thus normalized decomposition detail coefficients (called the "normalized decomposition detail coefficients") as the energy. The coefficient processing unit 102b may then perform the coefficient processing on the normalized decomposition detail coefficients based on the calculated energy, and perform the inverse operation of the normalization on the normalized decomposition detail coefficients that have been processed by the coefficient processing so as to obtain input data to the synthesis phase. If the absolute values have been used, each sign is restored in the inverse operation as given by the following expression.

$$x' = sgn(x)z'$$

(where x is the decomposition detail coefficient, z is the value after the coefficient processing, and z' is the value of the result of the inverse operation of normalization; if x≥0, sgn(x)=1, or if x<0, sgn(x)=−1; and x' is a value resulting from restoration of the sign.)

To perform the coefficient processing based on the amounts of energy, the coefficient processing unit 102b may provide thresholds for the energy values and perform coefficient processing that differs depending on which range the energy value falls in, or may perform the coefficient processing by performing a calculation using a function by which the dispersion continuously changes according to the amount of the energy, without providing thresholds for the energy value. In the former case, the coefficient processing unit 102b may use, for example, a function (such as a logit function or a logistic function) set for each range of the energy value. In the latter case, the coefficient processing unit 102b may perform the coefficient processing using, for example, a function that continuously changes into an S-shaped curve when the energy of the decomposition detail coefficients is large and an N-shaped curve when the energy of the decomposition detail coefficients is small (which is called an "SN function"). An example of the SN function is given below. Equation 1 gives an S-shaped curve if α>1, a straight line if α=1, or an N-shaped curve if α<1.

$$z = y^\alpha / \{y^\alpha + (1-y)^\alpha\} \qquad \text{Equation 1}$$

(where y is the normalized decomposition detail coefficient (0≤y≤1), α is an indicator based on the energy of the normalized decomposition detail coefficients (0<α), and z is the normalized decomposition detail coefficient processed by the function.) The function may be discretized so as to be used in a tabular form.

The coefficient processing unit 102b may perform the coefficient processing color component by color component when L*, a*, and b* in a CIELAB color space are used, for example. The coefficient processing unit 102b is not necessarily limited to separately processing the value of each color component, and may correct the coefficient processing based on values of other color components when performing the coefficient processing of one color component. For example, there is a neuroscientific experimental result on human vision (Non Patent Literature 5) that a cerebral cortex has color-luminance cells. By formulating a mathematical model that estimates roles of the color-luminance cells based on the experimental result, the coefficient processing unit 102b may perform the coefficient processing that has been corrected with respect to the color component(s) of a* and/or b* of image data so as to reduce values having small absolute values to be smaller in absolute value as the energy determined by the decomposition detail coefficient(s) of a* and/or b* and the decomposition detail coefficient in L* is larger, and so as to further enhance values having small absolute values as the above-mentioned energy is smaller. The coefficient processing unit 102b can also perform different processing according to differences in sign among the decomposition detail coefficients. The coefficient processing unit 102b may perform the coefficient processing that has been corrected with respect to the color component(s) of a* and/or b* of image data so as to further enhance values having small absolute values as the difference in lightness represented by L* is larger.

Besides such image sharpening, the coefficient processing unit 102b may perform the image processing by performing weighting that attenuates or amplifies the decomposition subband signal corresponding to the filters having the predetermined frequency characteristics (specified particular frequency characteristics) and/or the predetermined orientations (specified particular orientations). The coefficient processing unit 102b may weight and sum the decomposition subband signals obtained by the decomposing unit 102a, or may weight the frequency response functions of the framelet filters stored in functional forms, and thereafter, may derive respective filter coefficients, or may apply multiplication and addition to the weighted frequency response functions using a certain method to obtain the filter coefficients and store the filter coefficients in the framelet file 106a so as to be able to quickly obtain the reconstructed image data. The coefficient processing unit 102b may also weight the filters in the decomposition phase and/or the synthesis phase.

As an example, the coefficient processing unit 102b may perform weighting so as to obtain predetermined frequency components by specifying the predetermined frequency characteristics according to a position in a predetermined filter arrangement based on an orientation at each level of the broad-sense pinwheel framelet, and/or according to a level in the multiresolution decomposition. For example, the coefficient processing unit 102b may perform the image processing, such as removing low frequency components, by performing weighting that relatively attenuates decomposition subband signals corresponding to approximate filters at a predetermined level in the multiresolution decomposition. For this processing, assuming that the decomposing unit 102a performs the multiresolution decomposition up to the predetermined level, the coefficient processing unit 102b may perform weighting that relatively attenuates subband signals in the approximate part obtained by an approximate filter at the maximum level. Not limited to this, in the case in which the decomposing unit 102a performs the multiresolution decomposition up to a level higher than the predetermined level, the coefficient processing unit 102b may perform weighting that relatively attenuates detail parts at levels higher than the predetermined level and the approximate part at the maximum level.

The coefficient processing unit 102b may perform the image processing so as to obtain high-frequency components more than low-frequency components by performing weighting that relatively amplifies decomposition subband signals corresponding to detail filters on the side farther from the approximate filter in the filter arrangement, among a plurality of filters, and relatively attenuates decomposition subband signals corresponding to the approximate filter and detail filters on the side nearer to the approximate filter in the filter arrangement, among a plurality of filters. More specifically, weighting factors may be set to values close to zero for the decomposition detail coefficients of the decomposition subband signals corresponding to the approximate filter of the above-described pinwheel framelet and for the decomposition subband signals corresponding to the detail filters that are positioned nearer to the approximate filter and have low-frequency-side frequency characteristics, and weighting factors may be set to values close to one for the decomposition subband signals corresponding to the detail filters that are positioned farther from the approximate filter and have high-frequency-side frequency characteristics. Conversely, the coefficient processing unit 102b may perform the image processing so as to obtain low-frequency components more than high-frequency components. In other words, the coefficient processing unit 102b may perform the image processing to enhance the low-frequency components more than the high-frequency components by performing weighting that relatively attenuates decomposition subband signals corresponding to the detail filters on the side farther from the approximate filter in the filter arrangement, among a plurality of detail filters, and relatively amplifies decomposition subband signals corresponding to the detail filters on the side nearer to the approximate filter in the filter arrangement, among a plurality of detail filters. More specifically, weighting factors may be set to values close to one for the decomposition subband signals corresponding to the detail filters that are positioned nearer to the approximate filter of the above-described pinwheel framelet and have the low-frequency-side frequency characteristics, and weighting factors may be set to values close to zero for the decomposition subband signals corresponding to the detail filters that are positioned farther from the approximate filter and have the high-frequency-side frequency characteristics.

The coefficient processing unit 102b may perform the image processing to enhance medium-frequency components more than high-frequency components and low-frequency components by performing weighting that relatively attenuates decomposition subband signals corresponding to filters having high-frequency frequency characteristics and filters having low-frequency frequency characteristics, among a plurality of filters, and relatively amplifies decomposition subband signals corresponding to filters having medium-frequency frequency characteristics, such as relatively high-frequency and relatively low-frequency frequency characteristics, among a plurality of filters. More specifically, weighting factors may be set to values close to zero for the decomposition subband signals corresponding to the filters of the above-described pinwheel framelet that have the high-frequency frequency characteristics and the filters of the above-described pinwheel framelet that have the low-frequency frequency characteristics, and weighting factors may be set to values close to one for the decomposition subband signals corresponding to the detail filters that have the medium-frequency frequency characteristics.

The coefficient processing unit 102b may perform the image processing so as to raise or lower components having predetermined orientations by performing weighting that attenuates or amplifies the decomposition subband signals corresponding to the detail filters having the predetermined orientations. For example, the components having the predetermined orientations can be enhanced in or extracted from the original image by setting the weighting factors to values close to one for the decomposition subband signals corresponding to the detail filters of the above-described pinwheel framelet that have the predetermined orientations, and setting the other weighting factors to values close to zero.

The processed image acquiring unit 102c is a processed image acquiring unit that acquires processed image data. The processed image acquiring unit 102c may acquire, for example, coefficient output processed image data based on the subband signals in the decomposition phase of the multiresolution decomposition that have been acquired by the decomposing unit 102a. When acquiring the coefficient output processed image data, the processed image acquiring unit 102c may sum the decomposition subband signals after the coefficient processing with appropriate weights. The processed image acquiring unit 102c may acquire reconstruction processed image data that has been reconstructed by summing the synthesis subband signals in the synthesis phase of the multiresolution decomposition through processing by the reconstructing unit 102d to be described later.

Moreover, the reconstructing unit 102d in the processed image acquiring unit 102c is a reconstructing unit that obtains reconstructed image data by reconstructing an image by summing the subband signals of the respective color components obtained by the decomposing unit 102a. For example, the reconstructing unit 102d obtains reconstructed image data by reconstructing an image by summing the synthesized subband signal of the approximate part corresponding to the approximate filter at the maximum level described above and the synthesized subband signals of the detail parts corresponding to all the detail filters. At this point, because the pinwheel framelet has a perfect reconstruction property, if the coefficient processing unit 102b does not perform any processing, the reconstructing unit 102d reproduces an image that is the same as the original image. In other words, after the coefficient processing is performed by processing by the coefficient processing unit 102b, the reconstructing unit 102d sums the synthesis subband signals to obtain the reconstructed image data with data obtained by performing image processing on the original image.

The relation between the perfect reconstruction property and the image processing will be described using the symbols (numbers) described above for the synthesized subband signals. The perfect reconstruction property of maximal overlap multiresolution decomposition at level 5 with pinwheel framelets of degree 7 is expressed by the following equation:

$$x = a_5(1) + (d_5(1) + \ldots + d_5(99)) + \ldots + (d_1(1) + \ldots + d_1(99))$$

where x is the input signal (original signal) of the original image.

Let's denote the approximate part and the detail parts that have undergone the various processes by the coefficient processing unit 102b in the decomposing unit 102a as $a_5'(1)$ and $d_5'(1), \ldots,$ and $d_1'(99)$, respectively. In this case, the reconstructed image (signal) is expressed by the following expression.

$$y = a_5'(1) + (d_5'(1) + \ldots + d_5'(99)) + \ldots + (d_1'(1) + \ldots + d_1'(99))$$

At this point, if the various processes have not been performed in the decomposing unit 102a, it yields $a_5'(1) = a_5(1)$, and $d_5'(1) = d_5(1), \ldots,$ and $d_1'(99) = d_1(99)$. Thus, it is clear that x=y (the original image and the reconstructed image data are the same), which indicates a perfect reconstruction. In the present embodiment, as an example, the coefficient processing unit 102b generates the reconstructed image (that is, the reconstruction processed image) that is not the same as the original image by setting the weighting factors for the subband signals corresponding to the filters that have the predetermined frequency characteristics and/or the predetermined orientations to values that are not 1.

Classification of the detail filters will be described. The detail filters can be classified into five types on the basis of their orientation. Specifically, if the axis orthogonal to a certain direction is referred to as the "orthogonal axis", the detail filters can be classified into five types, i.e., (1) a detail filter with an orientation in the same direction as the orthogonal axis, (2) a detail filter with an orientation in the direction vertical to the orthogonal axis, (3) a detail filter with an orientation that is at a positive angle relative to the orthogonal axis, (4) a detail filter with an orientation that is at a negative angle relative to the orthogonal axis, and (5) a detail filter whose orientation is not uniquely defined. The angle θ relative to the orthogonal axis of the direction is represented by $-90° < \theta \leq +90°$, where the counterclockwise direction is defined as the positive direction. The detail filter with an orientation horizontal or vertical to the orthogonal axis ($\theta = 0°$, 90°) is classified as (1) or (2) and therefore is not classified as (3) or (4). Moreover, the "(5) detail filter whose orientation is not uniquely defined" includes orientations at both a positive angle and a negative angle, the absolute values of which relative to the orthogonal axis are the same; therefore, this detail filter is not classified as (3) or (4).

Assuming that a certain direction is the longitudinal direction, for example, in the example in FIG. 5, the subband signals corresponding to the "(1) detail filter with an orientation in the same direction as the orthogonal axis" are $d_k(15)$, $d_k(23)$, $d_k(31)$, $d_k(39)$, $d_k(47)$, $d_k(55)$, and $d_k(63)$. The subband signals corresponding to the "(2) detail filter with an orientation in the direction vertical to the orthogonal axis" are $d_k(1)$ to $d_k(7)$. The subband signals corresponding to the "(3) detail filter with an orientation that is at a positive angle relative to the orthogonal axis" are $d_k(64)$ to $d_k(99)$. The subband signals corresponding to the "(4) detail filter with an orientation that is at a negative angle relative to the orthogonal axis" are $d_k(9)$ to $d_k(14)$, $d_k(17)$ to $d_k(22)$, $d_k(25)$ to $d_k(30)$, $d_k(33)$ to $d_k(38)$, $d_k(41)$ to $d_k(46)$, and $d_k(49)$ to $d_k(54)$. The subband signals corresponding to the "(5) detail filter whose orientation is not uniquely defined" are $d_k(8)$, $d_k(16)$, $d_k(24)$, $d_k(32)$, $d_k(40)$, $d_k(48)$, and $d_k(56)$ to $d_k(62)$.

The detail filters can also be characterized by frequency characteristics thereof. Specifically, the detail filters spread from the approximate part concentrically with the approximate filter of the pinwheel framelet at the center, and have a characteristic that allows higher-frequency components to pass at a larger distance from the center and allows lower-frequency components to pass at a smaller distance from the center. In other words, the detail filters on the side farther from the approximate filter in the filter arrangement of the pinwheel framelet obtain the subband signals of the higher-frequency components, and the detail filters on the side nearer to the approximate filter in the filter arrangement of the pinwheel framelet obtain the subband signals of the lower-frequency components.

In the example of FIG. 5, the subband signals corresponding to the detail filters having the lowest-frequency-side frequency characteristics are $d_k(7)$, $d_k(14)$, $d_k(15)$, and $d_k(64)$. The subband signals corresponding to the detail filters having the second-lowest-frequency-side frequency characteristics are $d_k(6)$, $d_k(13)$, $d_k(21)$ to $d_k(23)$, $d_k(65)$, $d_k(70)$, and $d_k(71)$. The subband signals corresponding to the detail filters having the third-lowest-frequency-side frequency characteristics are $d_k(5)$, $d_k(12)$, $d_k(20)$, $d_k(28)$ to $d_k(31)$, $d_k(66)$, $d_k(72)$, and $d_k(76)$ to $d_k(78)$. The subband signals corresponding to the detail filters having the fourth-lowest-frequency-side (relatively medium-frequency-side) frequency characteristics are $d_k(4)$, $d_k(11)$, $d_k(19)$, $d_k(27)$, $d_k(35)$ to $d_k(39)$, $d_k(67)$, $d_k(73)$, $d_k(79)$, and $d_k(82)$ to $d_k(85)$. The subband signals corresponding to the detail filters having the fifth-lowest-frequency-side (relatively high-frequency-side) frequency characteristics are $d_k(3)$, $d_k(10)$, $d_k(18)$, $d_k(26)$, $d_k(34)$, $d_k(42)$ to $d_k(47)$, $d_k(68)$, $d_k(74)$, $d_k(80)$, $d_k(86)$, and $d_k(88)$ to $d_k(92)$. The subband signals corresponding to the detail filters having the sixth-lowest-frequency-side (relatively high-frequency-side) frequency characteristics are $d_k(2)$, $d_k(9)$, $d_k(17)$, $d_k(25)$, $d_k(33)$, $d_k(41)$, $d_k(49)$ to $d_k(55)$, $d_k(69)$, $d_k(75)$, $d_k(81)$, $d_k(87)$, $d_k(93)$, and $d_k(94)$ to $d_k(99)$. The subband signals corresponding to the detail filters having the seventh-lowest-frequency-side (highest-frequency-side) frequency characteristics are $d_k(1)$, $d_k(8)$, $d_k(16)$, $d_k(24)$, $d_k(32)$, $d_k(40)$, $d_k(48)$, and $d_k(56)$ to $d_k(63)$.

Besides this classification, the detail filters having uniquely defined orientations are classified according to the forms thereof into: even filters, each of which is nearly symmetric with respect to the axis in the direction of the orientation of the filter; and odd filters, each of which is nearly antisymmetric with respect to the axis in the direction of the orientation. The approximate filter is an even filter, which is nearly symmetric with respect to the vertical axis and the horizontal axis.

The above is the explanation of the classification of the detail filters.

Here the description returns to FIG. 1 again. The color space conversion unit 102f is a color space conversion unit that performs conversion of the color space, decomposition and synthesis of the color components, and the like. For example, if the image data stored in the image data file 106b is color image data, and the data is not described using the color components used in the present embodiment, the color space conversion unit 102f may convert the image data into that in an intended color space (such as the CIELAB color space), for example, in the case of performing the color image sharpening by the decomposing unit 102a. As a result of the conversion into the CIELAB color space, the image is decomposed into three color components, i.e., L* (brightness), a* (red-green), and b* (yellow-blue). The color space conversion unit 102f may convert the color space to other color spaces other than the CIELAB color space. An advantage of using the CIELAB color space is that a conversion similar to a conversion of visual information from the human retina is obtained. If the image data is described in advance using, for example, a color tone and a tone level value for each of the color components used in the present embodiment, the color space conversion unit 102f need not perform the processing related to the color space. If necessary, the color space conversion unit 102f performs, for example, synthesis of the color components, conversion of the color space, scale conversion of lightness and color, in the image data reconstruction processing by the reconstructing unit 102d.

The processed image output unit 102g is a processed image output unit that outputs the processed image data (the coefficient output processed image data or the reconstruction processed image data) acquired by the processed image acquiring unit 102c to the output device 114. For example, the processed image output unit 102g may output the processed image for display to a display device, such as a monitor, or may output the processed image for printing to a printing device such as a printer to produce a printing medium, or may produce a recording medium by outputting the processed image to a recording medium storage device and storing the processed image in the recording medium. The medium that is a printing target may be, for example, paper, a plastic, glass, metal, or the like, or may be in the form of, for example, a flyer, a fan, a card, a picture book, a New Year's card, a Christmas card, a business card, a container such as a can, or the like. The processed image output unit 102g may change the design (for example, the size is changed to postcard size or the like) depending on its intended use according to the output form. Moreover, the processed image output unit 102g may transmit processed image data to the external system 200 via the network 300.

In other words, the image processing apparatus 100 may be communicatively connected to the network 300 via a communication device, such as a router, and a wired or wireless communication line, such as a dedicated line. In FIG. 1, the communication control interface unit 104 performs communication control between the image processing apparatus 100 and the network 300 (or a communication device, such as a router). In other words, the communication control interface unit 104 is an interface connected to a communication device (not shown), such as a router, connected to a communication line or the like, and has a function of performing data communication with other terminals via communication lines. In FIG. 1, the network 300 has a function of mutually connecting the image processing apparatus 100 and the external system 200 and is, for example, the Internet or the like.

In FIG. 1, the external system 200 is mutually connected to the image processing apparatus 100 via the network 300 and may have a function of providing a program for causing an external database relating to image data or a pinwheel framelet or a computer to function as the image processing apparatus. The external system 200 may be configured as a WEB server, an ASP server, or the like. Moreover, the hardware configuration of the external system 200 may be composed of an information processing apparatus, such as commercially available workstation and personal computer, and accessory devices thereof. The functions of the external system 200 are realized by a CPU, a disk device, a memory device, an input device, an output device, a communication control device, and the like in the hardware configuration of the external system 200, programs for controlling these devices, and the like.

This is the end of the explanation of the configuration of the image processing apparatus 100 according to the present embodiment.

[Processing by Image Processing Apparatus 100]

The following describes an example of the processing by the image processing apparatus 100 according to the present embodiment configured as described above, with reference to FIG. 6 to FIG. 57.

[Basic Processing]

Figure 6:
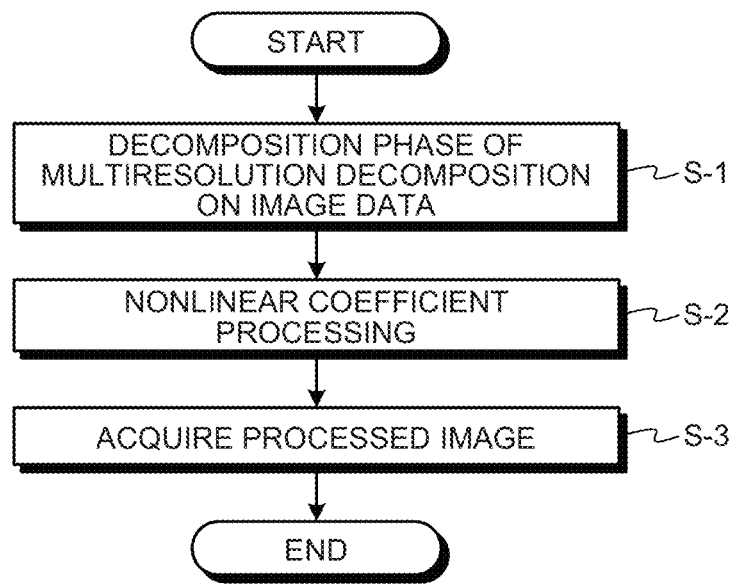
FIG. 6 is a flowchart illustrating an example of basic processing by an image processing apparatus 100 in the embodiment.

First, the basic processing as an example of the image processing performed by the image processing apparatus 100 will be described with reference to FIG. 6 to FIG. 8. FIG. 6 is a flowchart illustrating one example of the basic processing performed by the image processing apparatus 100 in the present embodiment.

First, the decomposing unit 102a obtains subband signals by performing maximal overlap multiresolution decomposition by using the broad-sense pinwheel framelets or pinwheel wavelet frames stored in the framelet file 106a on the image data stored in the image data file 106b (Step S-1). FIG. 7 and FIG. 8 are diagrams illustrating one example of the filterbanks in the decomposition phase and the synthesis phase (without/with processing) of multiresolution decomposition with pinwheel framelets. The numbers in FIG. 8 indicate levels. "PW" indicates a detail filter. "A" indicates an approximate filter.

Figure 7:
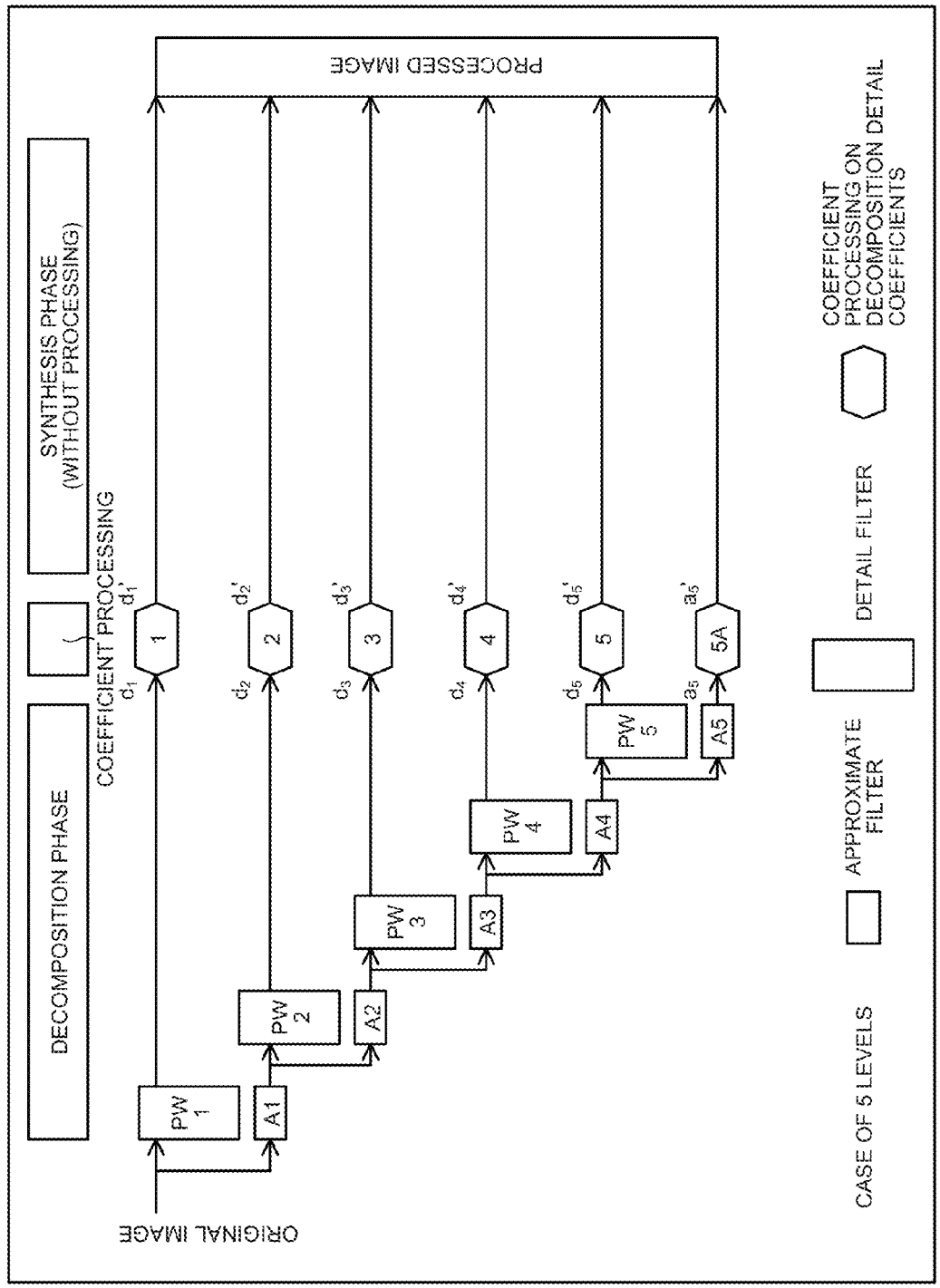
FIG. 7 is a diagram illustrating an example of filterbanks for maximal overlap multiresolution decomposition.
Figure 8:
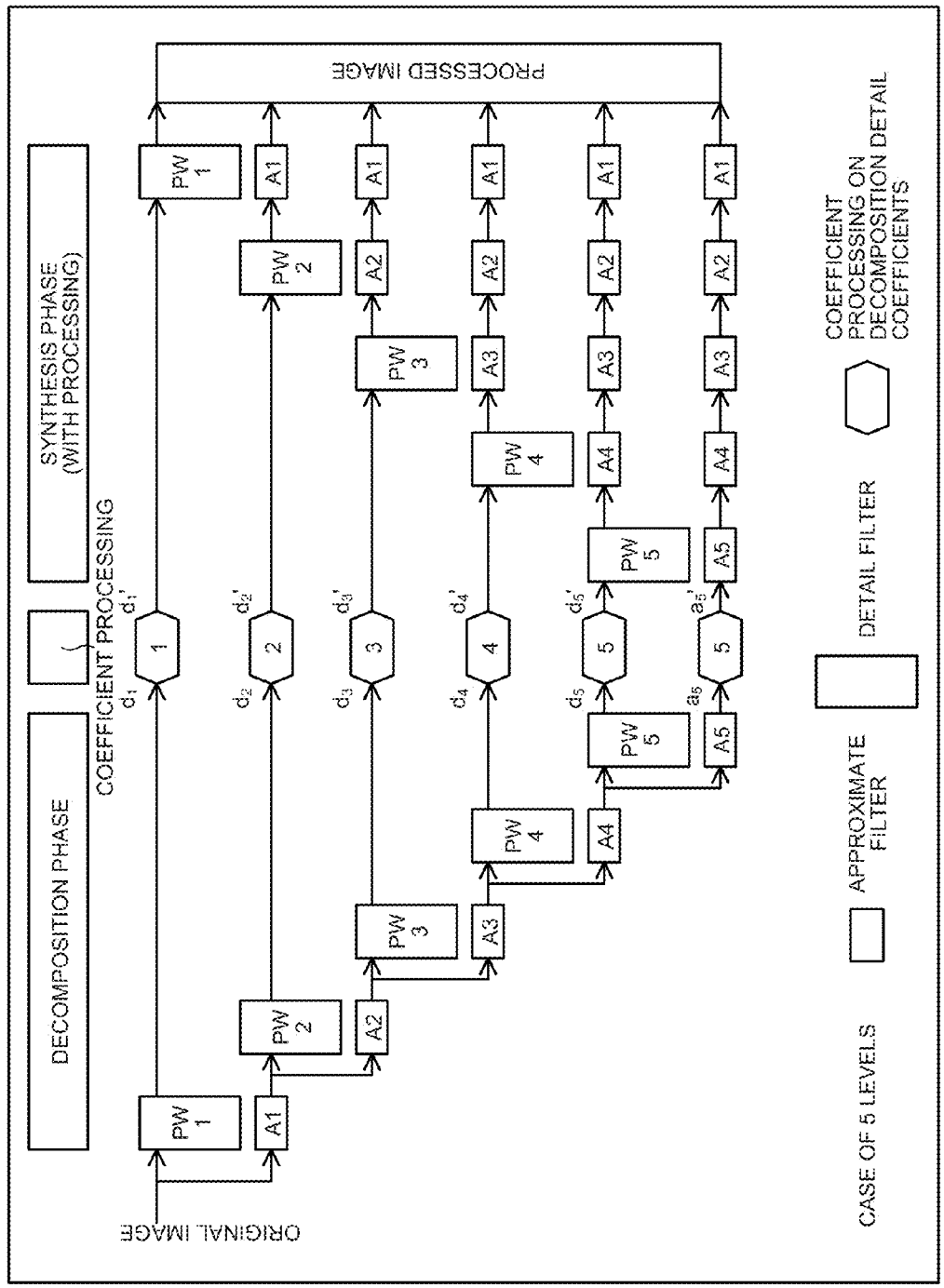
FIG. 8 is a diagram illustrating another example of the filterbanks for the maximal overlap multiresolution decomposition.

As illustrated in FIG. 7 and FIG. 8, first, the decomposing unit 102a decomposes the original image as an input signal into a decomposition subband signal (a signal represented by a decomposition detail coefficient $d_1$) that passes the detail filter PW1 and a signal that passes one approximate filter A1 by using the pinwheel framelet at level 1. Next, the decomposing unit 102a decomposes the signal that has passed the approximate filter A1 at level 1 into a decomposition subband signal (a decomposition detail coefficient $d_2$) that passes the detail filter PW2 at level 2 and a signal that passes an approximate filter A2 at level 2 by using the pinwheel framelet at level 2. The decomposing unit 102a repeats this processing until the level reaches a maximum level k (in the case of FIGS. 7 and 8, level 5), and obtains decomposition detail coefficients $d_1$ to $d_k$ and a decomposition approximation coefficient $a_k$ by a decomposition subband signal that has passed through an approximate filter $A_k$ at the maximum level k. Then, the decomposing unit 102a performs the various processes on the decomposition subband signals to obtain decomposition detail coefficients $d_1'$ to $d_5'$ and a decomposition approximation coefficient $a_5'$.

In other words, as illustrated in FIGS. 7 and 8, the coefficient processing unit 102b of the decomposing unit 102a performs the various processes, such as linear or nonlinear coefficient processing, to relatively attenuate or amplify the decomposition subband signals corresponding to at least one of a plurality of filters of the filterbank (Step S-2). Here, as an example, the coefficient processing unit 102b may perform the threshold processing by hard thresholding or soft thresholding. The coefficient processing unit 102b may attenuate or amplify the decomposition subband signals corresponding to at least one of the filters that have the predetermined frequency characteristics and/or the predetermined orientations among a plurality of filters. For example, the coefficient processing unit 102b may perform image processing of increasing or reducing predetermined frequency components by increasing or reducing predetermined decomposition subband signals specified by a position in a predetermined filter arrangement based on an orientation at each level of the broad-sense pinwheel framelet or the pinwheel wavelet frame, and/or by a level in the multiresolution decomposition. As an example, the coefficient processing unit 102b may perform the coefficient processing on the decomposition detail coefficients and/or the decomposition approximation coefficient output from the decomposition phase that form the decomposition subband signals. In other words, the coefficient processing unit 102b may increase or reduce the approximation subband signals in the decomposition phase, and/or increase or reduce the detail subband signals in the decomposition phase.

Then, the processed image acquiring unit 102c acquires the processed image data (the coefficient output processed image data or the reconstruction processed image data) to which the various processes have been applied at Step S-2 (Step S-3). In the example of FIG. 7, the processed image acquiring unit 102c may acquire the processed image data as the coefficient output processed image data, without entering, into the synthesis phase, the decomposition detail coefficients $d_1'$ to $d_5'$ and the decomposition approximation coefficient $a_5'$ that are obtained by applying the various processes to the decomposition detail coefficients $d_1$ to $d_5$ and the decomposition approximation coefficient $a_5$ obtained in the decomposition phase by the processing in the decomposing unit 102a, or may acquire the processed image data by performing weighting and summing as necessary. In the example of FIG. 8, the processed image acquiring unit 102c may enter, into the synthesis phase, the decomposition detail coefficients $d_1'$ to $d_5'$ and the decomposition approximation coefficient $a_5'$ that are obtained by applying the various processes to the decomposition detail coefficients $d_1$ to $d_5$ and the decomposition approximation coefficient $a_5$ obtained in the decomposition phase by the processing by the decomposing unit 102a, and may then acquire the processed image data reconstructed by the reconstructing unit 102d as the reconstruction processed image data.

The above description is the basic processing of the present embodiment. The basic processing can apply a variety of image processing according to the present embodiment to the original image.

[Color Image Sharpening]

Figure 9:
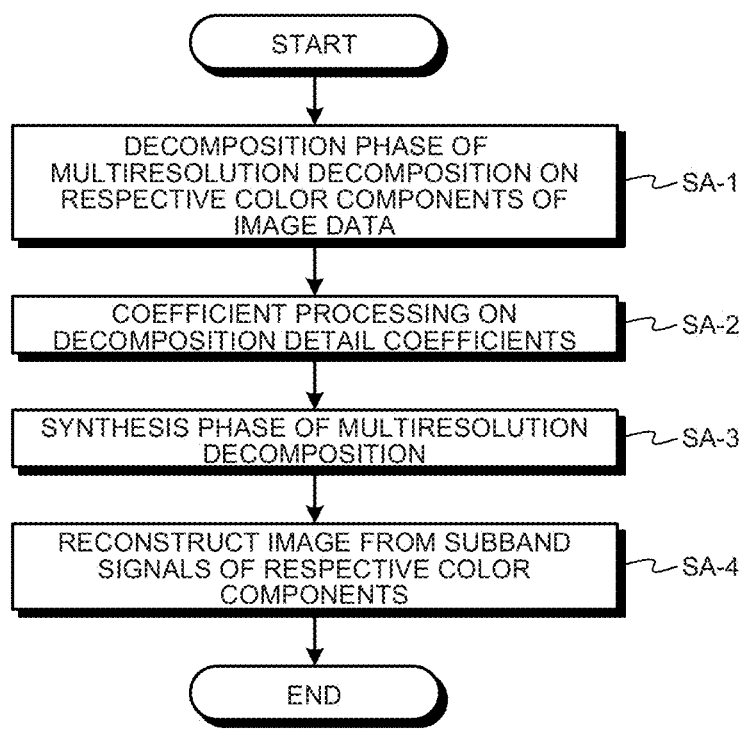
FIG. 9 is a flowchart illustrating an example of color image sharpening by the image processing apparatus 100 in the embodiment.

First, as an example of the image processing performed by the image processing apparatus 100, image sharpening on a color image will be described below with reference to FIGS. 9 to 21. FIG. 9 is a flowchart illustrating the example of the color image sharpening by the image processing apparatus 100 in the present embodiment.

Figure 10:
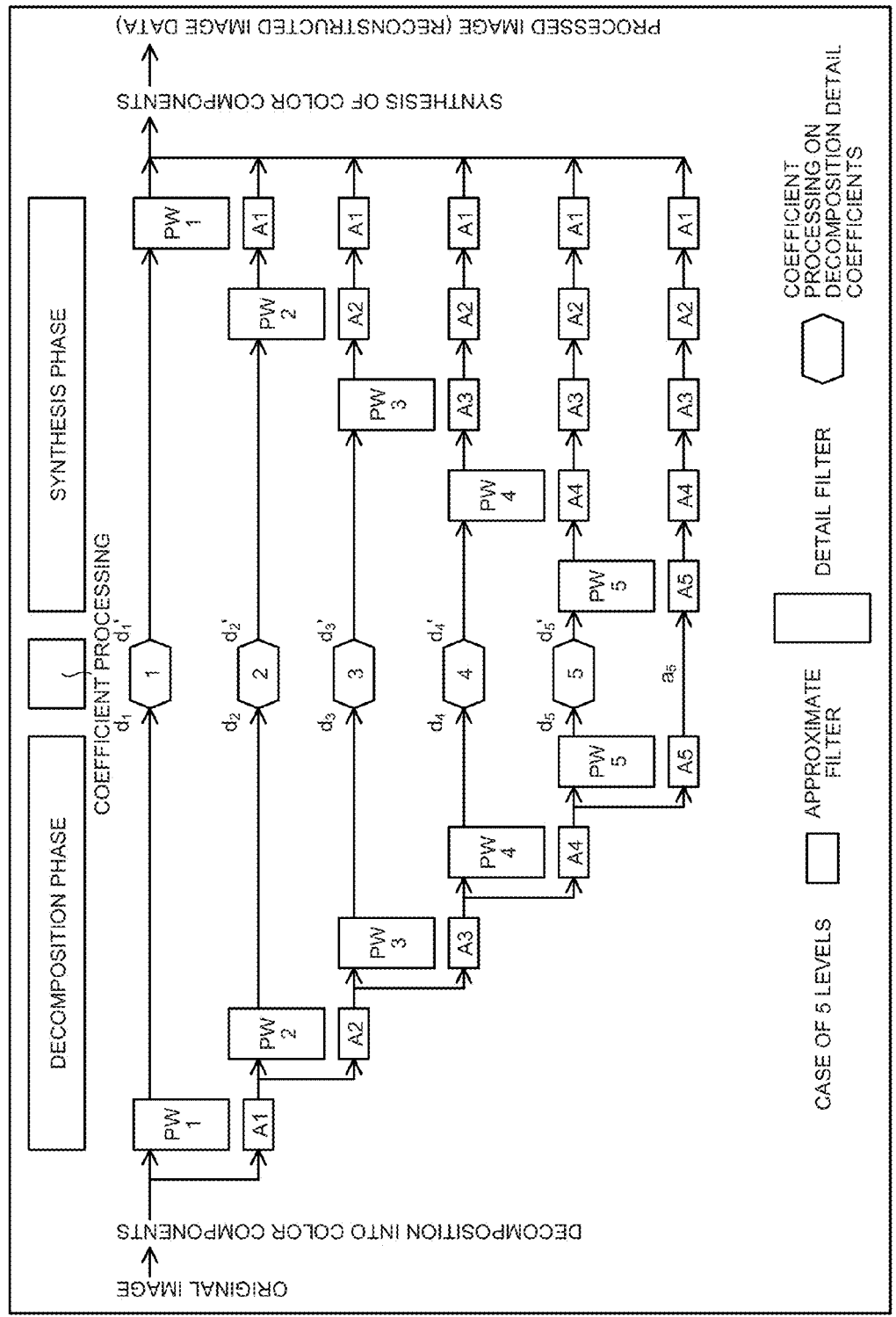
FIG. 10 is a diagram illustrating an example of the filterbanks in a decomposition phase and a synthesis phase of the maximal overlap multiresolution decomposition.

First, the decomposing unit 102a obtains subband signals by performing the maximal overlap multiresolution decomposition with the pinwheel framelets stored in the framelet file 106a on the respective color components of the image data stored in the image data file 106b (Step SA-1). Not limited to using the pinwheel framelets, the decomposing unit 102a may use a biorthogonal wavelet filterbank, orientations of which include the horizontal, the vertical and the diagonal directions. If necessary (for example, if the image data is not represented by the color components used in the present embodiment), the color space conversion unit 102f may perform desired color space conversion or color component decomposition on the color image. As an example, the color space conversion unit 102f may convert the color space of the color image into the CIELAB color space. The image is thus decomposed into three color components, that is, L* (lightness), a* (red-green), and b* (yellow-blue). FIG. 10 is a diagram illustrating an example of the filterbanks in the decomposition phase and the synthesis phase of the maximal overlap multiresolution decomposition. The numbers in FIG. 10 indicate levels. "PW" represents a detail filter. In the case of degree 7, 99 detail filters are present for each level. "A" represents an approximate filter. In the case of degree 7, one approximate filter is present for each level. While the maximum overlap method is used in the example of FIG. 10, the present embodiment is not limited to this, and may use a maximum thinning method or another thinning method.

First, as illustrated in FIG. 10, using pinwheel framelets at level 1, the decomposing unit 102a decomposes the original image as an input signal into signals (a signal represented by a decomposition detail coefficient $d_1$) that pass 99 detail filters and a signal that passes one approximate filter. Next, using pinwheel framelets at level 2, the decomposing unit 102a decomposes the signal that has passed the approximate filter at level 1 into signals (decomposition detail coefficient $d_2$) that pass 99 detail filters (at level 2) and a signal that passes one approximate filter (at level 2). The decomposing unit 102a repeats this processing until the level reaches a maximum level k (in the case of FIG. 10, level 5), and obtains decomposition detail coefficients $d_1$ to $d_k$ and an approximation coefficient $a_k$. In the normal multiresolution decomposition, the decomposing unit 102a passes the signals represented by the decomposition detail coefficients $d_1$ to $d_5$ obtained in the decomposition phase through filterbanks in the synthesis phase without modification. In the present embodiment, however, the decomposing unit 102a performs the coefficient processing in the present embodiment, and obtains decomposition detail coefficients $d_1'$ to $d_5'$.

Figure 11:
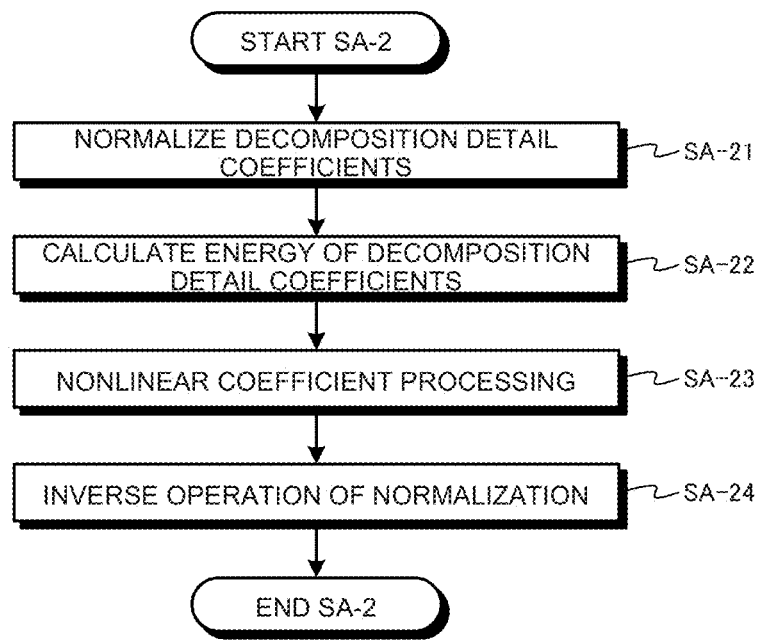
FIG. 11 is a flowchart illustrating an example of coefficient processing on decomposition detail coefficients that involves normalization.

In other words, as illustrated in FIG. 9, between the decomposition phase and the synthesis phase in the multiresolution decomposition, the coefficient processing unit 102b of the decomposing unit 102a performs the coefficient processing on the decomposition detail coefficients output from the decomposition phase so as to reduce values having small absolute values to be smaller in absolute value as the energy of the decomposition detail coefficients is larger, and so as to further enhance values having small absolute values as the energy of the decomposition detail coefficients is smaller (Step SA-2). The coefficient processing unit 102b may perform the coefficient processing that has been corrected with respect to the color component(s) of a* and/or b* of image data so as to reduce values having small absolute values to be smaller in absolute value as the energy determined by the decomposition detail coefficient(s) of a* and/or b* and the decomposition detail coefficient in L* is larger, and so as to further enhance values having small absolute values as the above-mentioned energy is smaller. In the coefficient processing such as function processing and/or the energy calculation, the coefficient processing unit 102b may normalize the decomposition detail coefficients so that the values of the decomposition detail coefficients can easily be processed. FIG. 11 is a flowchart illustrating an example of the coefficient processing on the decomposition detail coefficients that involves the normalization.

As illustrated in FIG. 11, first, the coefficient processing unit 102b normalizes the absolute values of the decomposition detail coefficients x output from the decomposition phase (Step SA-21). For example, the coefficient processing unit 102b normalizes the decomposition detail coefficients x using an appropriate normalization method so that the normalized values for all of the decomposition detail coefficients x may fall in a range from 0 to 1.

Then, based on the normalized decomposition detail coefficients y, the coefficient processing unit 102b calculates the energy of the decomposition detail coefficients (Step SA-22). For example, the coefficient processing unit 102b may calculate a squared norm $\|y\|$ of the normalized decomposition detail coefficients y as the energy of the decomposition detail coefficients y. An exponent adjustment may be made, such as normalizing the energy so as to be usable in function processing.

Then, the coefficient processing unit 102b performs the coefficient processing on the normalized decomposition detail coefficients y in a nonlinear manner based on the energy calculated at Step SA-22, and obtains coefficient processing results z (Step SA-23). For example, to perform the coefficient processing based on the amounts of the energy, the coefficient processing unit 102b may provide thresholds for the energy values and perform coefficient processing that differs depending on which range the energy value falls in, or may perform the coefficient processing by performing a calculation using a function by which the dispersion continuously changes according to the amount of the energy, without providing thresholds for the energy value. For example, the coefficient processing unit 102b may perform the coefficient processing using the SN function that continuously changes into an S-shaped curve when the energy of the decomposition detail coefficients is large and an N-shaped curve when the energy of the decomposition detail coefficients is small. Equation 1 below is an example of the SN function. Equation 1 gives an S-shaped curve if $\alpha>1$, a straight line if $\alpha=1$, or an N-shaped curve if $\alpha<1$. The method for determination of correspondence between the energy and the parameter $\alpha$ is not limited to one method, but may be established so as to reflect differences among individuals, or may be established for each level, each orientation, each color component, or each sign of the decomposition detail coefficient.

$$z = y^\alpha / \{y^\alpha + (1-y)^\alpha\} \qquad \text{Equation 1}$$

(where y is a normalized decomposition detail coefficient ($0 \leq y \leq 1$), $\alpha$ is an indicator based on the energy of the normalized decomposition detail coefficients ($0<\alpha$), and z is a normalized decomposition detail coefficient processed by the function.)

Then, the coefficient processing unit 102b performs the inverse operation of the normalization on the coefficient processing results z that have been processed by the coefficient processing at Step SA-23, and thereby obtains input data x' to the synthesis phase (Step SA-24). If the above-mentioned norm has been used, the sign is restored in the inverse operation using the following expression.

$$x' = sgn(x) z'$$

(where: x is the decomposition detail coefficient, z is the value after the coefficient processing, and z' is the value of the result of the inverse operation of the normalization; if $x \geq 0$, $sgn(x)=1$, or if $x<0$, $sgn(x)=-1$; and x' is a value with its sign restored.)

Referring back to FIG. 9, the decomposing unit 102a performs processing in the synthesis phase using as input data the decomposition detail coefficients processed by the coefficient processing at Step SA-2 (Step SA-3). In other words, using the filters in the synthesis phase, the decomposing unit 102a processes the signals obtained by performing coefficient processing with respect to the signals output in the decomposition phase, and eventually obtains 99×5 synthesis subband signals (the detail parts) and one synthesis subband signal (the approximate part) (refer to FIG. 10).

Then, the reconstructing unit 102d sums the synthesis subband signals of the respective color components obtained by the decomposing unit 102a, thereby reconstructing an image (Step SA-4). If any values of the color components obtained by summing the synthesis subband signals exceed specified values (for example, a range of tone levels 0 to 255), the reconstructing unit 102d may, for example, scale all of the values to fall in a specified range (such as in the range from 0 to 255) (a method of normalization), or may replace values equal to or below a specified minimum value (such as 0) with the minimum specified value and replace values equal to or above a specified maximum value (such as 255) with 255 (a method using thresholds). If necessary (for example, if an RGB output is required), the color space conversion unit 102f may perform other processing, such as conversion of the color space or synthesis of the color components.

The reconstructed image obtained by the above-described processing is an image obtained by performing the image processing according to the present embodiment on the original image, for example, by performing sharpening that makes the image appear more natural than the original image. FIG. 12 comparatively illustrates the original image, a sharpened image according to the present embodiment, and a sharpened image according to a conventional method.

Figure 15:
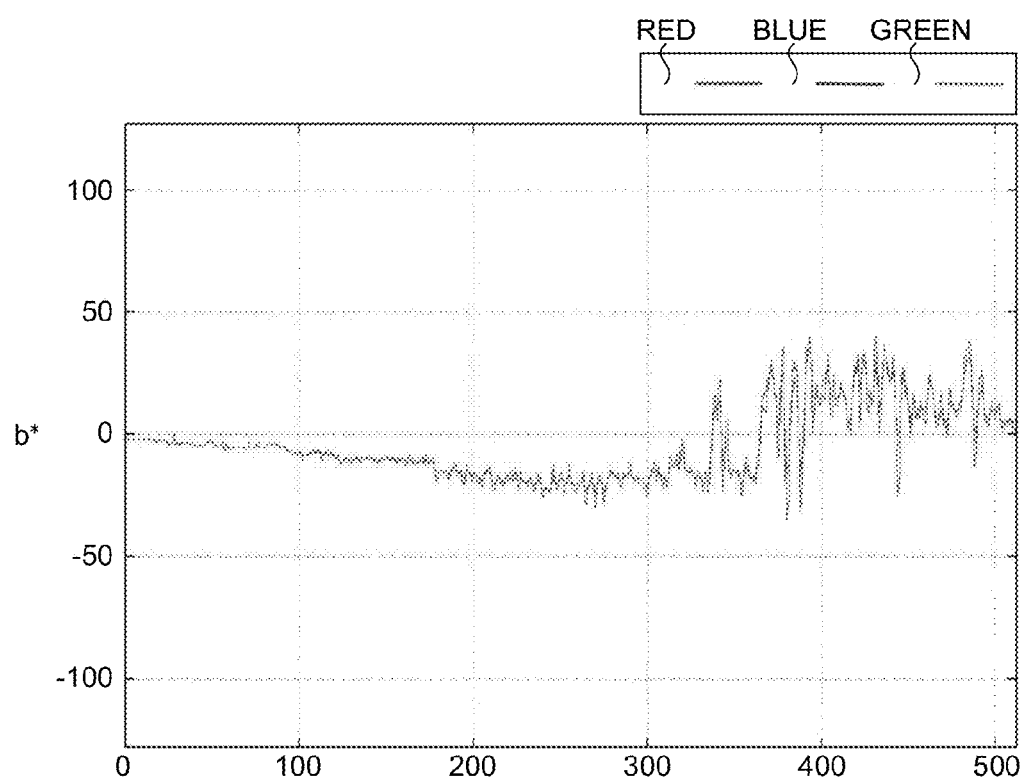
FIG. 15 is a graph illustrating the values of b* at the 400th pixel column from the left in the respective photographs of FIG. 12.

As illustrated in FIG. 12, according to the conventional method of Non Patent Literature 1, local contrast control is uniformly performed on an entire image so as to detect and further lighten pixels on the brighter side of an edge and so as to detect and further darken pixels on the darker side of an edge. Hence, as can be seen particularly in parts having trees on the near side of the photograph, excessive sharpening is unnecessarily applied to parts with originally sufficient contrast to the extent that the parts become nearly black or white, thus resulting in an unnatural image. According to the present embodiment, image processing similar to human early visual information processing is performed, so that a natural sharpened image can be obtained without excessive contrast being given. FIGS. 13, 14, and 15 are graphs illustrating values of L*, a*, and b*, respectively, at the 400th pixel column from the left in the respective photographs (512×512 pixels) of FIG. 12. The horizontal axes represent the number of rows from the top at the 400th pixel column from the left, and the vertical axes represent the values of the respective color components (L*, a*, and b*). The blue indicates a graph representing values of points of the original image; the green indicates a graph representing values of points of a processed image according to the present embodiment; and the red indicates a graph representing values of points of a processed image according to a commercially available program product.

As illustrated in FIGS. 13 to 15, according to the conventional method of Non Patent Literature 1, the contrast control is performed so as to uniformly increase the fluctuation in the graph representing the values of points of the original image both in the distant view (about 0 to 300 on the horizontal axis) and the near view (about 400 to 500 along the horizontal axis). As a result, sharp fluctuation in the color components occurs particularly in the near view (about 400 to 500 on the horizontal axis). According to the present embodiment, the fluctuation is not increased in the near view (about 400 to 500 on the horizontal axis) where the fluctuation is sharp, and the sharpening is applied to the distant view (about 0 to 300 on the horizontal axis) where the fluctuation is mild. The sharpening is applied not only to the high-frequency portions but also to the low-frequency portions. This has reduced the unnatural enhancement of the image.

This is the end of the explanation of the color image sharpening by the image processing apparatus 100. The principle on which the present embodiment can perform the natural sharpening is considered to be the following. That is, human visual information processing includes a high-level sharpening function, and therefore, as in the present embodiment, image processing with a mathematical model based on the human visual information processing can perform high-level sharpening. Moreover, in that case, processing similar to the visual information processing in the brain is performed, which brings an advantage that the sharpening is not felt as excessively unnatural sharpening.

[Example of Coefficient Processing Using SN Function]

The following illustrates an example of the coefficient processing using the SN function by the coefficient processing unit 102b of the image processing apparatus 100.

To mathematically describe a phenomenon or the like in which weak stimuli are further weakened as the quantity of surrounding stimulation is larger, and are further emphasized as the quantity of surrounding stimulation is smaller, suppose a function that continuously changes according to a parameter from a function having an S-shaped graph to a function having an N-shaped graph. A function having such a characteristic is termed a perceptual function. The following SN function is given as one example of the perceptual function.

$$s(t, \alpha) = \frac{t^\alpha}{t^\alpha + (1-t)^\alpha}, 0 \le t \le 1, 0 \le \alpha \quad \text{[Expression 1]}$$

Let X be an original image, and let X=(X1, X2, X3) represent display in a color space. For example, when the CIELAB color space is used, X1, X2, and X3 represent data for L*, a*, and b*, respectively.

$X_\mu$ ($\mu$=1, 2, 3) are decomposed with pinwheel framelets. In the present example, a description will be made of a case where the number of pixels of X is 512×512 pixels, and decomposition at level 8 is performed with pinwheel framelets of degree 5 (($(5-1)^2+(5+1)^2=52$ filters) (in the case of, for example, another number of pixels or other pinwheel framelets, the decomposition can also be performed on the same principle).

At this time, decomposed data of $X_\mu$ can be expressed by the following expression (where l, p, j, and k are integers).

$$(x_\mu[l,p;j,k])_{0 \le j,k \le 511}; 1 \le p \le 52, 1 \le l \le 8, \mu=1,2,3 \quad \text{[Expression 2]}$$

Here, $(x_\mu[l, 1; j,k])_{0 \le j,k \le 511}$ represent decomposition approximation coefficients of the pinwheel framelets, and $(x_\mu[l, 1; j,k])_{0 \le j,k \le 511}$ ($2 \le p \le 52$) represent decomposition detail coefficients of the pinwheel framelets. Hereinafter, let $2 \le p \le 52$.

Let $\phi_{\mu,l,p}$ be an appropriate function of two variables, and set the following expression ($\mu$=1, 2, 3).

$$z_\mu[l,p;j,k] = \phi_{\mu,l,p}(x_1[l,p;j,k], x_\mu[l,p;j,k]) \quad \text{[Expression 3]}$$

For example, set the following (where: a1 and a2 are appropriate normalizing constants; and $\mu$=1, 2, 3).

$$\phi_{\mu,l,p}(s,t) = |s|/a_1,$$

$$\phi_{\mu,l,p}(s,t) = |s|/a_1 + |t|/a_2 \quad \text{[Expression 4]}$$

Set also the following.

Let $y_\mu^0[l;p]$ be a normalized $l^2$ norm of $(z_\mu[l,p;j,k])_{0 \le j, k \le 511}(\mu=1,2,3)$. [Expression 5]

Let b1, b2, b3, and b4 be appropriately selected nonnegative real numbers. These may vary for each $\mu$ or each level l. They may also vary for each orientation p among the decomposition detail coefficients of the pinwheel framelet. They may also vary for each sign of the decomposition detail coefficient.

Let $y_\mu[l, p]$ be represented as $y_\mu^0[l, p]^{b_3}$. [Expression 6]

$$\alpha_\mu[l, p] = (b_2 - b_1)s(y_\mu[l, p], b_4) + b_1 = \quad \text{[Expression 7]}$$

$$(b_2 - b_1)\frac{y_\mu[l, p]^{b_4}}{y_\mu[l, p]^{b_4} + (1 - y_\mu[l, p])^{b_4}} + b_1$$

Let $y_{\mu,1}[l,p;j,k]$ denote the result of appropriately normalizing the absolute values of $x_\mu[l,p;j,k]$ to have values in a range from 0 to 1. Set the following, where the SN function s may be replaced with an appropriate perceptual function.

$$y_{\mu,2}[l, p; j, k] = s(y_{\mu,1}[l, p; j, k], \alpha_\mu[l, p]) = \quad \text{[Expression 8]}$$

$$\frac{y_{\mu,1}[l, p; j, k]^{\alpha_\mu[l,p]}}{y_{\mu,1}[l, p; j, k]^{\alpha_\mu[l,p]} + (1 - y_{\mu,1}[l, p; j, k])^{\alpha_\mu[l,p]}}$$

Let $y'_\mu[l,p;j,k]$ denote the result of multiplying $y_{\mu,2}[l,p;j,k]$ by the sign function of $x_\mu[l,p;j,k]$ and performing the inverse operation of normalization on the result.

Let $X'_\mu$ be data obtained by reconstructing $y'_\mu[l,p;j,k]$ by applying pinwheel framelet synthesis filters thereto ($\mu$=1, 2, 3). Put $X'=(X'_1, X'_2, X'_3)$.

$X'$ is the sharpened image of X. In the examples of the processed images, b1, b2, b3, and b4 are set for each level and to be the same for orientation components with respect to L*, and set for each of the horizontal, vertical, diagonal, and other directions for each level with respect to a* and b*.

The processing method may vary according to the difference in the sign of $x_\mu[l,p;j,k]$ so as to be more similar to human visual perception.

This is the end of the explanation of the example for the coefficient processing using the SN function in the image processing apparatus 100. The above-described coefficient processing with the SN function is not limited to being used for sharpening color images, but may be used for image processing such as sharpening of, for example, grayscale images.

[Simulation in Color Contrast Illusion]

To verify whether the mathematical model used in the present embodiment is similar to the human visual information processing, the processing according to the above-described embodiment was performed using color contrast illusion images as original images. In other words, based on the idea that a computer having a mathematical model implemented should calculate an illusion if the mathematical model is similar to the human visual information processing, it was verified whether the present embodiment can simulate the human illusion.

Figure 16:
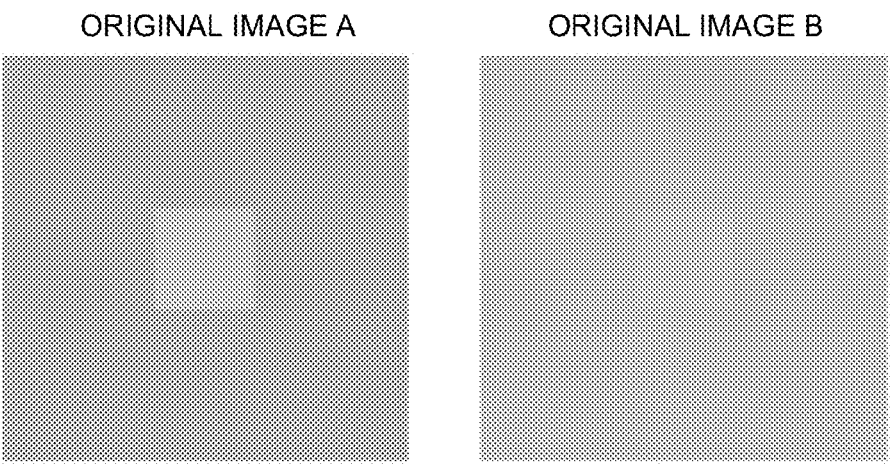
FIG. 16 illustrates an example of color contrast illusion images.
Figure 17:
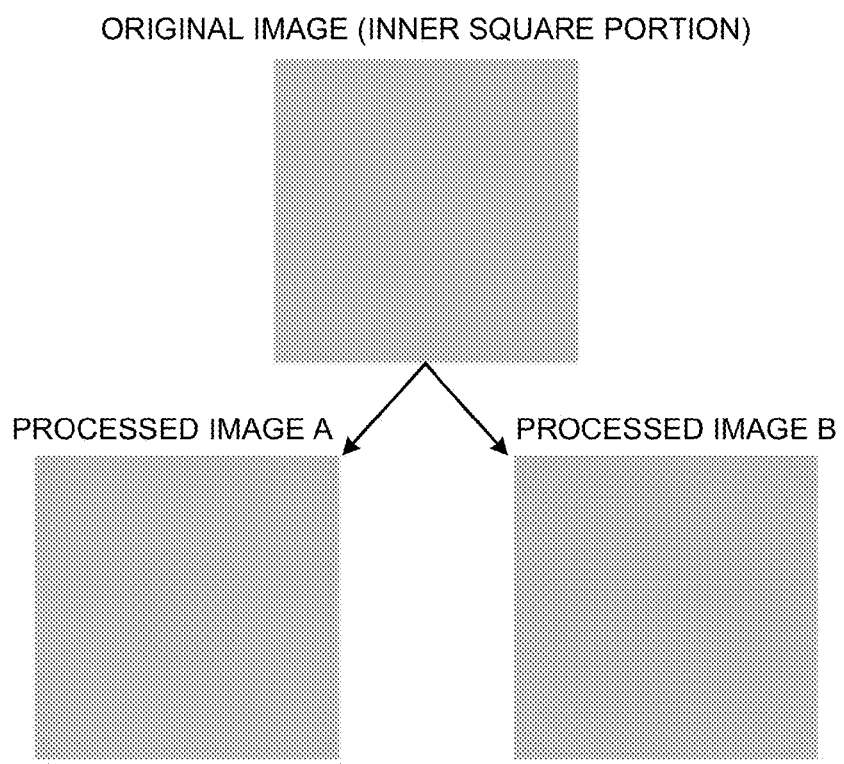
FIG. 17 illustrates an inner square portion (the same for original images A and B) of the original images illustrated in FIG. 16, an inner square portion of a processed image A that is an image processing result of the original image A, and an inner square portion of a processed image B that is an image processing result of the original image B.

FIG. 16 illustrates an example of color contrast illusion images. The left view (original image A) and the right view (original image B) of FIG. 16 are exactly the same in the lightness, the brightness, and the color of the inner square portions thereof. However, as far as human visual information processing is concerned, an illusion occurs in which the views appear in different colors depending on the arrangement of surrounding colors. Hence, image processing was performed on each of the original images A and B by the image processing apparatus 100 of the present embodiment. FIG. 17 illustrates an inner square portion (the same for the original images A and B) of the original images, an inner square portion of a processed image A that is an image processing result of the original image A, and an inner square portion of a processed image B that is an image processing result of the original image B.

As illustrated in FIG. 17, as a result of performing the image processing using the image processing apparatus 100 of the present embodiment, the inner square portion of the processed image A corresponding to the original image A was expressed more vividly than in reality, and the inner square portion of the processed image B corresponding to the original image B was expressed more dully than in reality, in the same manner as the appearance (illusion) of the original images A and B to a person. Hence, it can be said that the image processing by the image processing apparatus 100 of the present embodiment is similar to the human visual information processing.

Figure 18:
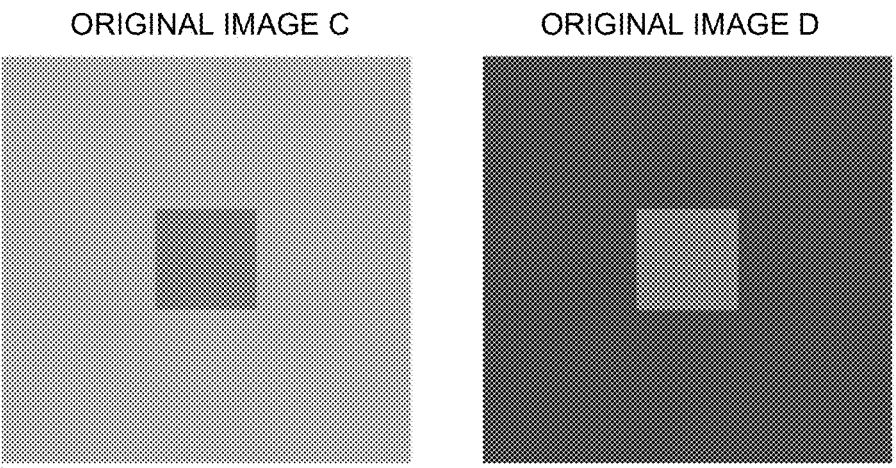
FIG. 18 illustrates another example of the color contrast illusion images.
Figure 19:
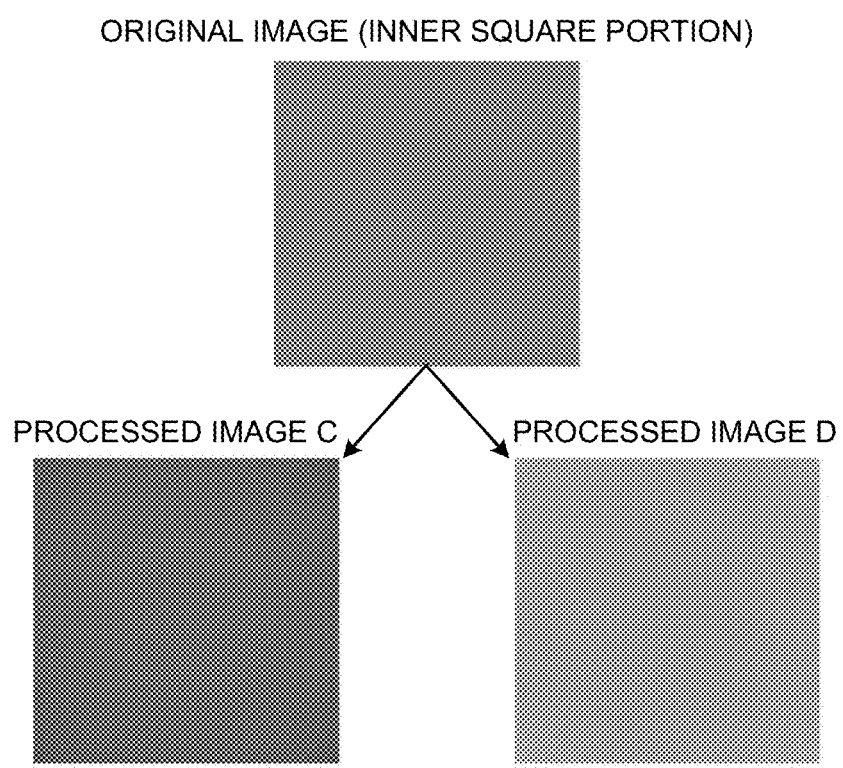
FIG. 19 illustrates an inner square portion (the same for original images C and D) of the original images illustrated in FIG. 18, an inner square portion of a processed image C that is an image processing result of the original image C, and an inner square portion of a processed image D that is an image processing result of the original image D.

FIG. 18 illustrates another example of color contrast illusion images. In the same manner as the above, the left view (original image C) and the right view (original image D) of FIG. 18 are exactly the same in the lightness, the brightness, and the color of the inner square portions thereof. FIG. 19 illustrates an inner square portion (the same for the original images C and D) of the original images, an inner square portion of a processed image C that is an image processing result of the original image C, and an inner square portion of a processed image D that is an image processing result of the original image D.

As illustrated in FIG. 19, as a result of performing the image processing using the image processing apparatus 100 of the present embodiment, the inner square portion of the processed image C corresponding to the original image C was expressed more darkly than in reality, and the inner square portion of the processed image D corresponding to the original image D was expressed more brightly than in reality, in the same manner as the appearance (illusion) of the original images C and D to a person.

Figure 20:
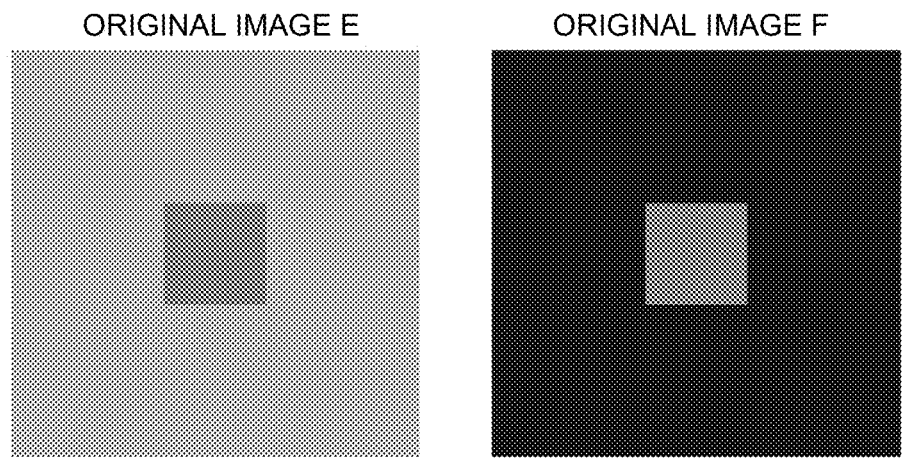
FIG. 20 illustrates still another example of the color contrast illusion images.
Figure 21:
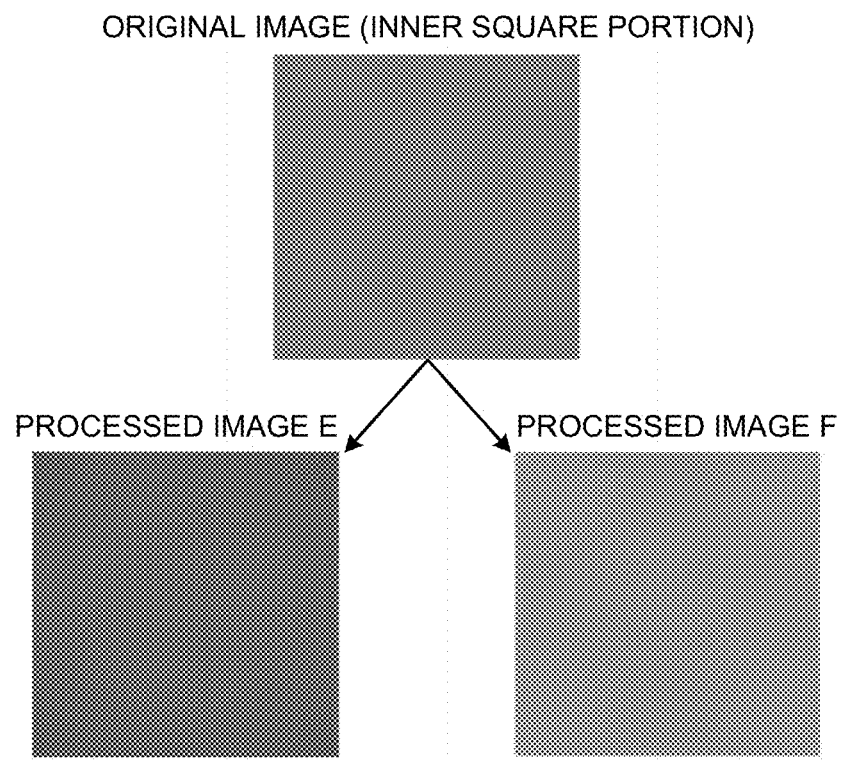
FIG. 21 illustrates an inner square portion (the same for original images E and F) of the original images illustrated in FIG. 20, an inner square portion of a processed image E that is an image processing result of the original image E, and an inner square portion of a processed image F that is an image processing result of the original image F.

FIG. 20 illustrates still another example of the color contrast illusion images. In the same manner as the above, the left view (original image E) and the right view (original image F) of FIG. 20 are exactly the same in the lightness, the brightness, and the color of the inner square portions thereof. FIG. 21 illustrates an inner square portion (the same for the original images E and F) of the original images, an inner square portion of a processed image E that is an image processing result of the original image E, and an inner square portion of a processed image F that is an image processing result of the original image F.

As illustrated in FIG. 21, as a result of performing the image processing using the image processing apparatus 100 of the present embodiment, the inner square portion of the processed image E corresponding to the original image E was expressed more darkly than in reality, and the inner square portion of the processed image F corresponding to the original image F was expressed more brightly than in reality, in the same manner as the appearance (illusion) of the original images E and F to a person. This is an example that markedly exhibited an effect of taking the values of L* into account in the processing on a* and b*.

The above results verified that the image processing by the image processing apparatus 100 of the present embodiment is closely similar to the human visual information processing. Hence, by performing the image processing according to the present embodiment that uses the mathematical model similar to the human visual information processing, it is possible to apply information processing similar to the human vision to the original image to provide a natural image in which only portions that a person would want to view are sharpened. Depending on the purpose of use, the image processing apparatus 100 can be configured so as to perform image processing with a part or the whole of the human visual function enhanced or weakened.

[Various Types of Image Processing]

As examples of image processing other than the above-described color image sharpening, the following describes specific methods and application examples, in the order of 1. Denoising, 2. Feature extraction ((A) Edge detection and (B) Other types of feature extraction), and 3. Feature extraction giving a three-dimensional appearance, with reference to FIGS. 22 to 55. While the following examples use the pinwheel framelets, the broad-sense pinwheel framelets or pinwheel wavelet frames may be used.

[1. Denoising]

A description will be made of an example of denoising by relatively reducing at least one of the decomposition detail coefficients by the coefficient processing unit 102b in the present embodiment. While the following example uses a grayscale image, a color image can be used in the same manner.

In this section [1. Denoising], an original image refers to an initial image without noise, and a noise image refers to an image obtained by adding noise to the original image. In this example, the noise image was created by adding Gaussian white noise to the original image. A processed image refers to a denoised image that has been reconstructed by the processed image acquiring unit 102c after the denoising by the coefficient processing unit 102b.

An evaluation value is used to quantify degradation of an image due to the denoising.
[Expression 9]
For an image Y=(y [j,k]: j=1, ..., M, k=1, ..., N), the following is defined:

$$\|Y\| = \left(\frac{1}{MN}\sum_{j=1}^{M}\sum_{k=1}^{N}|y[j,k]|^2\right)^{\frac{1}{2}}$$

With the original image denoted as X0, and the denoised image (processed image) denoted as X, the evaluation value used in the present example is expressed by the following expression. As this evaluation value is smaller, the processed image is more similar to the original image, meaning that the processed image is less degraded.

$$\|X0-X\|$$ [Expression 10]

For the denoising, methods are known that set a threshold, and change values smaller than the threshold or values equal to or below the threshold to zero. Accordingly, a threshold was set to perform the denoising with the coefficient processing unit 102b. Because various known methods are available for setting the threshold, any known method other than the method illustrated below may be used. For example, the hard thresholding and the soft thresholding are well known as the threshold processing, and, while the hard thresholding was used below, the soft thresholding or other threshold processing may be used.

Figure 22:
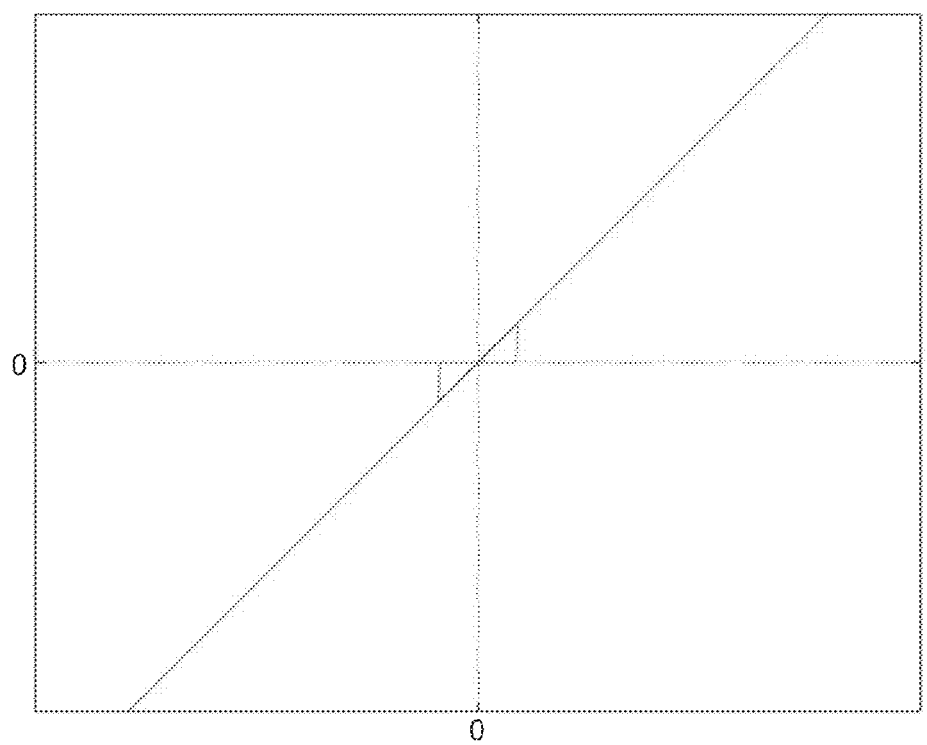
FIG. 22 is a graph for explaining hard thresholding used in an example of the present invention.

In the present example, to compare several denoising methods based on the evaluation value, the threshold is continuously varied for each of the denoising methods, and the value thereof when the best evaluation value is obtained is determined to be the threshold in that method. FIG. 22 is a graph for explaining the hard thresholding used in the present example. The horizontal axis represents the value of an original coefficient, and the vertical axis represents the value after the coefficient processing is performed. Specifically, if the coefficient processing unit 102b applies a linear function having a gradient of 1 to the coefficient of the decomposition subband signal, the value of the original coefficient is completely unchanged, so that the reconstructed image obtained by the reconstructing unit 102d is the same as the original image.

Figure 23:
FIG. 23 illustrates an original image used in the example before noise is added thereto.
Figure 24:
FIG. 24 is a view illustrating a noise image obtained by adding Gaussian white noise to the original image illustrated in FIG. 23.

As illustrated in FIG. 22, the hard thresholding method performs the coefficient processing that compares the absolute value of the coefficient with the threshold, and replaces the coefficient with zero if the absolute value is the threshold or less. With this hard thresholding, small fluctuations can be ignored, and thus, the noise can efficiently be removed. FIG. 23 illustrates the original image used in the example, and FIG. 24 is a view illustrating the noise image obtained by adding the Gaussian white noise to the original image. An image having 256 tone levels of 0 to 255 and a size of 512×512 was used as the original image.

Figure 25:
FIG. 25 illustrates a processed image obtained by using Symlet 4 as wavelets in a conventional wavelet-based denoising method.
Figure 26:
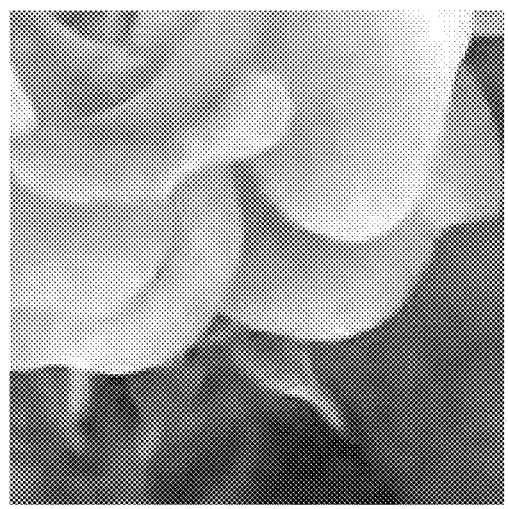
FIG. 26 is a partial enlarged view of FIG. 25.

For comparison with the result of denoising according to the present embodiment, a method of denoising by wavelets was used as an example using a conventional method. In this conventional method of denoising with wavelets, the maximal overlap multiresolution decomposition at level 2 by Symlet 4 was performed. With regards to Symlet, Wavelet Toolbox of MATLAB and the explanation included therein may be consulted as a reference. The threshold processing was performed with a threshold of 48 (a value determined by the above-described method of continuously varying the threshold) on all of the decomposition detail coefficients (the decomposition detail coefficients in the horizontal, the vertical and the diagonal directions of the respective levels), and thereafter, the processed image was obtained through the synthesis phase. In the processed image, values smaller than 0 were set to 0, and values larger than 255 were set to 255. FIG. 25 illustrates the processed image obtained by Symlet 4 of the denoising method using conventional wavelets, and FIG. 26 is a view obtained by partially enlarging FIG. 25. The evaluation value for the image processing result obtained with Symlet 4 of the denoising method using the conventional wavelets was 5.0449.

The following shows the denoising method according to the present embodiment and the results thereof.

Figure 27:
FIG. 27 illustrates a processed image obtained by the embodiment using pinwheel framelets of degree 5.
Figure 28:
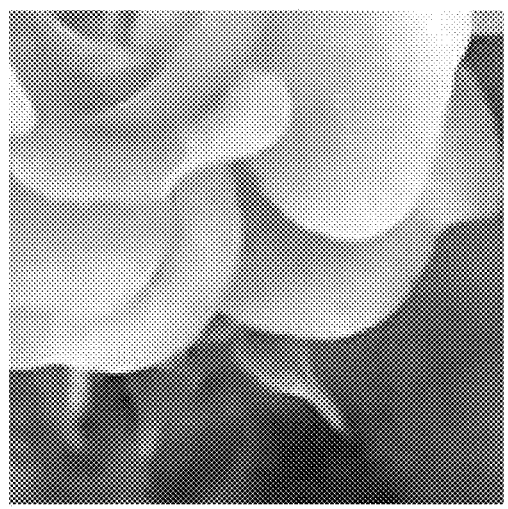
FIG. 28 is a partial enlarged view of FIG. 27.

[Denoising Example 1 by Pinwheel Framelet]
The maximal overlap multiresolution decomposition at level 1 with pinwheel framelets of degree 5 was performed on the noise image by the image processing apparatus 100 of the present embodiment. The threshold by the coefficient processing unit 102b was set to 16 (a value determined by the above-described method of continuously varying the threshold), and a processed image was obtained by the same method as that using the wavelets. FIG. 27 illustrates the processed image obtained by the present embodiment using the pinwheel framelets of degree 5, and FIG. 28 is a view obtained by partially enlarging FIG. 27. The evaluation value in this case was 4.7736. A better result than that of the method by the conventional wavelets was obtained. By comparing the conventional processed image (FIGS. 25 and 26) with the processed image of the present embodiment (FIGS. 27 and 28) with the naked eye, it is also found the denoising was effectively performed.

[Denoising Example 2 by Pinwheel Framelet]
The pinwheel framelet has a degree, whereby further effective denoising can be performed by choosing a more appropriate degree. The pinwheel framelet has a variety of orientation selectivity, so that the number of filters is large. Accordingly, a denoising effect can be expected to be increased by changing, for each of the detail subband signals in the decomposition phase, the threshold used for the decomposition detail coefficient constituting the detail subband signals.

Figure 29:
FIG. 29 illustrates a processed image obtained by the embodiment using pinwheel framelets of degree 7 and changing thresholds filter by filter.
Figure 30:
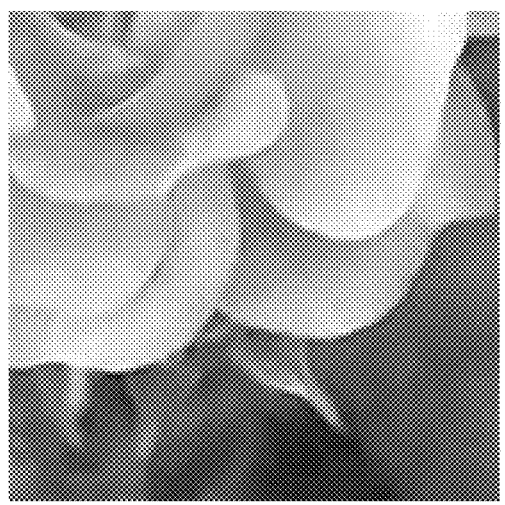
FIG. 30 is a partial enlarged view of FIG. 29.

Hence, as Denoising Example 2 by the pinwheel framelet, the maximal overlap multiresolution decomposition at level 1 by the pinwheel framelets of degree 7 was performed on the noise image. The threshold by the coefficient processing unit 102b was varied for each of the detail subband signals in the corresponding decomposition phase. Specifically, the threshold was set to a value (a value determined by the above-described method of continuously varying the threshold) obtained by multiplying the maximum possible value of the detail coefficients constituting the subband signals in the decomposition phase by 0.075. In other words, values having absolute values that fall in the range from 0 to 0.075 times the maximum value were set to 0. Except for this, the same method as that of the previous example was used to obtain the processed image. FIG. 29 illustrates the processed image obtained by the present embodiment using the pinwheel framelets of degree 7 and changing thresholds filter by filter, and FIG. 30 is a view obtained by partially enlarging FIG. 29. The evaluation value in this case was 4.3718, and it has been verified that the denoising effect is further improved than that of Denoising Example 1 described above.

[Denoising Example 3 by Pinwheel Framelet]

The pinwheel framelet has a high-level function of separating frequency bands, so that further fine-tuned denoising is possible. Hence, as Denoising Example 3 by the pinwheel framelet, the maximal overlap multiresolution decomposition at level 2 by the pinwheel framelets of degree 7 was performed on the noise image. Then, the threshold processing was performed on all of the decomposition detail coefficients at level 1 and the decomposition detail coefficients at level 2 illustrated in FIG. 31 using the same method as that of Denoising Example 2, and thereafter, the processed image was obtained. The threshold was set to a value (a value determined by the above-described method of continuously varying the threshold) obtained by multiplying the maximum possible value of the decomposition detail coefficients by 0.073. FIG. 31 is a diagram indicating, with hatched lines, the decomposition detail coefficients with which the threshold processing at level 2 is performed. The layout of the table corresponds to the filter arrangement of the pinwheel framelets of degree 7 (refer to FIGS. 3 to 5 for the pinwheel framelets of degree 7). In FIG. 31, "g" represents an approximation subband signal in the decomposition phase, and "h" represents a detail subband signal in the decomposition phase.

Figure 32:
FIG. 32 illustrates a processed image obtained by the embodiment using pinwheel framelets of degree 7 and applying the threshold processing to high-frequency portions from level 1 to level 2.
Figure 33:
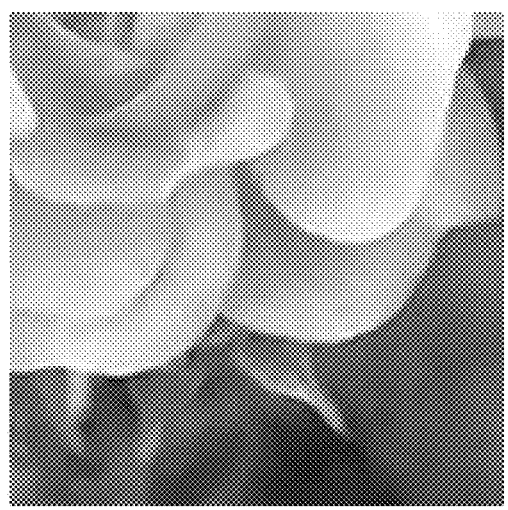
FIG. 33 is a partial enlarged view of FIG. 32.

FIG. 32 illustrates the processed image obtained by the present embodiment using the pinwheel framelets of degree 7 and applying the threshold processing to high-frequency portions up to level 2, and FIG. 33 is a view obtained by partially enlarging FIG. 32. The evaluation value in this case was 4.3647. In Denoising Example 3, a further better result than those of above-described Denoising Examples 1 and 2 was obtained by also performing the threshold processing on the detail subband signals in the decomposition phase corresponding to the high frequency of level 2. Conventionally, the denoising method using the wavelets has only been able to select up to which level the threshold processing should be applied. However, it has been verified that, with the pinwheel framelet having a high-level function of separating frequency bands, the denoising can effectively be performed by thus finely selecting the frequency components.

[2. Feature Extraction]

The following describes an example of performing the feature extraction of an image by the coefficient processing unit 102b in the present embodiment by relatively attenuating or amplifying at least one of the approximation coefficients and the detail coefficients output from the decomposition phase.

[2. (A) Edge Detection]

As methods for edge detection, a simple filtering method and a method using wavelets are so far well known (refer to Non Patent Literature 6 and 7). However, the pinwheel framelet has functions of wide varieties of frequency resolution and orientation selectivity, and thereby, is expected to enable a greater variety of types of edge detection than the conventional edge detection methods, depending on the use.

Figure 34:
FIG. 34 is a view illustrating an original image used in the example for edge detection.

FIG. 34 is a view illustrating an original image used in the present example for edge detection. An image having 256 tone levels of 0 to 255 and a size of 1536×1536 was used as the original image. The original image used was in grayscale. If, however, the image is in color, the image may be converted into a grayscale image by a known method.

[Edge Detection Example 1]

First, using the image processing apparatus 100 of the present embodiment, the maximal overlap multiresolution decomposition at level 2 by the pinwheel framelets of degree 7 was performed. The coefficient processing unit 102b performed weighting using the values illustrated in FIG. 35 at level 1, and using the values illustrated in FIG. 36 at level 2. The layouts of the tables correspond to the filter arrangement of the pinwheel framelets of degree 7 (refer to FIGS. 3 to 5 for the pinwheel framelets of degree 7). The values in FIGS. 35 and 36 are weight values for the coefficients of the subband signals.

This extracts high-frequency components related to edges. The extracted decomposition subband signals include values having small absolute values that are unnecessary for edge detection or that hinder the edge detection. Hence, the threshold processing was performed to remove the values. Appropriate known methods may be used as the methods for obtaining the threshold and for the threshold processing. In the present example, the threshold was set to a value obtained by multiplying the maximum possible value of each of the decomposition subband signals by 0.005, and the threshold processing by hard thresholding was performed. This can set the threshold for each of the decomposition subband signals. Thereafter, a processed image via the synthesis phase was obtained by processing by the processed image acquiring unit 102c.

The processed image of the edge detection at this level is not suitable for being displayed, and hence is displayed by the processed image output unit 102g using the following two methods. Other known methods may be used as a method for displaying the processed image of the edge detection <Display Using Truncation>

Human perception recognizes edges of a multivalued image more easily than those of a binarized image. Accordingly, display using truncation is performed. Specifically, values smaller than m1 of the processed image are set to m1, and values larger than m2 thereof are set to m2.

Figure 37:
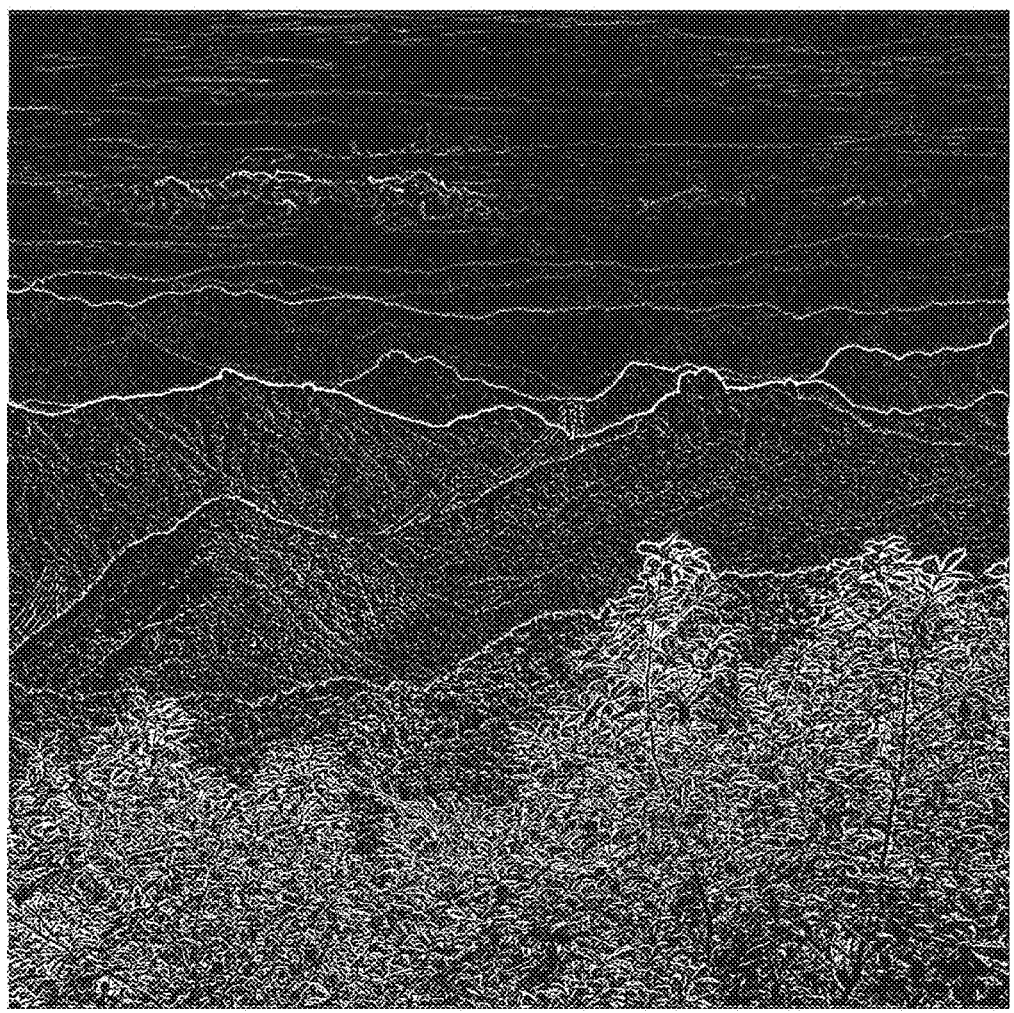
FIG. 37 is a view illustrating an image obtained in Edge Detection Example 1 by truncating a processed image.

FIG. 37 is a view illustrating an image obtained by truncating the processed image obtained in Edge Detection Example 1. In the truncated display, the values were set so that m1=0, and m2=3.

<Display Using Binarization>

In display using binarization, a binarized image is obtained by setting values smaller than t to 0, and values larger than t to 1.

Figure 38:
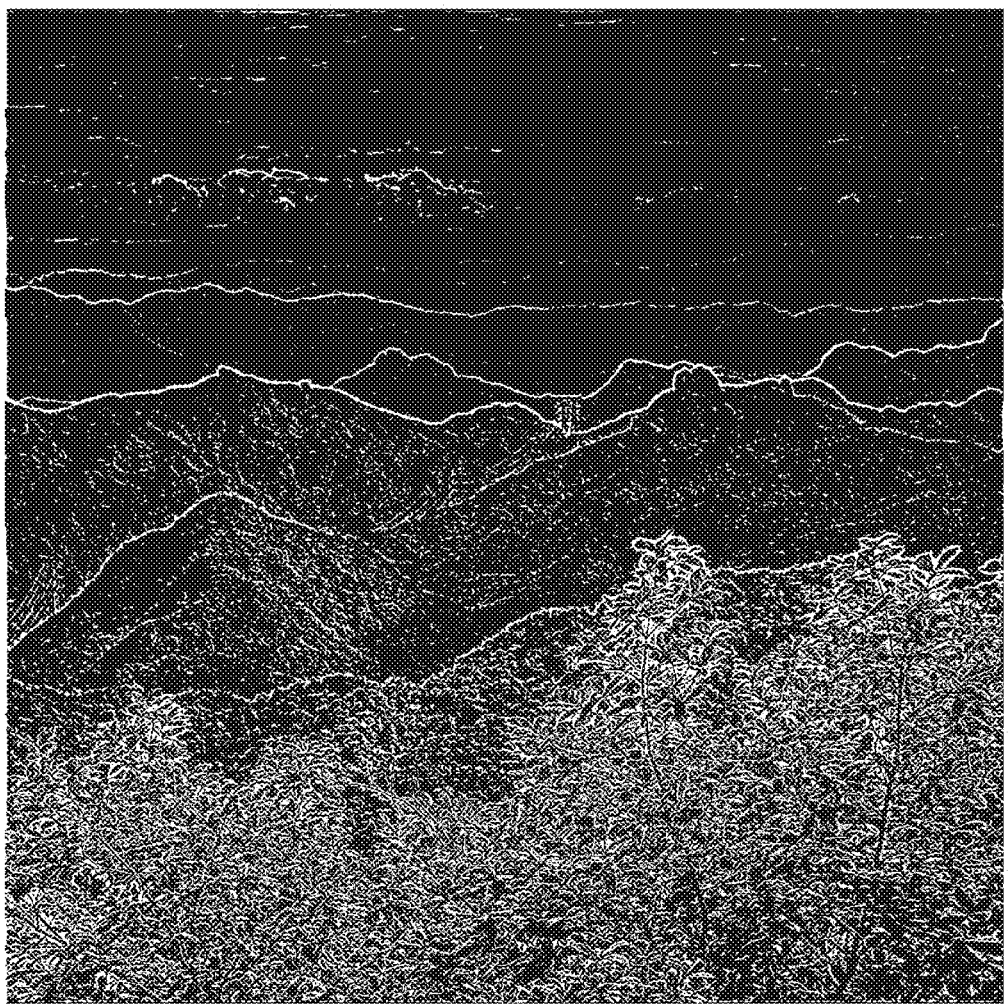
FIG. 38 is a view illustrating a processed image binarized at t=1.

FIG. 38 is a view illustrating a processed image binarized at t=1. As illustrated in FIGS. 37 and 38, as a result of Edge Detection Example 1, it was found that power lines that were hardly identifiable in the original image exist near the center and on the left side of the processed image, and thus, effects of the edge detection of the present embodiment were verified.

[Edge Detection Example 2]

Next, Edge Detection Example 2 was performed as an example of edge detection by taking advantage of the orientation of the pinwheel framelet. The power lines could be detected in the original image by the processing of Edge Detection Example 1. To further detect the power lines, processing specialized for this part is performed. Specifically, in Edge Detection Example 2, the maximal overlap multiresolution decomposition at level 2 by the pinwheel framelets of degree 7 was performed, and weighting was performed using the values illustrated in FIG. 39 at level 1, and using the values illustrated in FIG. 40 at level 2. This obtains decomposition subband signals related to a direction close to the direction of the power lines. The threshold was set to a value obtained by multiplying the maximum possible value of each of the decomposition subband signals by 0.005; the threshold processing by hard thresholding was performed; and the processed image was obtained via the synthesis phase.

Figure 41:
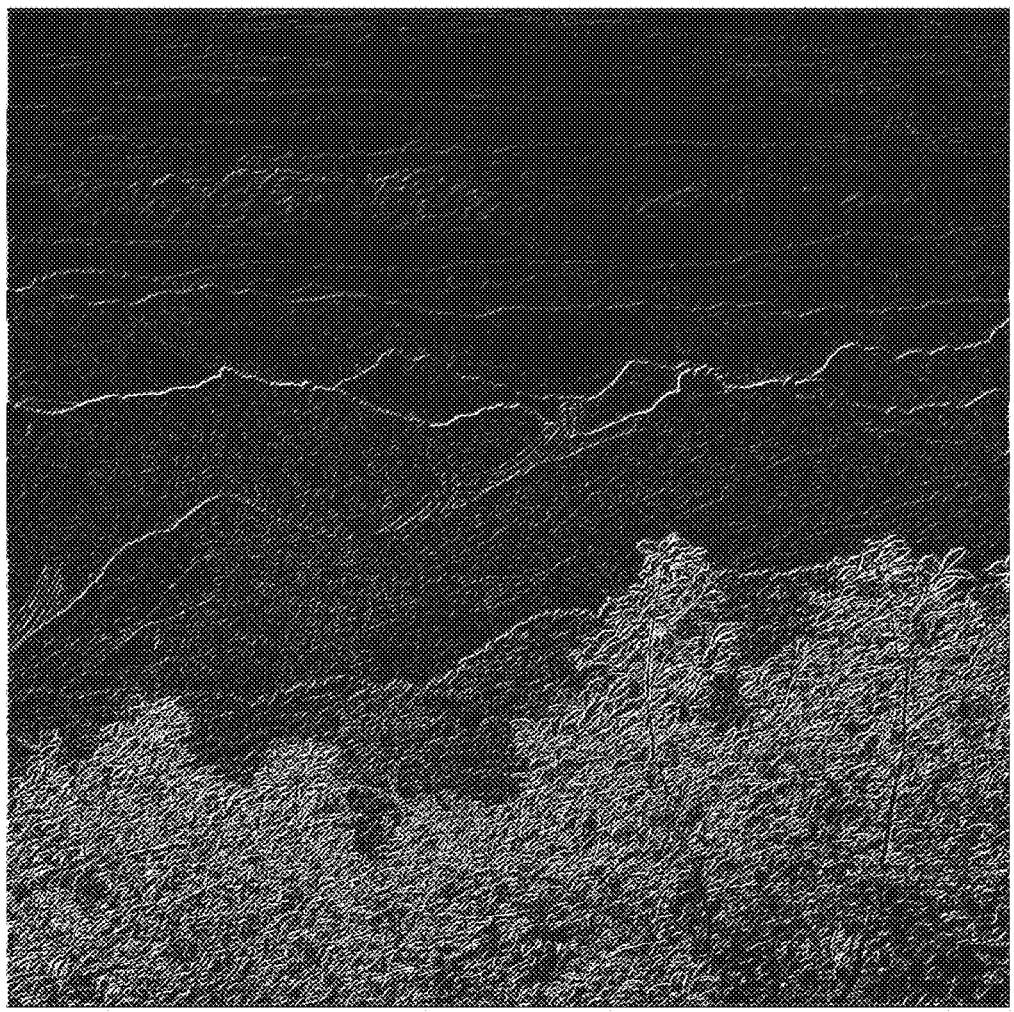
FIG. 41 is a view illustrating a truncated processed image obtained by Edge Detection Example 2.
Figure 42:
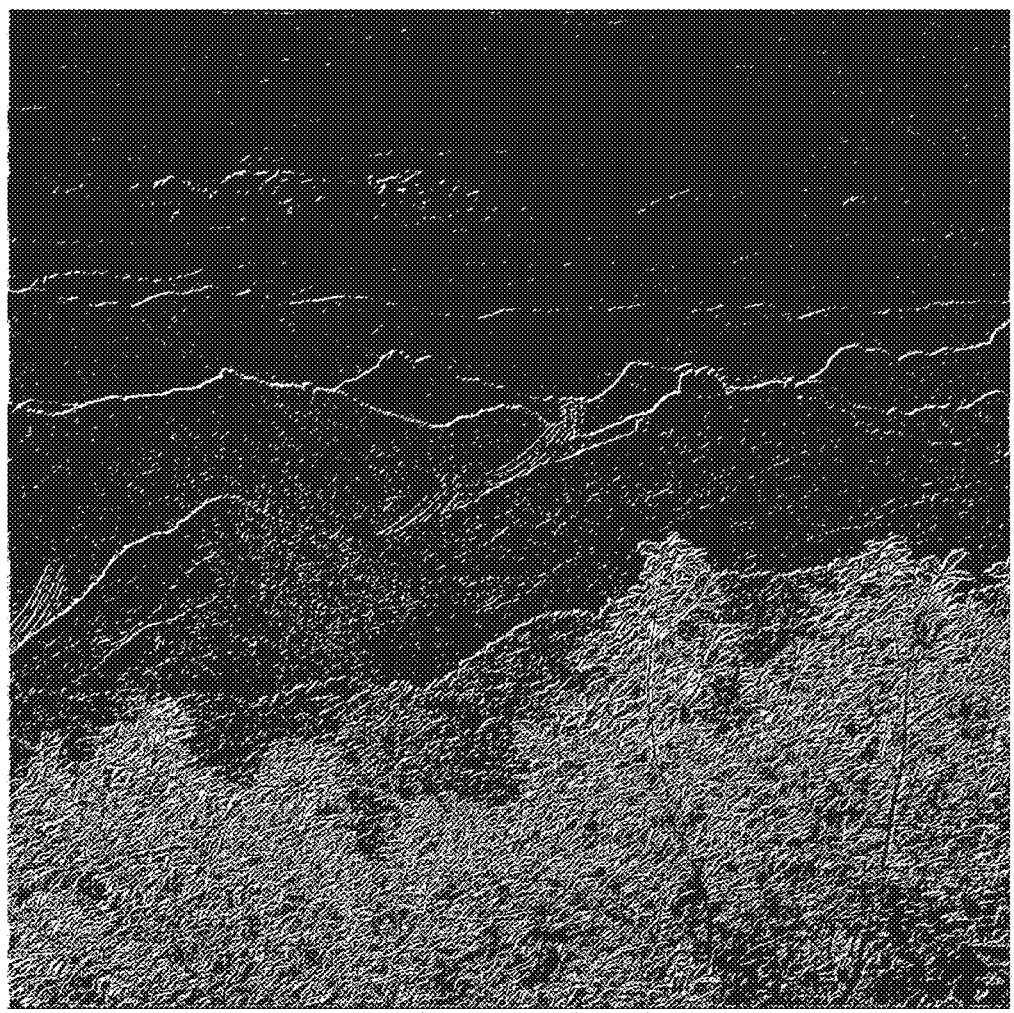
FIG. 42 is a view illustrating a binarized processed image obtained by Edge Detection Example 2.

FIG. 41 illustrates a truncated processed image obtained by Edge Detection Example 2, and FIG. 42 is a view illustrating a binarized processed image obtained by Edge Detection Example 2. In FIG. 41, truncation was performed at m1=0 and m2=2. FIG. 42 is a view illustrating the processed image binarized at t=0.4.

As illustrated in FIGS. 41 and 42, in Edge Detection Example 2, although the edge detection is at a lower level than that of Edge Detection Example 1 at portions other than the power lines, the power lines are detected better.

Figure 43:
FIG. 43 is a view illustrating an image obtained by adding a processed image sharpened by a factor of 15 through truncation of the original image.

In the present embodiment, the image sharpening can also be performed using the edge detection result. Specifically, the image sharpening can also be performed by adding and superimposing the processed image onto the original image. FIG. 43 is a view illustrating an image obtained by adding a processed image sharpened by a factor of 15 through the truncation to the original image. As illustrated in FIG. 43, the image allows the power lines to be seen.

[Edge Detection Example 3]

Another method for edge detection will be illustrated below. Specifically, using the multiresolution decomposition by pinwheel framelets, subband signals in the decomposition phase that do not contribute much to edges are set to zero or a value close to zero, whereby the edge detection is performed in which subband signals in the decomposition phase that contribute to edges are relatively emphasized. This is a simple method that does not need the calculation of the threshold, and is made possible by the variety of orientation selectivity and a variety of frequency selectivity of the pinwheel framelet. Although the function of adjustment is at a lower level than that of the methods describe above, high-speed processing can be performed by designing predetermined filters in advance.

Figure 44:
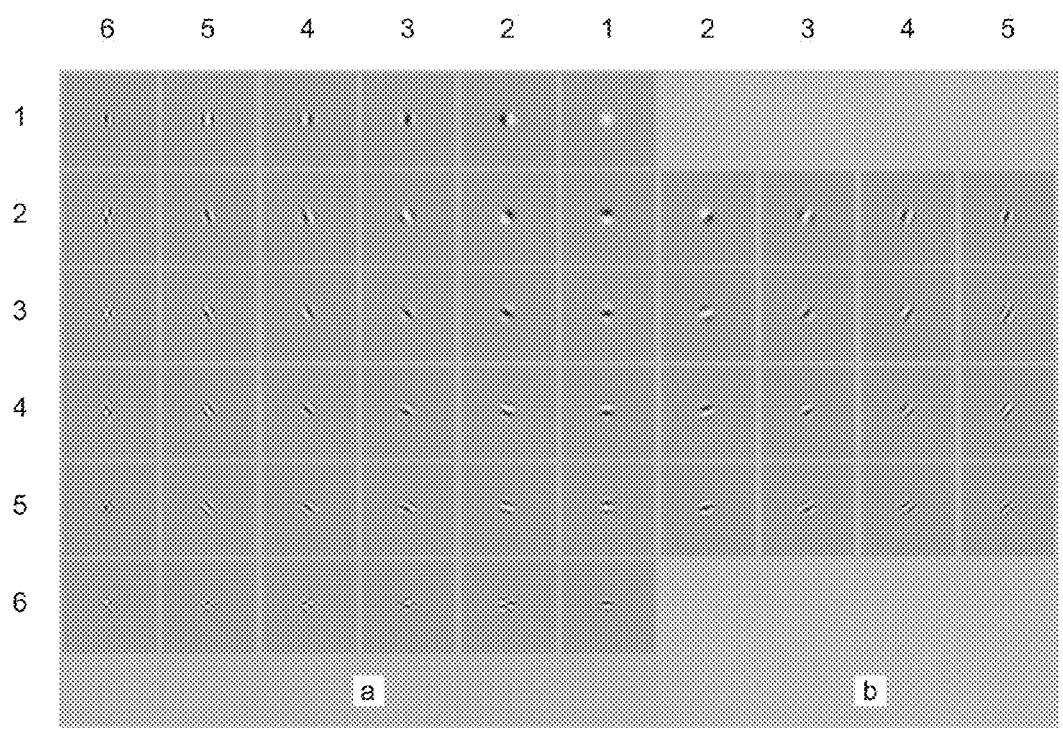
FIG. 44 is a diagram illustrating numbers corresponding to 52 subband signals in the decomposition phase of the pinwheel framelet of degree 5.

The following describes a case of pinwheel framelets of degree 5, as an example. In the case of degree 5, 52 subband signals in the decomposition phase are obtained at each level. For explanation purposes, these subband signals are numbered based on FIG. 44. While FIG. 44 is a diagram at level 2, the same applies to other levels. The numbers will be expressed as follows:

$$(x1, x2, Z, p)$$

Here, p is a digit representing a level; Z represents either side of a or b (36 filters on the left side belong to a, and 16 filters on the right side belong to b, in FIG. 44); x1 represents a row; and x2 represents a column. For example, in (5, 4, a, 2), "5" represents a row in FIG. 44; "4" represents a column in FIG. 44; "a" represents a of a and b; and "2" represents a level.

In the case of the wavelet, a "naive edge detection" method is known (refer to Non Patent Literature 6) in which all components constituting the approximation subband signals in the decomposition phase are attenuated to zero. This method may be applied to the pinwheel framelet. However, unlike the wavelet, the pinwheel framelet has a variety of detail subband signals in the decomposition phase. This allows the edge detection to be performed by selecting the detail subband signals in the decomposition phase that are not related to edges and zeroing or attenuating the components of those signals, thereby relatively amplifying the detail subband signals related to edges. This method can also be performed on other methods than the pinwheel framelet, such as a simple pinwheel framelet.

First, denoising of an original image is performed in this example. This may be performed by a method of the present embodiment or a known method. Next, the subband signals in the decomposition phase that contribute to edges are relatively amplified by zeroing the low-frequency subband signals in the decomposition phase that do not contribute to edges. For example, in the layout of FIG. 44, an area that does not contain (1, 1, a, 1) and surrounds (1, 1, a, 1) is divided in a plurality of directions into sector shapes while allowing overlapping. In each of the divided areas, an edge having a certain direction can be detected by zeroing or attenuating the subband signals not belonging to the divided area. If edges thus found need to be further extracted, the subband signals in the decomposition phase that do not relate to the edges to be extracted can be attenuated.

In the present embodiment, as the denoising, an image reconstructed as an approximate part at level 1 of the maximal overlap multiresolution decomposition by the pinwheel framelets of degree 3 was used as the original image. The maximal overlap multiresolution decomposition by the pinwheel framelets of degree 5 was performed on the original image, and subband signals in the decomposition phase having the same orientations as those of ridge lines of mountains, power poles, and power lines were left while subband signals in the decomposition phase related to high frequency representing detailed parts were zeroed. Specifically, the subbands in the decomposition phase were zeroed except those numbered (4, 3, b, 1), (4, 2, b, 1), (4, 3, a, 1), (4, 2, a, 1), (4, 1, a, 1), (3, 4, b, 1), (3, 3, b, 1), (3, 2, b, 1), (3, 3, a, 1), (3, 2, a, 1), (3, 1, a, 1), (2, 3, b, 1), (2, 2, b, 1), and (1, 2, a, 1). This is an example, and depending further on the use, subband signals in the decomposition phase that are not to be zeroed can be selected.

Figure 45:
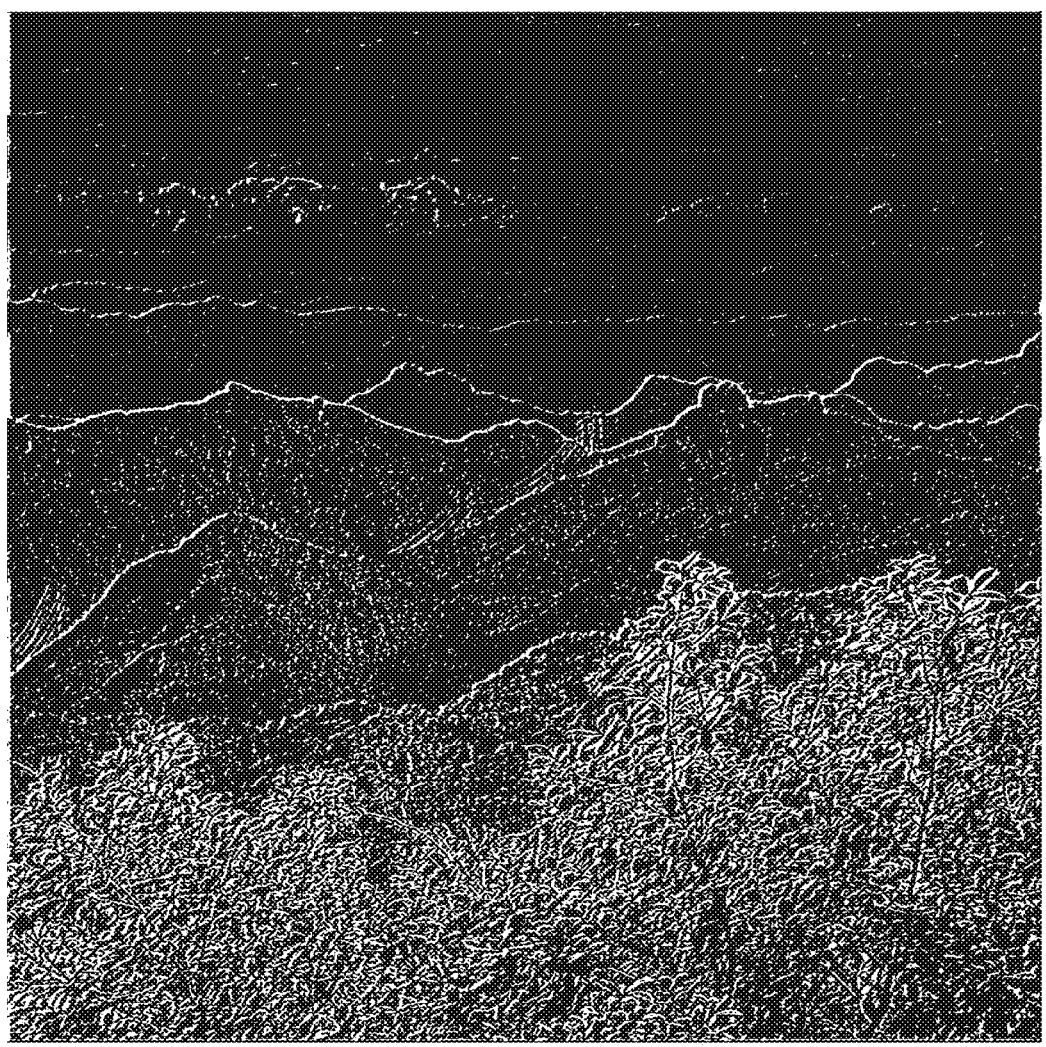
FIG. 45 is a view illustrating an image obtained by displaying, using the binarization method (t=0.37), a processed image obtained as a result of denoising.
Figure 46:
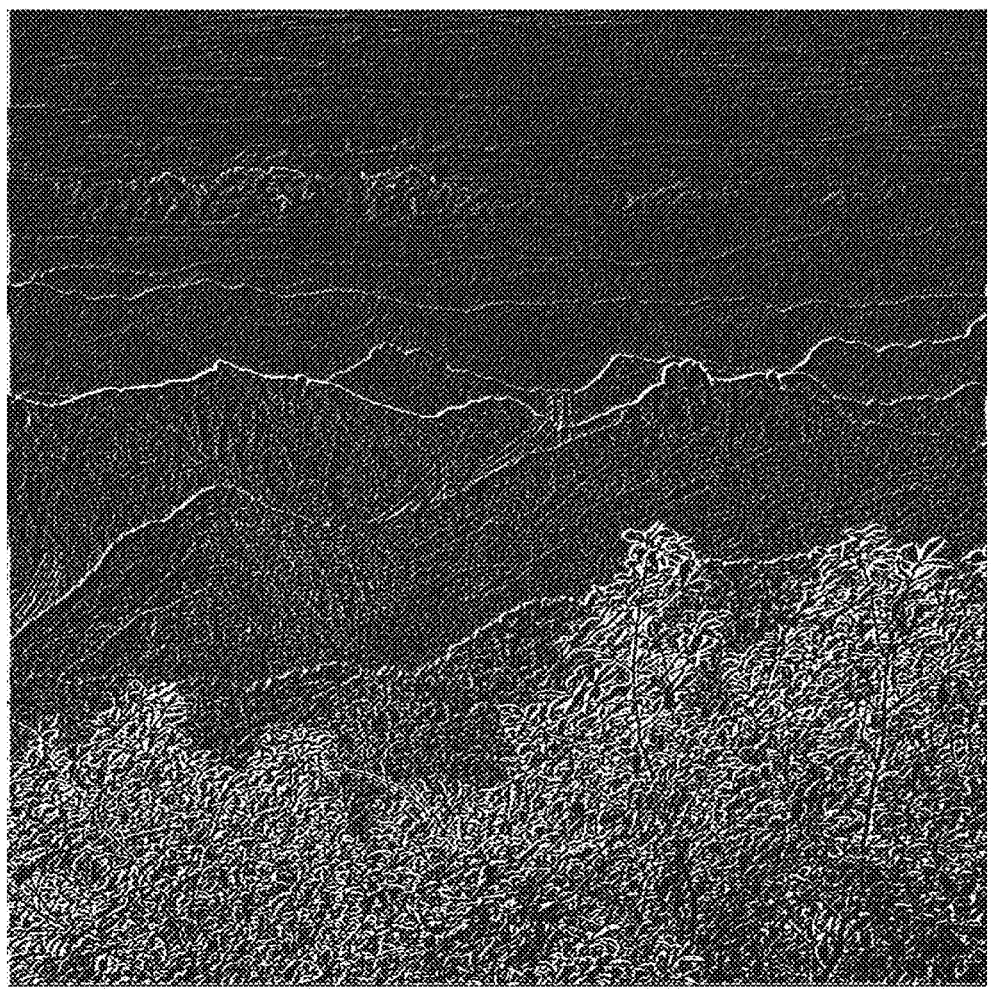
FIG. 46 is a view illustrating an image obtained by displaying the processed image using the method of truncation (m1=0 and m2=1).

FIG. 45 is a view illustrating an image obtained by displaying, using the binarization method (t=0.37), the processed image obtained as the result of the present edge detection, and FIG. 46 is a view illustrating an image obtained by displaying the processed image using the method of truncation (m1=0 and m2=1). Thus, it was verified that the edge detection can be performed with simple methods without calculating the threshold.

[2. (B) Other Types of Edge Detection]

While, in the edge detection, the high-frequency decomposition subband signals were used, image processing can also be performed using decomposition subband signals in other frequency bands. Various types of image processing can be performed by taking advantage of the high-level frequency decomposition function and the variety of orientation selectivity of the pinwheel framelet. While the denoising and the edge detection included the threshold processing performed on the decomposition subband signals, other linear or nonlinear processing can be applied to the image processing. These types of image processing can extract or emphasize certain features included in an image, and thus, examples will be illustrated below.

The maximal overlap multiresolution decomposition at level 2 by the pinwheel framelets of degree 7 was performed on the above-described original image used for the edge detection. Weighting illustrated in FIG. 47 was applied to decomposition subband signals at level 1, and weighting illustrated in FIG. 48 was applied to decomposition subband signals at level 2.

In this example, decomposition subband signals each having a slightly lower frequency than that of the edge detection are extracted. The threshold was set to a value obtained by multiplying the maximum possible value of each of the decomposition subband signals by 0.005, and the threshold processing by hard thresholding was performed. The decomposition subband signals after the threshold processing are denoted as S. A processed image was obtained via the synthesis phase.

Figure 49:
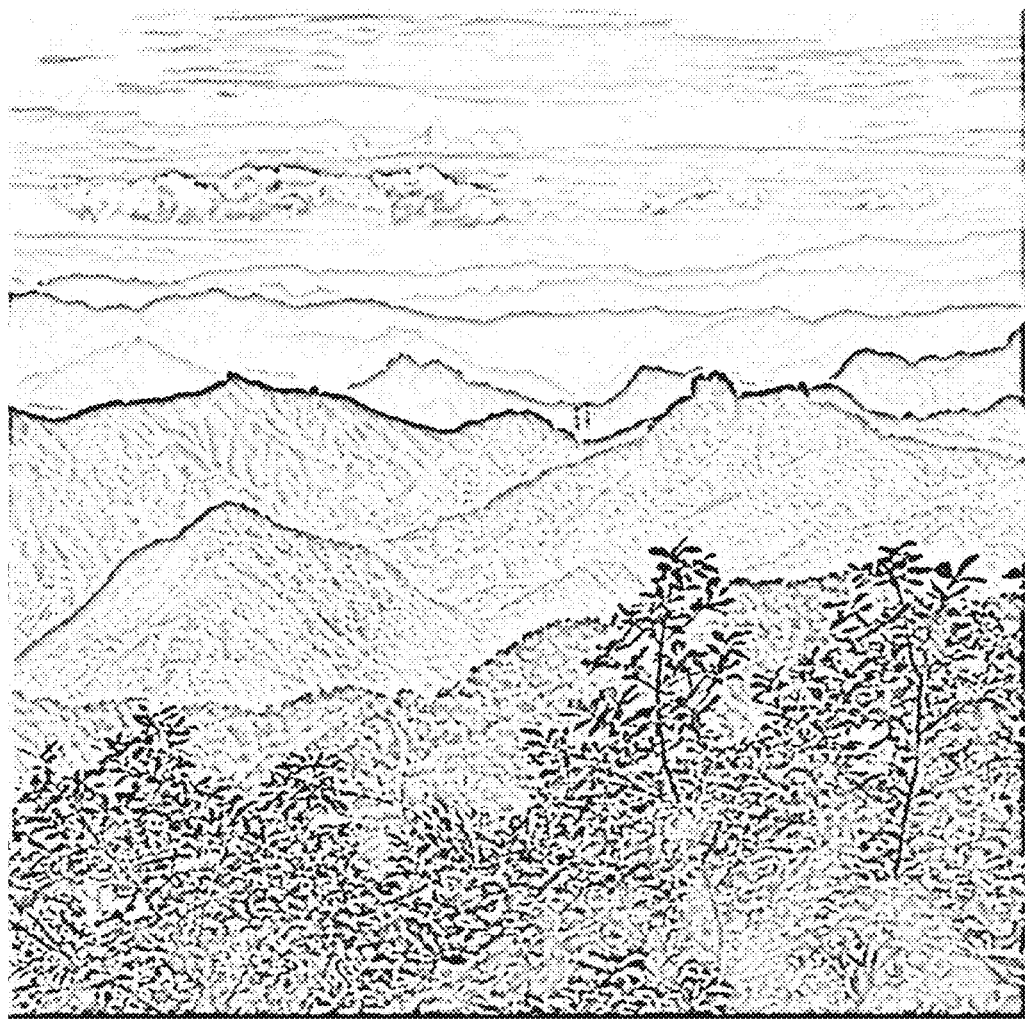
FIG. 49 is a view illustrating a processed image truncated at m1=−4 and m2=0.

FIG. 49 is a view illustrating the processed image truncated at m1=−4 and m2=0. As illustrated in FIG. 49, it was found that slightly rough features of the image were extracted. Hence, nonlinear processing by the SN function was performed on the decomposition subband signals S after being processed. "α" was set so that α=¾ using the same method as that of "Example of Coefficient Processing Using SN Function" described above. Because α<1, values of the detail coefficients having small absolute values are amplified, and values thereof having large absolute values are reduced. Then, the processed image via the synthesis phase was obtained.

Figure 50:
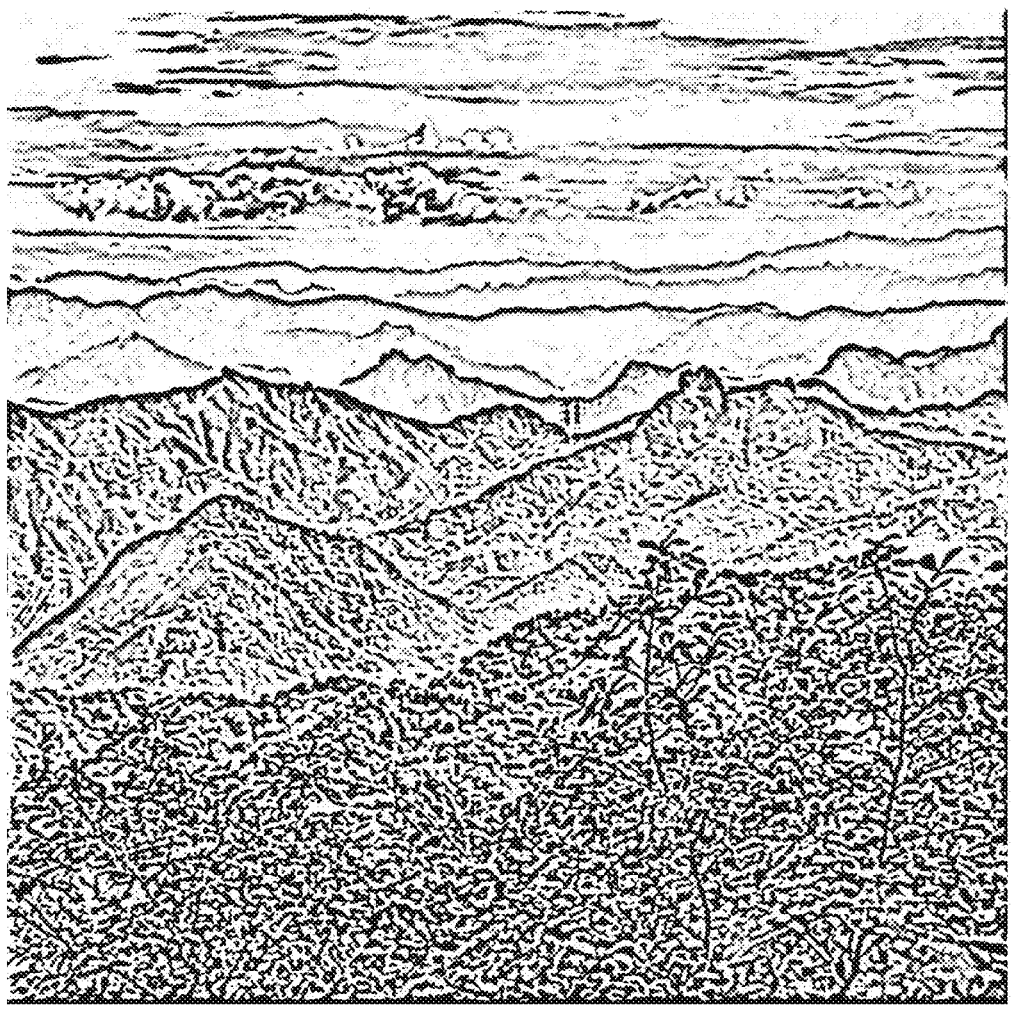
FIG. 50 is a view illustrating a processed image truncated at m1=−2 and m2=0.

FIG. 50 is a view illustrating a processed image truncated at m1=−2 and m2=0. It was found that portions that have appeared weak in the example of FIG. 49 appear stronger in FIG. 50. The nonlinear processing by the SN function was further performed by setting α=4/3 on the decomposition subband signals S after being processed. Because α>1, values of the detail coefficients having large absolute values are amplified, and values thereof having small absolute values are reduced. The processed image subjected to the synthesis phase was obtained.

Figure 51:
FIG. 51 is a view illustrating a processed image truncated at m1=−6 and m2=0.
Figure 52:
FIG. 52 is a view illustrating a result of the truncation at m1=0 and m2=255.

FIG. 51 is a view illustrating a processed image truncated at m1=−6 and m2=0. It was found that, as illustrated in FIG. 51, portions, such as the neighborhood of ridge lines of mountains and trees on the near side, originally having strong features are emphasized. A sharpened image illustrated in FIG. 52 is obtained by adding, to the original image, an image obtained by truncating the processed image at m1=−6 and m2=6 so as to be sharpened by a factor of 5. FIG. 52 displays the image obtained by performing the truncation at m1=0 and m2=255. As illustrated in FIG. 52, an easily viewable image was obtained in which ridge lines, which are impressive in images of mountains, were appropriately sharpened.

[3. Feature Extraction Giving Three-Dimensional Appearance]

In this example, a description will be made of a coefficient output processed image obtained, without passing through the synthesis phase and without being reconstructed, as an output image obtained by weighting and summing the decomposition detail coefficients that have been processed. A two-dimensional image of an object may appear three-dimensional if a shadow produced when light is cast on the object from a certain direction is expressed. In fact, pictures have actually been drawn that appear three-dimensional by taking advantage of such characteristics of human perception.

The pinwheel framelet has the variety of orientation selectivity, and in particular, the filter that generates the subband signals in the decomposition phase includes the even one and the odd one. Thus, by taking advantage of these characteristics, edges with shadows can be automatically created so as to create an edge detection image with a three-dimensional appearance. The three-dimensional appearance obtained by this example is sensory, and does not express a physical three-dimensional perspective. The purpose is to make edges easily visible by giving a viewer of the image a three-dimensional feel.

In the following example, the maximal overlap multiresolution decomposition by the pinwheel framelets of degree 5 was performed on an original image. For example, in the case of the example described below, to give steam in the image a three-dimensional appearance, a subband signal numbered (1, 4, a, 1), five times a subband signal numbered (2, 1, a, 1), five times a subband signal numbered (2, 2, a, 1), a subband signal numbered (3, 4, a, 1), five time a subband signal numbered (2, 2, b, 1), and a subband signal numbered (3, 4, b, 1) among the subband signals in the decomposition phase were added so that shadows may be cast in the direction of the steam. Here, the expressions specifying the decomposition subband signals are the same as those of "Edge Detection Example 3" described above, and are illustrated in FIG. 44.

Figure 53:
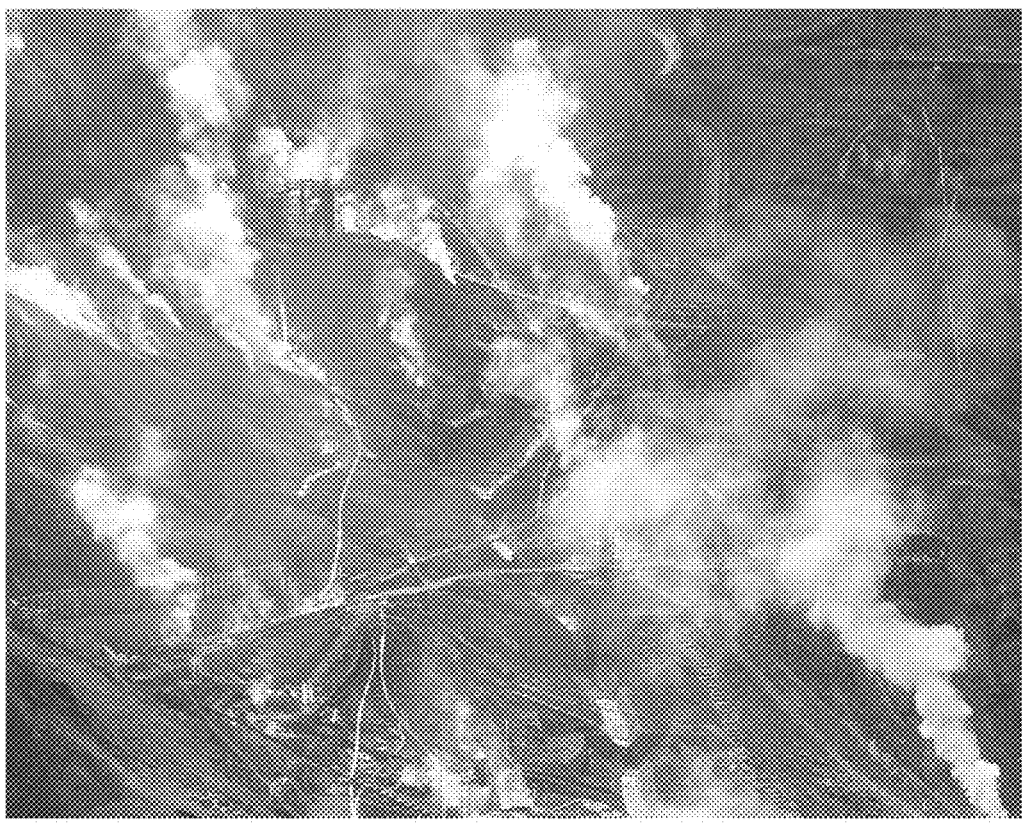
FIG. 53 is a view illustrating an original image.
Figure 54:
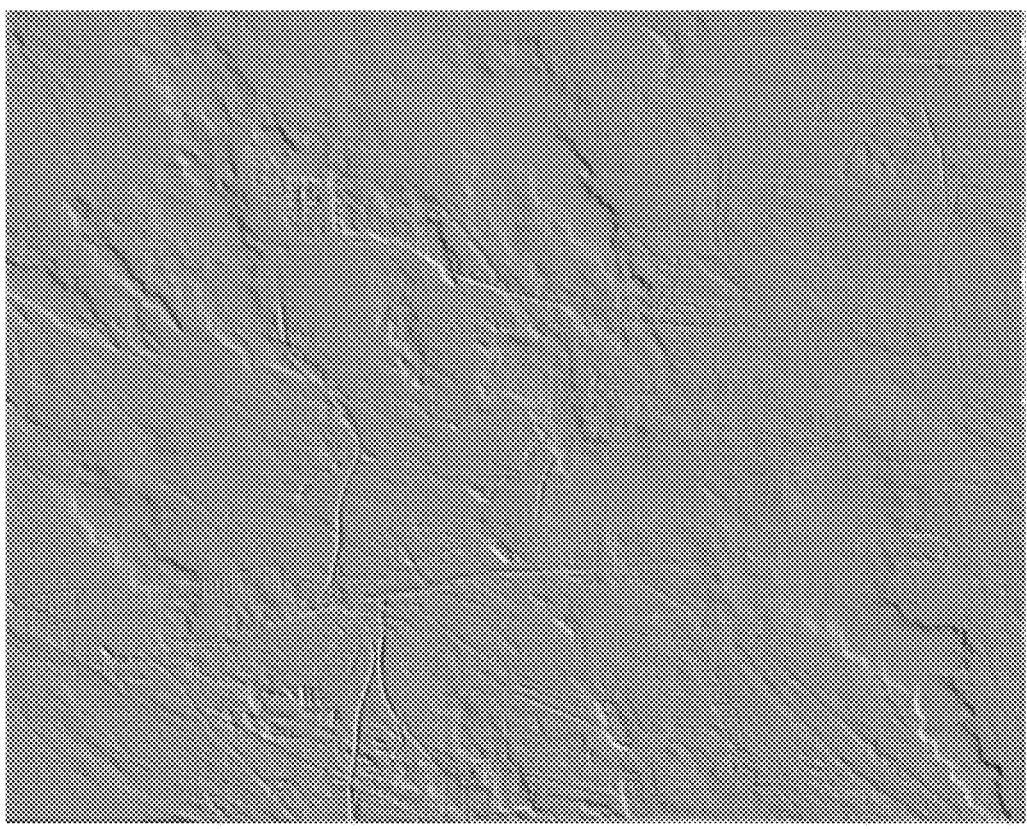
FIG. 54 is a view illustrating a result of feature extraction giving a three-dimensional appearance.

FIG. 53 illustrates the original image, and FIG. 54 is a view illustrating a result of the feature extraction giving a three-dimensional appearance. In the present example, the processing is performed at one level. In a case in which decomposition subband signals weighted across a plurality of levels are added, the decomposition subband signals may be added after misalignments in position are corrected.

Figure 55:
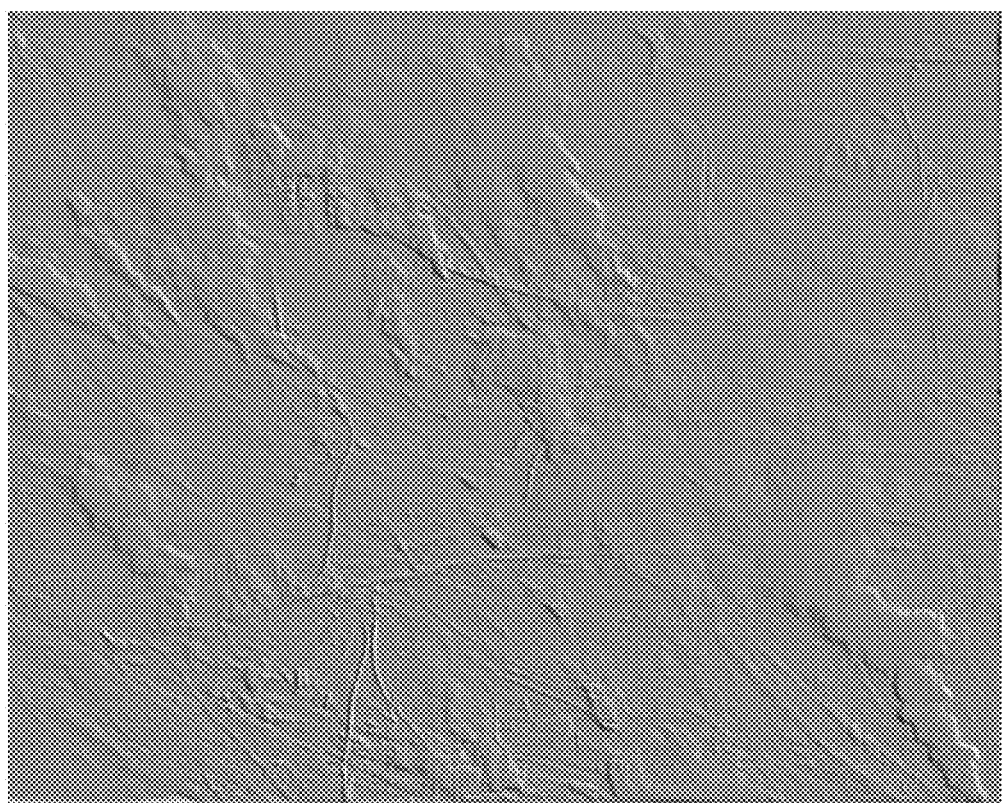
FIG. 55 is a view illustrating an image displayed with tone levels inverted from those of the output image on which the feature extraction giving a three-dimensional appearance was performed.

As illustrated in FIG. 54, the steam looks bulging, and appears three-dimensional, whereby the edges can be viewed more easily than those by the normal edge detection. However, the appearance differs among individuals, and the steam may look depressed to some people. Hence, an image displayed with tone levels inverted was created. FIG. 55 is a view illustrating the image displayed with tone levels inverted from those of the output image that had been processed by the feature extraction giving a three-dimensional appearance.

An optical illusion in which a planar image looks bulging or depressed depending on how the shadows are cast is called a "crater illusion". The feature extraction giving a three-dimensional appearance also has a function of automatically generating the crater illusion from a planar image.

In the original image of FIG. 53, the state of the ground is hardly recognizable due to being hidden by the steam, and the state of the steam is also hardly recognizable. In the processed image of FIG. 54 or 55, the state of the steam is easier to recognize because of the three-dimensional appearance given to the steam, whereby the state of the ground is also easier to recognize. In conventional methods, it has been difficult to detect edges of an overlapping object, such as the steam covering the ground, so as to be easily recognizable. The present embodiment brings about an effect that an easily visible processed image can also be provided for three-dimensionally overlapping objects. Image processing of, for example, an X-ray picture is possible as an application example.

While examples of various types of image processing have been cited above, the pinwheel framelet has a variety of filters, and thereby is not limited to being used in the above-described examples, but can also be used as filters for a variety of applications.

[Pinwheel Framelet]

In the present embodiment, as described above, a pinwheel framelet to be used as an example may be a wavelet frame with orientation selectivity, such as the well-known simple pinwheel framelet or pinwheel wavelet frame, or a filterbank with orientation selectivity. A pinwheel framelet will be described below.

For the symmetric matrix given by $A=(A_{k,l})$: $(n+1) \times (n+1)$, a matrix that satisfies $A_{s,t}=A_{n-s,t}=A_{s,n-t}=A_{n-s,n-t}=s$ is determined, where degree n is odd and n≥3, s=0, 1, ..., [n/2], and t=s, ..., [n/2]. [ ] is Gauss symbol.

If n=7, the following matrix satisfies the condition.

$$A = \begin{pmatrix} 0 & 0 & 0 & 0 & 0 & 0 & 0 & 0 \\ 0 & 1 & 1 & 1 & 1 & 1 & 1 & 0 \\ 0 & 1 & 2 & 2 & 2 & 2 & 1 & 0 \\ 0 & 1 & 2 & 3 & 3 & 2 & 1 & 0 \\ 0 & 1 & 2 & 3 & 3 & 2 & 1 & 0 \\ 0 & 1 & 2 & 2 & 2 & 2 & 1 & 0 \\ 0 & 1 & 1 & 1 & 1 & 1 & 1 & 0 \\ 0 & 0 & 0 & 0 & 0 & 0 & 0 & 0 \end{pmatrix}$$ [Expression 11]

If the matrix is given by $B=(B_{k,l})$: $(n+1) \times (n+1)$, B is a matrix satisfying the following condition (P).

$$\text{Condition } (P): \begin{cases} B_{k,l} = B_{l,k} \\ B_{k,l} = B_{n-k,l} = B_{k,n-l} = B_{n-k,n-l} \\ B_{k,l} \geq 0 \end{cases} \quad [\text{Expression 12}]$$

$$n_0 = \left[\frac{n}{2}\right] \text{ there are } \frac{1}{2}(n_0+1)(n_0+2) \text{ free variables} \quad [\text{Expression 13}]$$

$$F^1_{k,l}(\theta_1, \theta_2) = \frac{1}{2}|\det M|^{1/2} i^{k+l+A_{k,l}} e^{-\pi i \theta_1} e^{-\pi i \theta_2} \sqrt{B_{k,l}} \quad [\text{Expression 14}]$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (-\cos(\pi x)\sin(\pi x) + \cos(\pi y)\sin(\pi y))^{A_{k,l}}$$

$$F^2_{k,l}(\theta_1, \theta_2) = \frac{1}{2}|\det M|^{1/2} i^{k+l+A_{k,l}} e^{-\pi i \theta_1} e^{-\pi i \theta_2} \sqrt{B_{k,l}} \quad [\text{Expression 15}]$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (\cos(\pi x)\sin(\pi x) + \cos(\pi y)\sin(\pi y))^{A_{k,l}}$$

where M is a sampling matrix of a rectangular grid, a quincunx grid, or a hexagonal grid.

$$f^1_{k,l} \leftrightarrow F^1_{k,l}; f^2_{k,l} \leftrightarrow F^2_{k,l} \quad [\text{Expression 16}]$$

$$\Lambda_f = \{(0,0),(0,n),(n,0),(n,n)\}$$

$$\Lambda_g = \{(k,l)\}_{k=0,n;l=1,\ldots,n-1} \cup \{(k,l)\}_{l=0,n;k=1,\ldots,n-1}$$

$$\Lambda_a = \{(k,l)\}_{k=1,n-1;l=1,\ldots,n-1}$$

$$P_n = \{\sqrt{2}f^1_{k,l}\}_{(k,l)\in\Lambda_f\cup\Lambda_g} \cup \{f^1_{k,l}\}_{(k,l)\in\Lambda_a} \cup \{f^2_{k,l}\}_{(k,l)\in\Lambda_a} \quad [\text{Expression 18}]$$

Lemma 2 (H.&S. Arai, 2008) The necessary and sufficient condition that Pn be a framelet filter relating to a rectangular grid, a quincunx grid, or a hexagonal grid is that $B=(B_{k,l})$ satisfies the following condition.

$$\sum_{k=0}^{n}\sum_{l=0}^{n}\sum_{j=1}^{2}|F^j_{k,l}(\theta_1,\theta_2)|^2 \equiv |\det M| \quad [\text{Expression 19}]$$

<Method of Determining $B=(B_{k,l})$ Satisfying the Above Condition>

$\{(k,l): k=0, 1, \ldots, n_0, l=s, \ldots, n_0,\}$ is ordered as follows.

[Expression 20]

| (0,0) | (0,1) | (0,2) | ... | $(0, n_0-1)$ | $(0, n_0)$ |
|---|---|---|---|---|---|
|  | (1,1) | (1,2) | ... | $(1, n_0-1)$ | $(1, n_0)$ |
|  |  |  | ⋱ | ⋮ | ⋮ |
|  |  |  |  | $(n_0-1, n_0-1)$ | $(n_0-1, n_0)$ |
|  |  |  |  |  | $(n_0, n_0)$ |

↕

| 1 | 2 | 3 | ... | $n_0$ | $n_0+1$ |
|---|---|---|---|---|---|
|  | $n_0+2$ | $n_0+3$ | ... | $2n_0$ | $2n_0+1$ |
|  |  |  | ⋱ | ⋮ | ⋮ |
|  |  |  |  | $\frac{1}{2}n_0(n_0+3)-1$ | $\frac{1}{2}n_0(n_0+3)$ |
|  |  |  |  |  | $\frac{1}{2}(n_0+1)(n_0+2)$ |

$\mu=(k, l)$, $\nu=(k', l')$ $$K_{\mu,\nu} = 2^{3-4n+4k}(-1)^l \quad [\text{Expression 21}]$$
$$\sum_{p=0}^{k}\left\{\binom{2k}{2p}\left[\sum_{q=0}^{2k-2p}(-1)^q\binom{-2k-2p+2n}{2k'-2p+n-q}\right.\right.$$
$$\binom{2k-2p}{q}\right] \times \left[\sum_{q=0}^{2p+2l-2k}(-1)^q$$
$$\binom{2p+2n-2k-2l}{2l'+2p+n-2k-q}$$
$$\binom{2p+2l-2k}{q}\right] + \left[\sum_{q=0}^{2k-2p}(-1)^q$$
$$\binom{-2k-2p+2n}{2l'-2p+n-q}$$
$$\binom{2k-2p}{q}\right] \times \left[\sum_{q=0}^{2p+2l-2k}(-1)^q$$
$$\binom{2p+2n-2k-2l}{2k'+2p+n-2k-q}$$
$$\left.\left.\binom{2p+2l-2k}{q}\right]\right\}$$

$$\begin{pmatrix} K_{1,1} & \cdots & K_{1,\frac{1}{2}(n_0+1)(n_0+2)} \\ \vdots & \ddots & \vdots \\ K_{\frac{1}{2}(n_0+1)(n_0+2),1} & \cdots & K_{\frac{1}{2}(n_0+1)(n_0+2),\frac{1}{2}(n_0+1)(n_0+2)} \end{pmatrix} \quad [\text{Expression 22}]$$

$$\begin{pmatrix} X_1 \\ X_2 \\ \vdots \\ X_{\frac{1}{2}(n_0+1)(n_0+2)} \end{pmatrix} = \begin{pmatrix} 4 \\ 0 \\ \vdots \\ 0 \end{pmatrix}$$

$$B_{k,l} = \quad [\text{Expression 23}]$$
$$\begin{cases} 2X_s & s = \frac{1}{2}(k-1)(2n_0-k+4)+1, k=1,\ldots,n_0 \\ X_s & \text{other} \end{cases}$$

Figure 56:
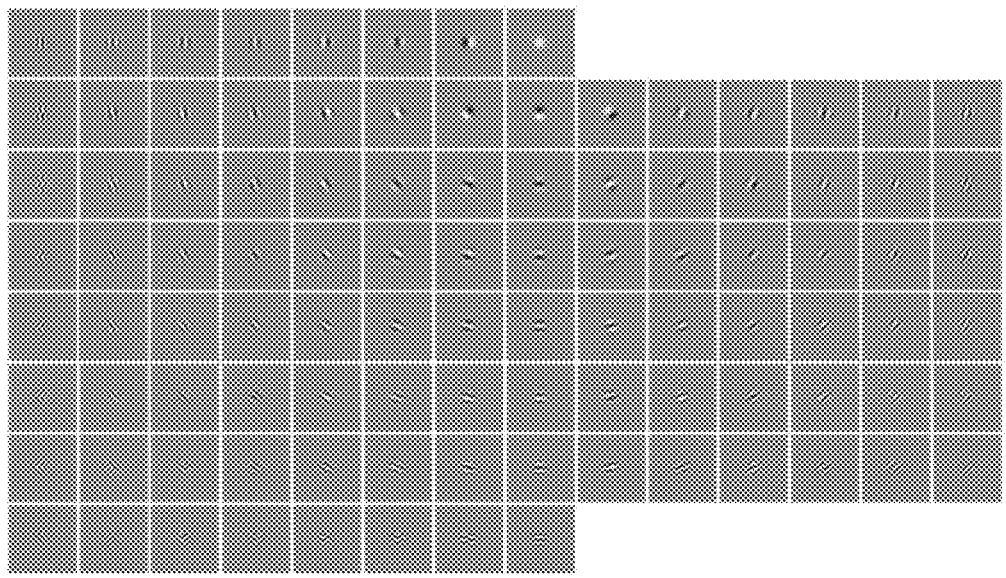
FIG. 56 is a diagram illustrating filters obtained by calculating the cyclic correlation product of maximal overlap pinwheel framelet filters at level 2 of degree 7 and a maximal overlap pinwheel framelet approximate filter at level 1.
Figure 57:
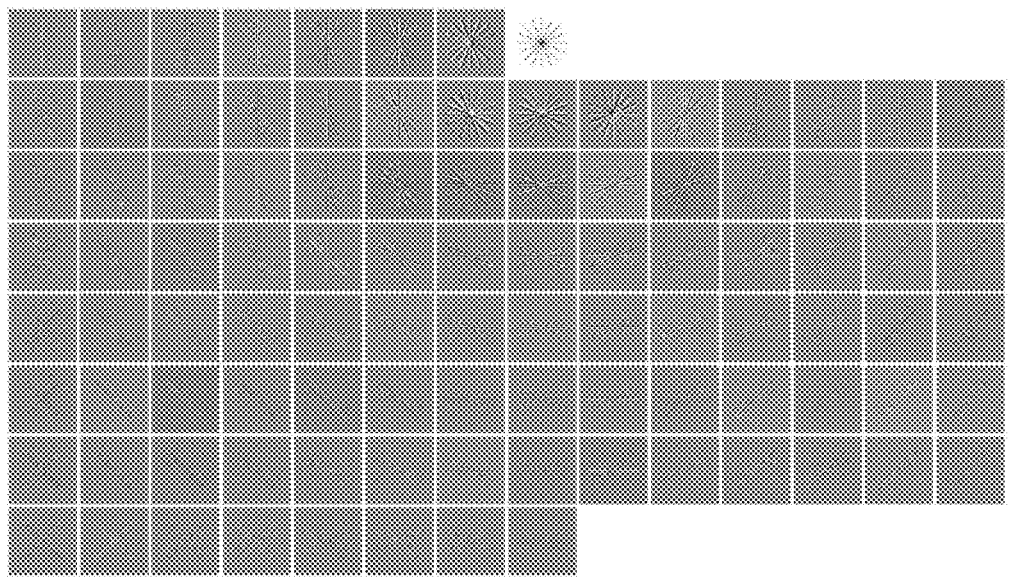
FIG. 57 is a diagram illustrating synthesis subband signals obtained as a result of the 2nd stage of maximal overlap MRA decomposition performed on a test image using a pinwheel framelet of degree 7.

Theorem 3 (H.&S. Arai, 2008) $B=(B_{k,l})$ determined above satisfies Lemma 2. Therefore, Pn is a framelet filter relating to a rectangular grid, a quincunx grid, or a hexagonal grid. Pn is referred to as a pinwheel framelet of degree n. FIG. 56 is a diagram illustrating the filters obtained by calculating the cyclic correlation product of maximum overlap pinwheel framelet filters at level 2 and an approximate filter at level 1. FIG. 57 is a diagram illustrating each synthesized subband signal of the result obtained by performing the 2nd stage of maximal overlap MRA decomposition by a pinwheel framelet on a test image.

This is the end of the explanation of the present embodiment.

As has been described in detail, according to the present embodiment, it is possible to provide an image processing apparatus, an image processing method, a program, a printing medium, and a recording medium that allow performing of various types of image processing, such as natural image sharpening, detection of various edges, and denoising. Hence, the present embodiment is highly useful in fields such as image processing and image analysis of, for example, medical images, aerial photographs, and satellite images. According to the present embodiment, it is also possible to provide an image processing apparatus, an image processing method, a program, a printing medium, and a recording medium that allow performing of natural image sharpening on color images. In particular, the color contrast illusion is related to appearance of colors of, for example, products, and thereby is highly useful, for example, in industries (such as printing, design, video, and painting industries) that manufacture and sell colored products and the like, and in service industries that provide services such as videos.

Other Embodiments

The embodiment of the present invention has been described above, and the present invention can be implemented by various different embodiments within the scope of the technical idea described in the claims in addition to the above-described embodiment.

For example, a case has been described in which a uniform perceptual color space (L*a*b* representation system) by the International Commission on Illumination (CIE) is used as a color space in the embodiment described above. However, the color space is not limited to this, but the color components may be used in another color space, provided that the color space is similar to that of the human vision.

For example, an explanation is given of the case where the image processing apparatus 100 performs the processing in stand-alone mode as an example; however, the image processing apparatus 100 may perform the processing in response to a request from a client terminal (cabinet different from the image processing apparatus 100) and return the processing results to the client terminal. For example, the image processing apparatus 100 may be configured as an ASP server, receive the original image data transmitted from a user terminal via the network 300, and return the reconstructed image data for the processed image processed on the basis of this original image data to the user terminal.

Moreover, among the processings described in the embodiment, all or part of the processings described as automatic processing may be performed manually and all or part of the processings described as manual processing may be performed automatically by well-known methods.

In addition thereto, the processing procedures, the control procedures, the specific names, the information including registered data of each processing and parameters, such as retrieval conditions, the screen examples, and the database configurations, described in the literature and drawings above may be arbitrarily modified unless otherwise indicated.

Furthermore, each component of the image processing apparatus 100 illustrated in the drawings is formed on the basis of functional concept, and is not necessarily configured physically the same as those illustrated in the drawings.

For example, all or any part of the processing functions that the devices in the image processing apparatus 100 have, and particularly each processing function performed by the control unit 102, may be implemented by a central processing unit (CPU) and a program interpreted and executed by the CPU, or may be implemented as hardware by wired logic. The program is recorded in a non-temporary computer-readable recording medium (to be described later) that includes programmed instructions for causing the computer to execute the method according to the present invention, and is mechanically read into the image processing apparatus 100 as necessary. Specifically, the storing unit 106, such as a ROM and an HDD (Hard Disk Drive), or the like records a computer program for providing instructions to the CPU in cooperation with the OS (Operating System) and for executing various processings. This computer program is executed by being loaded into a RAM and configures the control unit in cooperation with the CPU.

Moreover, this computer program may be stored in an application program server that is connected to the image processing apparatus 100 via the arbitrary network 300, and all or part thereof may be downloaded as necessary.

Furthermore, the program according to the present invention may be stored in a computer-readable recording medium and may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blue-ray (a registered trademark) Disc.

Moreover, the "program" refers to a data processing method written in any language and any description method and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS (Operating System). Well-known configurations and procedures can be used for the specific configuration and reading procedure for reading a recording medium, the installation procedure after reading a recording medium, and the like in each device illustrated in the present embodiment.

Various databases and the like (the framelet file 106a and the image data file 106b) stored in the storing unit 106 are a storage unit, examples of which are a memory device, such as a RAM and a ROM, a fixed disk drive, such as a hard disk, a flexible disk, and an optical disk, and store various programs, tables, databases, files for web pages, and the like that are used for various processings or providing websites.

Moreover, the image processing apparatus 100 may be configured as an information processing apparatus, such as well-known personal computer and workstation, or may be configured by connecting an arbitrary peripheral device to the information processing apparatus. Moreover, the image processing apparatus 100 may be realized by installing software (including program, data, and the like) that causes the information processing apparatus to realize the method in the present invention.

Furthermore, a specific form of distribution/integration of the devices is not limited to those illustrated in the drawings, and all or a part thereof can be configured by functionally or physically distributing or integrating them in any desired units according to, for example, various additions, or according to functional loads. In other words, the above-described embodiments may be implemented by combining them in any desired manner, or the embodiments may be selectively performed. Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 100 image processing apparatus
102 control unit
102a decomposing unit
102b coefficient processing unit
102c processed image acquiring unit
102d reconstructing unit 102f color space conversion unit
102g processed image output unit
104 communication control interface unit
106 storing unit
106a framelet file
106b image data file
108 input/output control interface unit
112 input device
114 output device
200 external system
300 network

The invention claimed is:

1. An image processing apparatus that comprises at least a memory device and a processor, wherein
the memory device comprises:
a filter storing unit that stores a broad-sense pinwheel framelet or a pinwheel wavelet frame, having a degree, that is a set of an approximate filter with no orientation and a plurality of detail filters with respective orientations; and
an image data storing unit that stores image data;
the processor comprises:
a decomposing unit that obtains subband signals by performing multiresolution decomposition on the image data using the broad-sense pinwheel framelet or the pinwheel wavelet frame; and
a processed image acquiring unit that acquires processed image data formed by the subband signals in a decomposition phase of the multiresolution decomposition that have been obtained by the decomposing unit, or processed image data that has been reconstructed into an image by summing the subband signals in a synthesis phase of the multiresolution decomposition; and
the decomposing unit further comprises a processing unit that performs attenuation or amplification of any of the subband signals in the decomposition phase of the multiresolution decomposition corresponding to at least one of the filters.

2. The image processing apparatus according to claim 1, wherein the processing unit performs linear or nonlinear coefficient processing on the subband signals in the decomposition phase.

3. The image processing apparatus according to claim 1, wherein the processing unit performs threshold processing on the subband signals in the decomposition phase.

4. The image processing apparatus according to claim 1, wherein the processing unit performs coefficient processing so as to reduce values having small absolute values to be smaller in absolute value as energy of decomposition detail coefficients constituting the subband signals in the decomposition phase is larger, and so as to further enhance values having small absolute values as the energy of the decomposition detail coefficients is smaller.

5. The image processing apparatus according to claim 1, wherein the processing unit attenuates or amplifies the subband signals in the decomposition phase corresponding to at least one of filters among the filters having predetermined frequency characteristics and/or predetermined orientations.

6. The image processing apparatus according to claim 5, wherein the predetermined frequency characteristics are specified according to a position in a predetermined filter arrangement based on an orientation at each level of the broad-sense pinwheel framelet or the pinwheel wavelet frame, and/or according to a level in the multiresolution decomposition.

7. The image processing apparatus according to claim 1, wherein the processing unit relatively amplifies subband signals in the decomposition phase corresponding to at least one of odd filters among the filters having predetermined frequency characteristics and/or predetermined orientations.

8. The image processing apparatus according to claim 1, wherein the processing unit relatively amplifies the subband signals in the decomposition phase corresponding to at least one of odd filters among the filters having predetermined frequency characteristics and/or predetermined orientations, and relatively attenuates subband signals in the decomposition phase corresponding to at least one of even filters.

9. The image processing apparatus according to claim 1, wherein the processing unit attenuates or amplifies the subband signals in the decomposition phase by performing processing on decomposition detail coefficients and/or decomposition approximation coefficients output from the decomposition phase.

10. An image processing apparatus that comprises at least a memory device and a processor, wherein
the memory device comprises:
a filter storing unit that stores a wavelet frame with orientation selectivity or a filterbank with orientation selectivity that is a set of an approximate filter with no orientation and a plurality of detail filters with respective orientations; and
an image data storing unit that stores image data;
the processor comprises:
a decomposing unit that obtains subband signals by performing multiresolution decomposition on respective color components of the image data using the wavelet frame with orientation selectivity or the filterbank with orientation selectivity, and
a reconstructing unit that obtains reconstructed image data by reconstructing an image by summing the subband signals of the respective color components in a synthesis phase that have been obtained by the decomposing unit; and
the decomposing unit further comprises a coefficient processing unit that performs coefficient processing, between the decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

11. The image processing apparatus according to claim 10, wherein the color components are L*, a*, and b* in a CIELAB color space, or respective color components in a color space similar to that of human vision.

12. The image processing apparatus according to claim 11, wherein the coefficient processing unit performs the coefficient processing that has been corrected with respect to the color component(s) of a* and/or b* of the image data so as to reduce values having small absolute values to be smaller in absolute value as energy determined by the decomposition detail coefficient(s) of a* and/or b* and the decomposition detail coefficient in L* is larger, and so as to further enhance values having small absolute values as the energy is smaller.

13. The image processing apparatus according to claim 10, wherein the coefficient processing unit performs the coefficient processing using a function that automatically continuously changes into an S-shaped curve when the energy of the decomposition detail coefficients is large and into an N-shaped curve when the energy is small.

14. The image processing apparatus according to claim 10, wherein, between the decomposition phase and the synthesis phase, the coefficient processing unit normalizes the decomposition detail coefficients, then performs the coefficient processing on the normalized decomposition detail coefficients using a norm of the normalized decomposition detail coefficients as the energy, and performs inverse operation of the normalization on the normalized decomposition detail coefficients that have been processed by the coefficient processing.

15. The image processing apparatus according to claim 10, wherein the coefficient processing unit optionally performs different processing according to differences in sign among the decomposition detail coefficients.

16. The image processing apparatus according to claim 10, wherein the decomposing unit performs the multiresolution decomposition using a biorthogonal wavelet filterbank, orientations of which include horizontal, vertical and diagonal directions, or a broad-sense pinwheel framelet or a pinwheel wavelet frame, orientations of which are multidirectional.

17. The image processing apparatus according to claim 10, wherein the multiresolution decomposition by the decomposing unit is maximum thinning multiresolution decomposition or partial thinning partial multiresolution decomposition.

18. The image processing apparatus according to claim 10, wherein the processor further comprises output unit that outputs a comparison result of the image data stored in the image data storing unit and the reconstructed image data.

19. The image processing apparatus according to claim 10, wherein the image data stored in the image data storing unit is color contrast illusion image.

20. An image processing method performed by an image processing apparatus that comprises at least a memory device and a processor, wherein
the memory device comprises:
a filter storing unit that stores a broad-sense pinwheel framelet or a pinwheel wavelet frame, having a degree, that is a set of an approximate filter with no orientation and a plurality of detail filters with respective orientations; and
an image data storing unit that stores image data;
the method comprising:
a decomposing step of obtaining subband signals by performing multiresolution decomposition by the broad-sense pinwheel framelet or the pinwheel wavelet frame on the image data; and
a processed image acquiring step of acquiring processed image data formed by the subband signals in a decomposition phase of the multiresolution decomposition that have been obtained at the decomposing step, or processed image data that has been reconstructed into an image by summing the subband signals in a synthesis phase of the multiresolution decomposition;
the decomposing step and the processed image acquiring step being performed by the processor, and
the decomposing step further comprising a processing step of performing attenuation or amplification of any of the subband signals in the decomposition phase of the multiresolution decomposition corresponding to at least one of the filters.

21. An image processing method performed by an image processing apparatus that comprises at least a memory device and a processor, wherein
the memory device comprises:
a filter storing unit that stores a wavelet frame with orientation selectivity or a filterbank with orientation selectivity that is a set of an approximate filter with no orientation and a plurality of detail filters with respective orientations; and
an image data storing unit that stores image data;
the method comprising:
a decomposing step of obtaining subband signals by performing multiresolution decomposition on respective color components of the image data using the wavelet frame with orientation selectivity or the filterbank with orientation selectivity; and
a reconstructing step of obtaining reconstructed image data by reconstructing an image by summing the subband signals of the respective color components in a synthesis phase that have been obtained at the decomposing step;
the decomposing step and the reconstructing step being performed by the processor, and
the decomposing step further comprising a coefficient processing step of performing coefficient processing, between a decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

22. A program, stored on a non-transitory computer-readable medium, that causes an image processing apparatus that comprises at least a memory device and a processor to execute an image processing method, wherein
the memory device comprises:
a filter storing unit that stores a broad-sense pinwheel framelet or a pinwheel wavelet frame, having a degree, that is a set of an approximate filter with no orientation and a plurality of detail filters with respective orientations; and
an image data storing unit that stores image data;
the program causing the processor to execute:
a decomposing step of obtaining subband signals by performing multiresolution decomposition by the broad-sense pinwheel framelet or the pinwheel wavelet frame on the image data; and
a processed image acquiring step of acquiring processed image data by the subband signals in a decomposition phase of the multiresolution decomposition that have been obtained at the decomposing step, or processed image data that has been reconstructed into an image by summing the subband signals in a synthesis phase of the multiresolution decomposition; and
the decomposing step further comprising a processing step of performing attenuation or amplification processing of any of the subband signals in the decomposition phase of the multiresolution decomposition corresponding to at least one of the filters.

23. A program, stored on a non-transitory computer-readable medium, that causes an image processing apparatus that comprises at least a memory device and a processor to execute an image processing method, wherein
the memory device comprises:
a filter storing unit that stores a wavelet frame with orientation selectivity or a filterbank with orientation selectivity that is a set of an approximate filter with no orientation and a plurality of detail filters with respective orientations; and
an image data storing unit that stores image data;
the program causing the processor to execute:
a decomposing step of obtaining subband signals by performing multiresolution decomposition by the wavelet frame with orientation selectivity or the filterbank with orientation selectivity on respective color components of the image data; and a reconstructing step of obtaining reconstructed image data by reconstructing an image by summing the subband signals of the respective color components in a synthesis phase that have been obtained at the decomposing step; and the decomposing step further comprising a coefficient processing step of performing coefficient processing, between a decomposition phase and the synthesis phase in the multiresolution decomposition, on decomposition detail coefficients output from the decomposition phase so as to reduce values having small absolute values to be smaller in absolute value as energy of the decomposition detail coefficients is larger, and so as to further enhance values having small absolute values as the energy of the decomposition detail coefficients is smaller.

24. A printing medium on which a coefficient output processed image is printed, wherein:

the coefficient output processed image is an image that is obtained from an original image by summing subband signals in a decomposition phase of multiresolution decomposition after decomposition detail coefficients processing predetermined weight without passing through the synthesis phase, using a broad-sense pinwheel framelet, a pinwheel wavelet frame, a wavelet frame with orientation selectivity or a filterbank with orientation selectivity; and wherein the subband signals in the decomposition phase are attenuated or amplified by the predetermined weight to cause a crater illusion, which gives a three-dimensional appearance.

25. A non-transitory computer-readable recording medium on which image data for displaying a coefficient output processed image is recorded, wherein:

the coefficient output processed image is an image that is obtained from an original image by summing subband signals in a decomposition phase of multiresolution decomposition after decomposition detail coefficients processing predetermined weight without passing through the synthesis phase, using a broad-sense pinwheel framelet, a pinwheel wavelet frame, a wavelet frame with orientation selectivity or a filterbank with orientation selectivity; and the subband signals in the decomposition phase are attenuated or amplified by the predetermined weight to cause a crater illusion, which gives a three-dimensional appearance.

* * * * *